(12) United States Patent
Betsch et al.

(10) Patent No.: US 8,640,206 B2
(45) Date of Patent: Jan. 28, 2014

(54) SYSTEM AND METHOD FOR CONTROLLING ACCESS TO INFORMATION STORED AT PLURALITY OF SITES

(76) Inventors: Regis J. Betsch, Wilmington, DE (US);
Stephen P. Bushnell, Newark, DE (US);
Manoj S. Hathi, Monmouth Junction, NJ (US)

( * ) Notice: Subject to any disclaimer, the term of this patent is extended or adjusted under 35 U.S.C. 154(b) by 0 days.

(21) Appl. No.: 13/213,453

(22) Filed: Aug. 19, 2011
(Under 37 CFR 1.47)

(65) Prior Publication Data

US 2012/0192253 A1  Jul. 26, 2012

Related U.S. Application Data

(60) Provisional application No. 61/375,457, filed on Aug. 20, 2010.

(51) Int. Cl.
*G06F 7/04* (2006.01)

(52) U.S. Cl.
USPC ............................ 726/4; 713/179; 713/176

(58) Field of Classification Search
None
See application file for complete search history.

(56) References Cited

U.S. PATENT DOCUMENTS

| | | | |
|---|---|---|---|
| 6,526,434 B1* | 2/2003 | Carlson et al. | 709/203 |
| 6,954,767 B1* | 10/2005 | Kanada | 1/1 |
| 2005/0114711 A1* | 5/2005 | Hesselink et al. | 713/201 |
| 2010/0095131 A1* | 4/2010 | Krueger et al. | 713/189 |
| 2010/0228719 A1* | 9/2010 | Apparao et al. | 707/709 |
| 2010/0318507 A1* | 12/2010 | Grant et al. | 707/706 |
| 2011/0295851 A1* | 12/2011 | El-Saban et al. | 707/728 |

* cited by examiner

*Primary Examiner* — Andrew L Nalven
*Assistant Examiner* — Mohammed Waliullah
(74) *Attorney, Agent, or Firm* — Patent GC LLC

(57) ABSTRACT

An external master portal system consisting of a standalone primary control interface referred to as a master portal which is network-connected to subordinate gateway controllers located at the peer connection points to the network, used to define and control the permitted transfer of data across a peer-to-peer network is disclosed. Further, control of the master portal can be provided to a third party whose data is only a part of broad range of data stored or used at any of the peer sites.

11 Claims, 42 Drawing Sheets

SYSTEM AND METHOD FOR CONTROLLING ACCESS TO INFORMATION STORED AT PLURALITY OF SITES

CROSS-REFERENCE TO RELATED APPLICATIONS

This application claims priority to U.S. provisional application Ser. No. 61/375,457 entitled, "A SYSTEM AND METHOD FOR CONTROLLING ACCESS TO INFORMATION STORED AT PLURALITY OF SITES", filed on Aug. 20, 2010, the entire contents of which are hereby incorporated by reference.

STATEMENT REGARDING FEDERALLY SPONSORED RESEARCH OR DEVELOPMENT

Not applicable.

REFERENCE TO A SEQUENCE LISTING, A TABLE, OR COMPUTER PROGRAM LISTING COMPACT DISC APPENDIX

Not applicable.

BACKGROUND OF THE INVENTION

The invention relates generally to a system and method for controlling access to information stored at a plurality of sites, and more specifically to a secure externally authorized peer-to-peer network system that can be accessed over an intranet or the Internet.

Prior to the networking of computers and the subsequent, electronic sharing of data via networked computers, there was a natural barrier to sharing, due to the need to physically copy the data and then physically deliver it to the recipient. This required actions by some person or persons and allowed direct intervention when the transfer was not reasonable, proper, or secure. With the advent of sharing via networked computers, data can be shared without any human participation in the process. It is of major benefit to replicate the former built-in ability for a person to intercede and block unreasonable or disallowed data transfer by designing an analogous capability into any electronic data sharing process.

The current approach to all data security is to provide log-in security for those wishing to access and work with the data within a particular data repository. For in-house systems, this is usually adequate. For data shared across an enterprise, the security becomes a larger challenge since, without additional controls, every valid log-in on the enterprise has access to all of the data available to the enterprise. The complexity comes when the data involves any third party. In many cases the local database enterprise and a third party share joint ownership of some information stored in the database. Examples of shared ownership include employee payroll information, healthcare records, and banking records.

With these records, the local enterprise, which manages the data repository, usually puts in place policies concerning the use and sharing of the data with other data repositories and external data subscribers. The problem with this approach is that it rarely reflects the desires of the individual entities about whom the data pertains.

A trend in the industry, which further damages one's ability to maintain privacy and security of one's data stored in a data repository, is the creation of aggregate data access systems. An aggregate data system merges the data access from multiple sources, giving all of the users of the individual data systems access to all of the data that formerly resided in independent discrete repositories. As long as a single corporation owns all of the data systems in question, a data access policy can be imposed. However when data exists at multiple organizations which do not have a common ownership, it is almost impossible to guarantee any data access policy is met no matter how sensitive the data. It is unreasonable for the entity that shares ownership of the data to attempt to direct the data repository owner's internal use of the data. On the other hand, it is completely reasonable to demand control of the sharing of that data with third parties within one's legal right to do so.

The problem to be solved is how to provide a method to allow the entity that shares ownership of the data to gain control of the authorization process used to enable sharing of data outside of the data repository owner's organization.

SUMMARY OF THE INVENTION

This invention addresses the need for an individual and/or business to gain control of the sharing/transfer of their sensitive and private data between various data systems owned by others with potentially conflicting interest in the authorization of access to this data. The master portal and gateway controller peer-to-peer network system of the invention offers a previously unavailable option to those whose data is located in data repositories owned and administrated by others.

The master portal in effect provides single master authorization system to access and control sharing of all of one's data stored in any number of data repositories which provide access through an internet or intranet gateway connected to that data repository. The fundamental focus of the system is individual data-owner centric rather than database-owner centric.

The master portal is not a data repository duplicating data stored elsewhere. Instead, in many embodiments, it stores only links to data, and it classifies those links as to the control parameters related to data: ownership, data type, data content, data source, permission duration, end use, electronic requestor system ID, data view only, data transfer, etc.

The system according to the invention can enhance the ability of multiple users of the data to share data in beneficial ways. In doing so, the system eliminates the need to create massive aggregated databases, thereby abolishing the need to invest in massive data farms and personnel to run them. By using a master portal controller to command local gateway controllers for each peer in a peer-to-peer network, the owner of the data can unobtrusively control what data is shared and with whom that data is shared.

As a specific example, the sharing of healthcare data between various healthcare providers only requires opening views to specific medical information rather than a mindless data dump. In fact, providing a mass of unprocessed data stored in a foreign database is very likely to cause the information requestor to be unable to find critical information in a timely fashion.

When one predetermines the "information" needed by a particular data requestor, the amount of data transferred is significantly reduced. In fact, if the data is analyzed and presented in an informational form rather than in a raw data form, the benefit of sharing the data can be further improved.

The invention is a computer-implemented system for controlling access to information stored at a plurality of data repositories. The system comprises a plurality of electronic data repositories storing data associated with an entity; a communications network capable of electronically connecting the plurality of electronic data repositories; and an authenticator accessible to the entity through a client computer via the communications network, the authenticator being capable of authenticating the entity and storing authenticator access data. The system further comprises an authorization processor capable of connecting to the communications network, the authorization processor storing data access rights granted by the entity; and an information portal capable of communicating with the authentication processor, the authorization processor, the client computer and the plurality of electronic data repositories through the communications network, the information portal using the authenticator access data and entity access data from the entity to open a session and to allow the entity to designate the data access rights to the data stored on the plurality of electronic data repositories.

In one embodiment, the system further comprises a plurality of data user authenticators, each of the plurality of data user authenticators corresponding to one of the plurality of electronic data repositories. In another embodiment, the functions of the authorization processor and the information portal are performed by the same computer system. In still another embodiment, the system establishes an infrastructure on top of an existing network.

In another embodiment, the invention is an externally authorized peer-to-peer network data transfer system. The system comprises a software or hardware implemented data-push or data-pull peer-to-peer network system for the sharing of data between independent entities running on an internet or intranet backbone and one or more data storage peers comprising electronic data repositories which contain in-part or in-whole data owned by an independent entity. The system further includes one or more data access or data transfer peers comprising a data-pull electronic data requestor system or a data-push data delivery system which transfers data or provides data views from/to the individual electronic data storage peers and one or more independent individual data owners who have specific data which is being stored in a data repository at a relevant data storage peer. The system also has a gateway controller system comprised of a software data transfer controller for each peer having the ability to limit the push or pull transfer of data using any combination of settings for the control parameters related to data (i.e. ownership, data type, data content, data source, permission duration, end use, electronic requestor system ID, and data view only or data transfer) and a master portal controller used by the independent individual data owner to authorize data transfers by communicating the desired parameters to the gateway controllers. In one embodiment, the system has a secure identification logon system for the individual data owner to access the master portal with security at a level so that the master portal can be trusted as the source of transfer authorization for data and information controlled by the gateway systems.

BRIEF DESCRIPTION OF THE DRAWINGS

The invention is pointed out with particularity in the appended claims. The above and further advantages of this invention may be better understood by referring to the following description taken in conjunction with the accompanying drawings, in which:

FIGS. 7A-7H are a flowchart representation of an embodiment of a process for authenticating a data requestor other than the data owner;

The attached drawings are intended to better illustrate the present invention without limiting it in any manner whatsoever. Like reference characters in the respective drawn figures indicate corresponding parts or steps.

DETAILED DESCRIPTION OF THE INVENTION

The present invention relates in general to the secure access of data by an entity outside the command and control regime of a database administrator. The system provides a well-defined secure access infrastructure so that outside entities can independently access data without affecting the integrity of the data or its privacy. The infrastructure is designed to operate in any private or public network including the general internet. With this system an individual entity can assert external sharing control of their data residing within a database operated by a third party without conflict of the internal use of the data by that third party. In one embodiment, the invention provides a robust generic "infranet" capability, e.g. a secure data access and sharing infrastructure to the internet. More details of the infranet capability will be described below in the discussion of FIG. 11.

Figure 1:
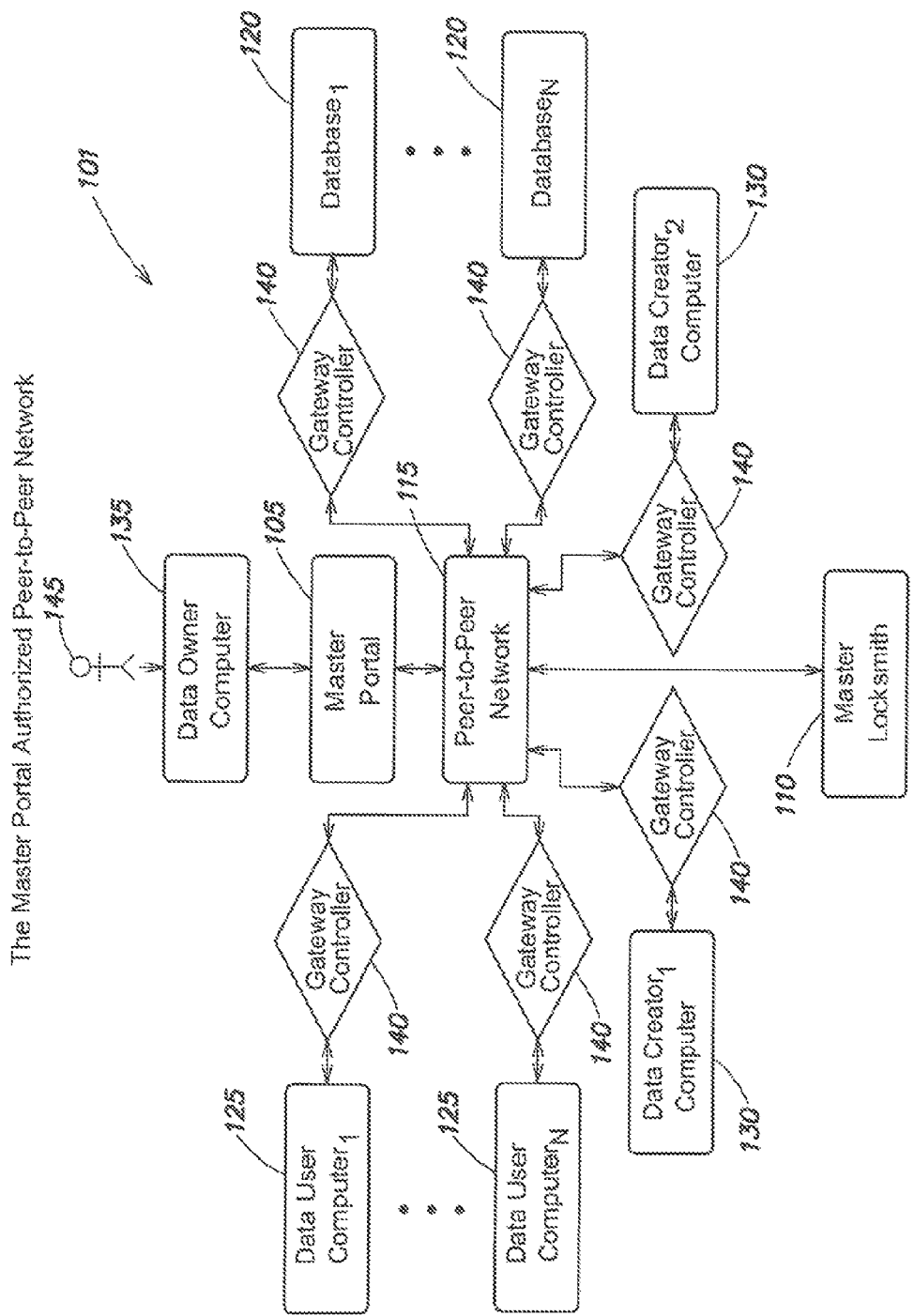
FIG. 1 is a block diagram of one embodiment of the network with the peers, master portal and gateways shown.

Referring to FIG. 1 and in brief overview, an embodiment of a computer-implemented system 101 for controlling access to information stored at a plurality of data repositories is shown. The system shown in FIG. 1 is one embodiment of the external authorization scheme of the invention. The systems includes a master portal (information portal and authorization provider) 105, a master locksmith (authenticator and key holder) 110, a communications network, such as the Internet or a peer-to-peer network 115, a plurality of electronic data repositories, such as databases 120, a plurality of user computers 125, a plurality of data creator computers 130, a user data owner computer 135 and a plurality of gateway controllers 140.

The user data owner 145 is the entity that owns the data stored in the electronic data repositories 120 or is the entity to which the data pertains. The user data owner 145 may be an individual, a corporation, or any other entity that has information about it stored in a database. The term "user" in the text may refer to a data owner, a data requestor or a data creator depending on which entity is seeking access to the master portal system. The user data owner 145 has the login username and password for the master portal to request information access and to set permissions for information access by others. The user data owner 145 also has the login username and password for the master locksmith 110 for maintaining their personal user validation.

The user data owner computer 135 may be any computer or terminal to which the user data owner 145 has access. The data owner computer 135 may be a single computer, or may be a plurality of computers. The data owner computer 135 has internet access and software to run on the infrastructure.

The communications network 115 is any communications network that is capable of electronically connecting the entities in the system 101. In one embodiment, the communications network 115 may be any network that addresses connected peers in a direct addressing manner and can control the data flow between peers by software implemented on gateway controllers. In other embodiments, the communications network may be the Internet, an intranet, VPN, wireless network or any other type of network that is able to provide communications between computers/electronic devices.

The master portal 105 is a centralized controller of the gateway controllers 140. In one embodiment, the master portal system 101 establishes an infrastructure on top of an existing network. The master portal 105 may interface with any number of independent individual user data owners 145. The master portal 105 stores the data access rights granted by the user data owner 145 and performs authorization when a data access request is received. In one embodiment, the master portal 105 has a very large data storage capacity and the ability to communicate with a large number of concurrent users. The master portal 105 also comprises a router system that has the capability to handle the required number of concurrent transactions. In one embodiment, the router system has the capability to use hardware encrypted communication. The master portal 105 also has a database of metadata for each user to store locations of information and access permissions. The metadata will be discussed in more detail below in the discussion of FIG. 9.

In one embodiment, the master portal controller stores tables of pointers that identify sharable data. The tables store meta-data containing links and information about the data to be shared in a configuration that provides access to specific data by communicating to the relevant gateway controller tied to a specific data storage peer information specifying what data to make accessible. The tables also store an identification for each of the links that specifies which of the peers are authorized to use those link. In other embodiments, the links may be stored at either the master portal or the relevant gateway controller, or both.

The master portal 105 further includes software to perform the first stage decoding of the metadata using the decryption key supplied by the master locksmith 110. The second state decryption requires the encryption/decryption key assigned to the gateway which is to have access to the data owner's data.

In one embodiment, the master portal system, rather than being located external to all of the peer subsystems, is located within one peer's network, and used to set the data transfer parameters for the gateway controllers located at the other peers in the network.

The master portal 105 interface allows data owners to directly inspect any of their data stored on any of the data repositories 120. In one embodiment, access to the master portal 105 requires both a hardware/software key provided by a third party locksmith service 110, and a login username and password known only to the master portal 105 and the independent individual user data owner 145. Without the username and password, the master locksmith service 110 cannot use the master portal 105 to access the data of individual owners 145.

In one embodiment, a unique identifier assigned during registration is used for access by the independent individual user data owners 145. The unique identifier protects the data owners by never revealing their actual identity. Thus the master portal system 105 cannot be compromised into delivering information by personal identity. Even if someone other than the independent individual data owner 145 gets access to the data owner's links stored on the master portal 105, the links cannot be executed, because the gateway needs to receive verification from the master locksmith 110 that a physical key is proper for the indicated individual data owner 145. This "key" will be discussed in more detail below.

In another embodiment, as an additional privacy control, the master portal control system uses only a serial number and an external physical or electronic master key to identify the independent individual data owner to the gateway controllers and their peer systems on the network rather than using the user's identifier, name and/or demographics.

The databases 120 may be any type of electronic storage device or media that stores information. The data owner computer 135 accesses the databases 120 through the master portal 105. In one embodiment, the system includes a separate gateway 140 for each database 120 to be accessed. The gateway 140 may be a router similar to the master portal's router or may have lower capacity. Each gateway 140 has a processor to execute the gateway software. The gateway software decrypts the information requests forwarded by the master portal 105 (initiated by the user data owner 145 or another data requestor), retrieves information from the requested local database 120, optionally packages the data into a report, encrypts the data and then sends the encrypted data to the requestor. Each gateway 140 has a security encryption key for each data owner.

The master locksmith 110 is a user validation and/or authentication service that is provided over the internet or any other appropriate network. In many embodiments, each of the data repositories 120 may have its own authentication procedure. In these embodiments, the master locksmith 110 functions as a centralized authenticator to avoid a data owner 145 or other user from having to authenticate to each data repository 120 that the user desires to access. The master locksmith 110 authenticates the user data owner 145 and stores authenticator access data (or key data) that is used by the master portal 105 to decrypt the user data owner's data. The master locksmith 110 has a router similar to the master portal's router, a database of user names and assigned IDs, demographics to verify one-person, one-ID, and a master portal encryption key for each user. The master locksmith 110 has a security encryption key for each registered user (user data owners 145 and other data requestors).

The data user computers 125 are used by user data requestors. A user data requestor is an entity with permission from the user data owner 145 to access some or all of the data owner's information. The data user computer 125 has internet or other appropriate network access and software to participate in the infrastructure. The user data requestor has a login username and password for the master portal or their respective gateway system to request information access and a login username and password for the master locksmith 105 to maintain the user data requestor's personal user validation information. Similarly, the data creator computers 130 are used by data creators who enter or create data to be stored on one of the databases 120. The data user computers 125 and the data creator computers 130 may be the same computer. That is, a data creator may also be a data user. The data creator computers 130 may be local to the databases 120 or may be remote from the external databases 120. Each data creator computer 130 has internet or other appropriate network access and software to participate in the infrastructure. In one embodiment, the data creator has a login username and password for the master portal or their respective gateway system to enter information and a login username and password for the master locksmith 105 to maintain the data creator's personal user validation information. Continuing the health care example from above, a data creator may be an administrator at a doctor's office who enters medical information into patient's electronic records.

Once the master portal and gateway controller system 101 are implemented, any data requests, push or pull, from third parties must go through the gateway controllers 140. Also any data push to outside agencies by the local data repository 120 needs to be pre-authorized or else the data sharing will be blocked by the gateway controller 140. The local data repositories 120 no longer need to have the primary responsibility to control the use of the data in their systems by outsiders. The gateway controllers 140 provide this function for each independent individual user data owners 145 having data in the local repository 120.

In one embodiment, the use of the master portal system 101 does not restrict the use of other data sharing systems operated in parallel.

In another embodiment, the gateway controllers 140 are specified to only control the exchange of data external to the local repository 120. The gateway controllers 140 in no way interfere with the in-house operation of the local database 120.

The functional operation of this master portal system 101 requires: obtaining a physical master key, a one-time activation of a master portal account, and a one-time activation for each gateway controllers to be used by the individual data owners 145.

In one embodiment, the master portal/gateway system allows the search and retrieval of aggregate information across multiple databases and/or content controlled by multiple data owners. The process first retrieves individual data and then combines it in an aggregate form that removes the ability to reverse engineer a specific source of the data. The system also allows one to explicitly determine the amount of security risk the retrieval process creates, so that controls can be put in place to avoid disclosing personal information during the aggregation process.

The invention allows the metadata stored on the master portal to be unencrypted. The metadata contains the location (IP address), an identifier (e.g. user, patient) for the data records to be accessed, and the actual data to be accessed. The data to be accessed is encoded in an information format. Also the identifier and information specification are encoded with a key only known to the user and any gateway which has been registered as a valid information requestor. The location is encrypted using a key provided by the master locksmith which is data owner specific.

One of the goals of the invention is to make it impossible for the master portal 105 to independently access any data—it is only a part of an access process requiring security keys unknown to the master portal 105. This means that the master portal 105 has a minimum amount of liability in the protection of the data stored on the system.

Healthcare Scenario

FIG. 2 shows the use of an embodiment of the master portal system in a healthcare scenario. In this case, the individual user data owners are patients 270. The purpose of the system is to provide a secure portal to all the patient's personal medical records. The HEALTH INSURANCE PORTABILITY AND ACCOUNTABILITY ACT OF 1996 (HIPAA) gives patients the right to control the sharing of their medical data. Currently, most patients do not have access to their medical records that are stored at various sites by various entities in the healthcare system. The invention enables patients to have access to all of their medical records and to determine which entities have access to which records. In this scenario, the master portal system both promotes needed sharing of critical data while providing easy to implement patient control of that sharing. A patient is able to provide access to specific data to those who need it when they need it and can revoke access when the patient desires.

Currently, healthcare providers require patients to sign HIPAA waivers as the providers are unable to contact the patient every time data needs to be shared. The HIPAA forms often allow a patient's information to be shared with other healthcare entities without any tracking of what is shared and with whom. Typically patients are required to sign the waivers or they will not receive the payments that are part of the benefits of their medical insurance plan. In essence, signing the HIPAA waiver is a requirement and the patient does not truly have control over their personal medical information. Signing a HIPAA waiver means that the rights of the patient are entrusted to some overall policy of the medical provider, but that sensitive information may be easily disclosed to the wrong parties. The creation of regional medical databases puts the data at even greater risk due to the number of entities who are given access to the medical database system.

In addition patients' health records are moving to electronic form, which means that the records are more easily shared than if the records were in paper files. With physical data sharing (i.e. records from the hospital being provided to a primary care physician) a human had to be involved in the transfer. While not perfect, the physical nature of the records was a deterrent to anyone seeking access to a patient's records. The large number of electronic databases that are coming online leads health care entities to consider ways to allow the databases to share data. One possible solution is to create huge data farms where all of the data is aggregated. This solution requires a huge investment and there would be significant long term costs to maintain and operate the data farm. In addition, as long as the health care entities maintain separate databases, a data thief would have to compromise the security of multiple organizations to obtain access to all of a particular patient's information. In the single centralized database solution, a data thief achieving access at a single terminal at any of the organizations would have access to all of the patient's records. The sheer number of access ports would make it virtually impossible to defend against data thieves desiring to gain access illegally. Also, entities needing only access to limited information could easily gain access to all of the other collected data. Further, if security is breached, a significant amount of information could be stolen before the breach is detected.

The present invention has significant benefits over the aggregated data solution in that the expense is minimal and there is no need to agglomerate all of the data into a single system. Further, patients are concerned that their personal medical information will be shared with others to the detriment of the patient. Patients are concerned that electronic records will enable institutions to be biased against them. For example, if potential employers have easy access to a patient's medical records, the employer could use the information to avoid hiring people with a past medical record that may end up costing the employer significantly more in insurance benefits. A job applicant would not be able to prove that this was the reason that they were rejected for the position. If insurers have easy access to medical information, it may bias the insurer against insuring the individual if there is something in the individual's medical records that could potential cost the insurance company significant money.

What is needed is a system in which the patient has the ability to easily control access to their private medical information. In certain embodiments of the invention, the patient is the only person which has control of the access to their medical data. What is also needed is a system in which sharing of a patient's medical records when necessary should be easy to control and secure. For example, if a patient goes to a hospital for a procedure, the patient may want to grant the hospital physician access to their primary care doctor's records. Patients do not want the government, insurers or healthcare providers to arbitrarily access the patient's records that are stored in an external database.

The invention enables access to be controlled by a proactive action initiated by the patient or the patient's representative. The invention has many benefits in the health care arena. Citizens are given control of their medical records. The transfer of medical records to electronic format makes this possible. The patient is able to trust that the government and insurers do not have undesired access to the patient's data as the patient's data cannot be accessed without the patient knowing and providing permission.

The master portal system eliminates the need for patients to sign HIPAA waivers and allows the patient to be able to explicitly determine what data is shared and with whom. The patient, in assuming control of the patient's medical records, releases the individual healthcare providers from the responsibility and accountability. To ease the decision process for the patient, the master portal system makes it possible for any healthcare provider—especially the primary care physician—to recommend what data to share and with whom to share it. The master portal system automatically makes it easy for any healthcare provider working with the patient to gain access to any desired patient record by simply asking the patient. There is no need to request access from the individual data repositories, the patient can independently provide all of the required access.

Referring again to FIG. 2, an embodiment of a computer-implemented system 201 for controlling access to patient information stored at a plurality of data repositories is shown. The system 201 includes a master portal 205, a master locksmith 210, a communications network 215, a plurality of databases 220, and a plurality of gateway controllers 265. In this scenario, the data owner is a patient. The patient 270 may access the patient's records stored at any of the plurality of databases 220. The patient 270 may access the databases 220 through a patient computer 275, which may be any computer or terminal to which the patient has access. The patient computer 275 may be a single computer, or may be a plurality of computers. The databases 220 may be any type of electronic storage device or media that stores information. The patient computer 275 accesses the databases 220 through the master portal 205.

In the embodiment shown in FIG. 2, the databases 220 include a veteran database 222, an insurance company database 225, a primary care doctor's office database 230, a pharmacy database 240, a rehabilitation facility database 245, a hospital database 250, an MRI testing facility database 255 and an emergency treatment facility database 260. The databases 220 shown are for exemplary purposes only, and may include databases for any entity that may participate in health care.

The master portal 205 is an access manager controlled by the patient 270. The master portal 205 is not a master database, but rather a master key system that provides views to electronic databases on a need-only or permission-only basis. In one embodiment, the master portal 205 provides views of data stored in the databases 220, but does not actually transfer the data to the requestor. In another embodiment, the medical information required for doctors to perform their diagnoses may blend inputs from all sources whose links the patient 270 has approved for this purpose. In one such embodiment, the data is presented in an XML format. In yet another embodiment, the patient 270 provides insurers access to all data related to any claim. In still another embodiment, patients 270 can independently track and analyze their health data.

In the master portal system 201, the master key is only available to the patient 270. The master key is assigned to the patient when the patient registers with the system. In one embodiment, the master key is generated at random. No one but the patient has the master key. All other access is local key access to be used for specific purposes. In many embodiments, there is no government-assigned identifier. Rather, the patient 270 owns their identifier and only gives other entities, such as the government and insurers, local keys on an as needed basis. For example, if the government Medicaid insurance system needs a patient's records to process a claim, the patient can direct the system to provide an access key that limits Medicaid's access to only information regarding the treatment that Medicaid is paying for.

In one embodiment, access to the master portal 205 requires multiple factor authentication. Access may require a username, password, biometric information and/or provision of other evidence that only the user has. For example, the user may have a USB device that stores a key unique to that device. The user may have a one time password device that generates passwords unique to that user. Proof of having these devices in the user's physical possession may be required for access.

A primary factor for the health care embodiment is that the patient is the gatekeeper. No data is shared unless the patient or the patient's representative/agent specifically allows sharing. Opening a provider's electronic data to access by the master portal 205 does not automatically grant other providers access to that data, nor does it grant that provider access to other provider's data. Data access is only granted when specifically allowed by the patient. Each provider is given a specific access code for the patient's data. Each provider must maintain the security of this code and not share it with other providers. This security is in line with the requirements of HIPAA.

The patient may decide what access to provide, or the patient may work with their primary care physician to set up access authorizations. In one embodiment, the patient can designate what information can be shared in an emergency situation. A special set of links can be set up for this purpose.

In another embodiment, if a patient agrees, researches can access the patient's medical information in an aggregate manner, i.e. 100 patients or more for any criterion, so that the patient can be informed when studies find that the patient may be at risk. For example, deadly drug interactions may be discovered much earlier and patients alerted if pharmaceutical companies have access to aggregate patient data. In this embodiment, the actual identity of each patient may not be known by the entity receiving the aggregate data. An embodiment of the invention for sharing aggregate data is described below.

Anonymous Publication of Master Portal Controlled Data

The master portal system requires that all of the data links are stored on the master portal in an encrypted manner. If a data owner chooses to "Opt In" to the use of their data in research, an additional file is created for that data owner which is encrypted solely by the master portal. The metadata in this file only includes pointers that do not have a "Never Share" classification by the data owner.

There are two distinctly different methods to share the aggregate data: as part of an extracted separate database; or as a report of analyzed data which contains no discrete data, only compiled information. In the first case there is a major risk that an individual data owner (IDO) who is an outlier will be identifiable by the raw data. An example would be someone with a reported height of 7 feet 8⅓ inches, who lives in the north central US. As the number of extracted database fields increase, more and more IDO's data would have to be removed to ensure data privacy even if the extracted data contained no names or addresses.

The second method is to use a trusted data analyst entity which extracts the data and performs the analysis and then reports only results which are created from compilations of data such as averages, means and standard deviations. This analysis phase of this method can be designed to eliminate the potential for any reverse engineering to reproduce the sensitive individual data. For example, if a pharmaceutical company decides to study interactions between its latest released drug and other drugs people may be taking, the first method would limit the number of drugs to be studied and the amount of personal demographic data such as gender, age, height, etc. In comparison, the second information-based method would allow the drug company to see a report which contrasted the effect of any two, three or more drugs taken together as long as there were at least a significant (over 10 minimum) number of cases to discover any trend.

The research could not occur without the master portal and the IDO's agreement to "Opt-In". As such, in one embodiment, the data extraction or information analysis processes must have built in a measure of the amount of benefit the researcher has gained and from which IDOs participation they benefited, so that the master portal and the IDO can be fairly compensated. This functionality is important since those who own the "more interesting" data are likely those who are most challenged by the results. Using a healthcare example, a person with a rare disease could often be an important outlier for the overall analysis of the data.

As each patient is provided a single identifier, the system 201 has the added benefit of protecting against insurance frauds. No physicians can create fictional patients and no patient can make claims to multiple insurers.

In addition, in one embodiment, every data access is logged in the system, so it is possible to determine if an unauthorized access has occurred.

Business Scenario

Figure 2A:
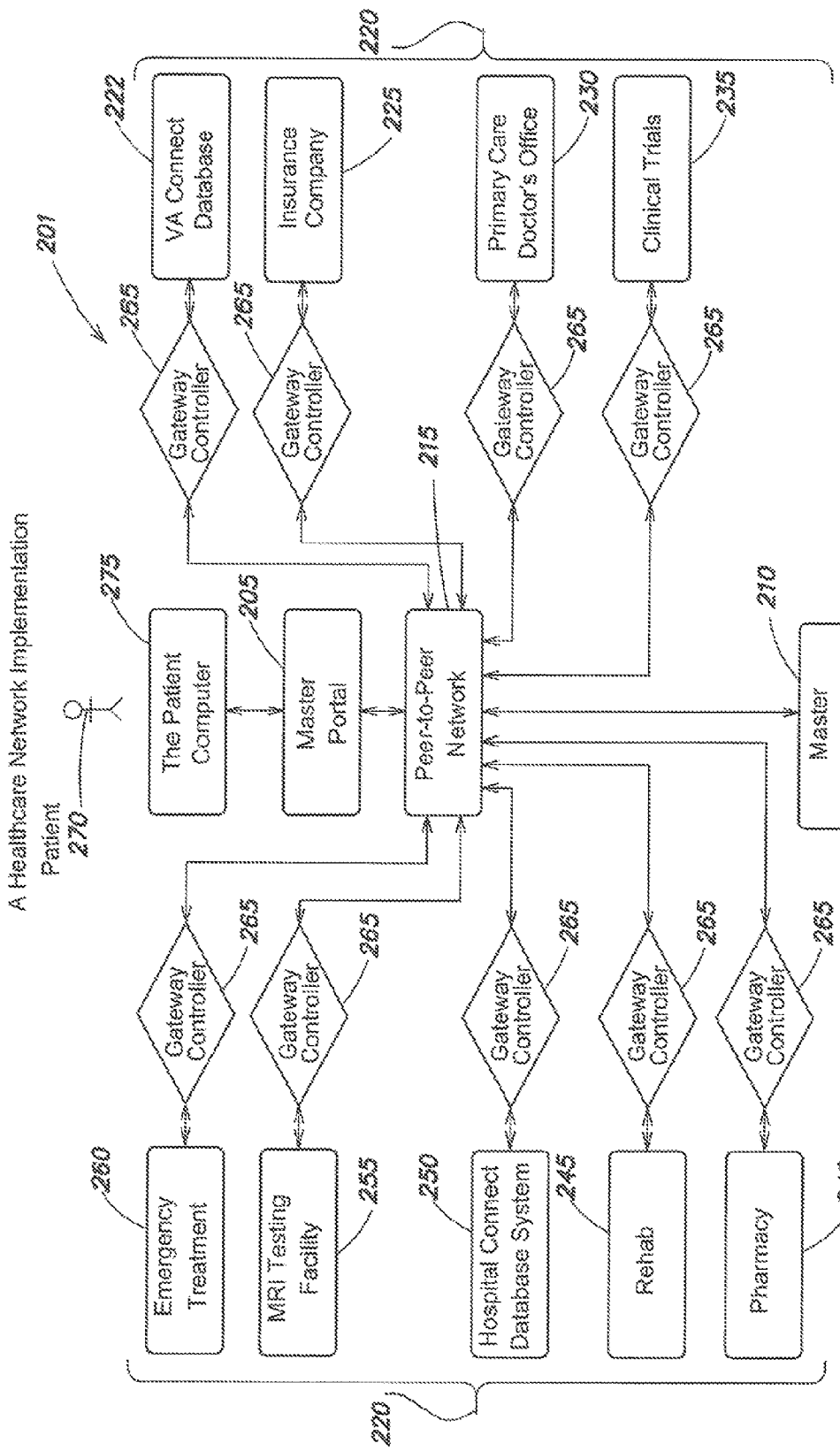
FIG. 2A is a block diagram of one embodiment of the network with the peers, master portal and gateways shown for a healthcare scenario.
Figure 2B:
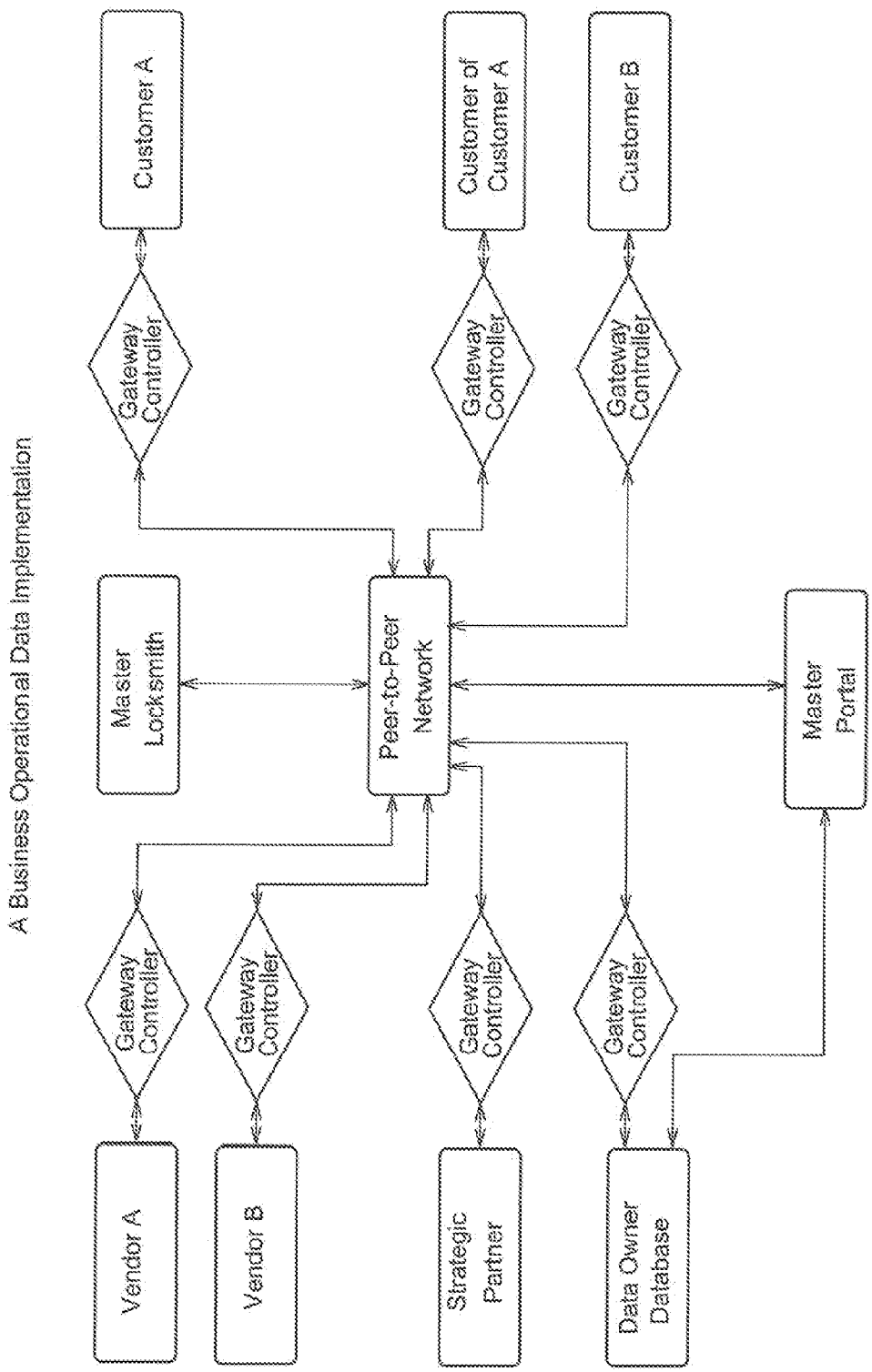
FIG. 2B is a block diagram of one embodiment of the network with the peers, master portal and gateways shown for a business extranet scenario.

FIG. 2B shows a possible configuration for a business-use where critical data sharing is required for effective business operations. In this scenario, the data comprises business-related information and provides a business the ability to share business data between its partners, vendors/suppliers and customers where the proprietary and confidential information can be shared in a rigorously controlled manner. Virtually every business uses some form of ERP system. The problem is that any particular vendor, customer, strategic partner needs only specific data contained in the ERP system.

Since electronic data is constantly increasing in volume and sensitivity, it is critical that businesses adopt a system that simultaneously protects their data, but also lets them share views of the data or the data itself with third party entities. The master portal system allows this to occur.

Also once information is released to others in the external business operations, the control of the dissemination of that data is lost. By implementing a gateway controller system, any shared data can be tagged, and as long as the peer-to-peer data sharing uses the master portal system, the data dissemination can be controlled by the business that owns the data. This significantly reduces risk of sharing pricing information, cost information, etc. with one's strategic partners. Also, by using tagged data, anyone sharing data without permission must first violate the data sharing agreement by removing the ownership tag. Although this does not block fraudulent sharing of data, it does prevent unintentional disclosure from occurring.

Embodiments of the system may also be used in other environments. For example, the data that is stored in the various repositories may be an individual's financial data. The system would provide the ability to have a unified view of one's financial data while gaining explicit control of the sharing of that data. For example, an individual may have bank accounts at several different banks and may want to have a unified view of all their information. The individual may only want to share certain financial information with others.

Security Process

Figure 3:
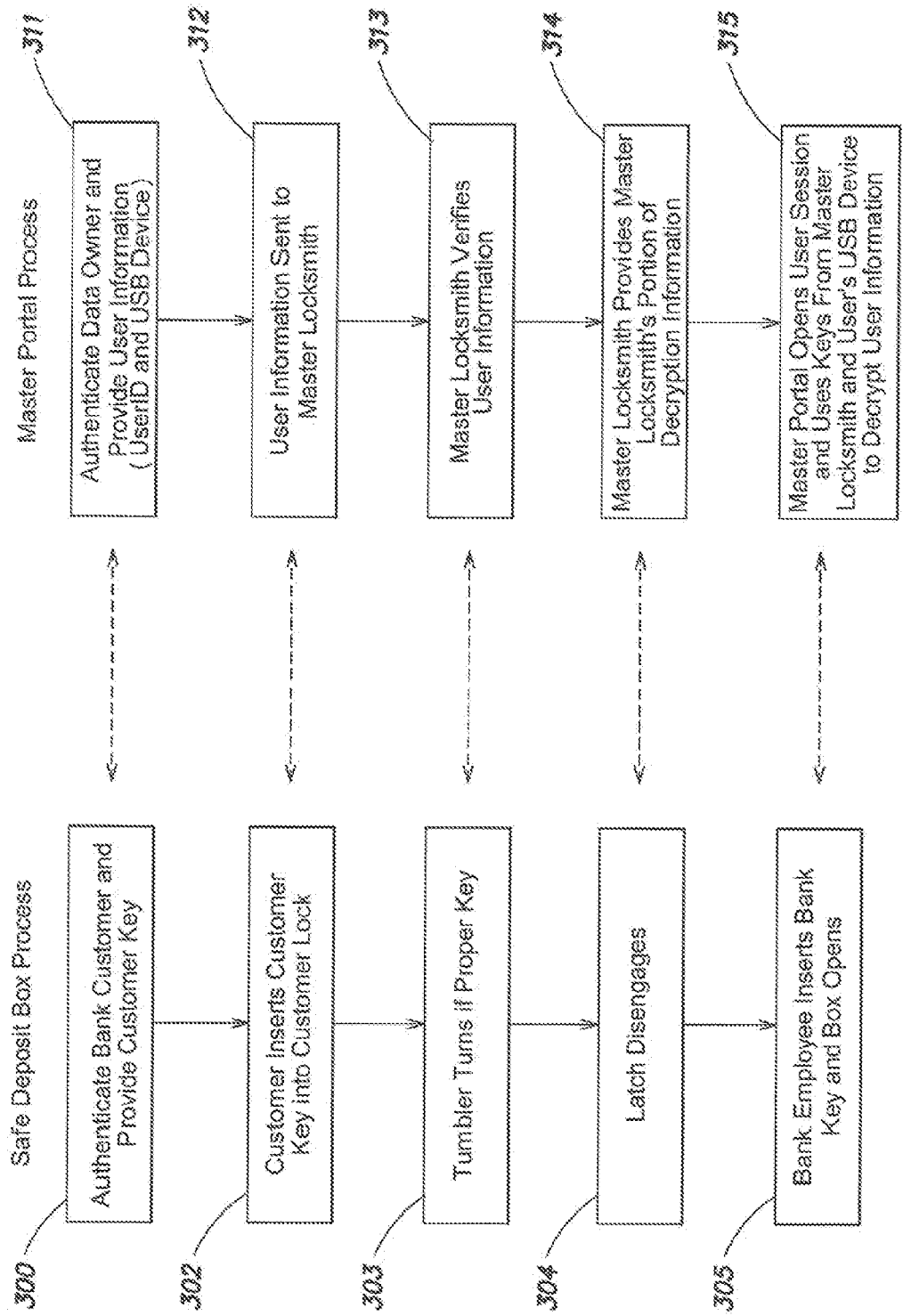
FIG. 3 is a flowchart representation of one embodiment of a process according to the invention for controlling access to information stored at a plurality of data repositories.

Referring to FIG. 3 and in brief overview, an embodiment of a computer-implemented process for controlling access to information stored at a plurality of data repositories is shown. A simple analogy for the method according to the invention is the security used for safe deposit boxes. To gain access to a safe deposit box, a user must first authenticate to the bank (step 301). Authentication is typically performed through review of a government issued ID, such as a driver's license or passport. Once authenticated, the user is provided a physical key to the safe deposit box (step 302). The safe deposit box requires two keys to be opened, a key held by the user and a key held by the bank. To gain access to the assigned safe deposit box, the user inserts the key into the appropriate lock (step 303). If the proper key is inserted, the tumbler turns and the latch is disengaged (step 304). The bank employee then inserts the bank key into the second lock and the box is opened (step 305).

In an embodiment according to the invention, an analogous process occurs. The dashed-line arrows in FIG. 3 indicate analogous steps. The data owner authenticates to the registrar using a government issued ID (step 311). Once authenticated, the registrar provides the data owner with a User ID and a USB key having a serial number. To gain access to the data owner's information, the user information is sent to the master locksmith (step 312). If the user information is proper, that is the master locksmith is able to verify the User ID and receives an appropriate response from the USB key when queried (step 313), the master locksmith provides an "unlatch" code in the form of a part of an encryption key (step 314). The master portal which is similar to the bank employee, opens a valid session and uses the encryption keys from the USB device and the master locksmith to fully decrypt the data owner's information (step 315).

The operation of the master portal system will now be discussed in more detail. As described above, in step 311 the data owner authenticates to the registrar using a government issued ID and once authenticated, the registrar provides the data owner with a User ID and a USB key having a serial number. The serial number may be printed on the physical USB device and may be stored electronically on the device. In one embodiment, in the initial sign-on to the master portal, the data owner enters the last four digits of the USB device's serial number so that the system may verify that the device has not been reprogrammed. In one embodiment, the USB device stores half of the encryption information needed for the master portal to decrypt the data owner's information. In other embodiments, the USB device may store more or less of the encryption information, but not all of the encryption information. If the master portal recognizes the USB device serial number, the master portal prompts the data owner for the assigned username. If the master portal receives the proper username, the master portal passes on login to the USB validation process.

In step 312, the user information is sent to the master locksmith. In one embodiment, the master locksmith must be available on a 24×7 basis. In different embodiments, the master locksmith may be external or may be a "black box" algorithm stored on the master portal. Next in step 313, the master locksmith verifies the User ID and the response from the USB key when queried. If the information is verified in step 313, in step 314, the master locksmith provides an "unlatch" code in the form of the remaining part of the decryption information. In one embodiment, the master locksmith sends half of the encryption key missing from the USB device's key. The master portal then opens a valid user session and uses the encryption keys from the USB device and the master locksmith to fully decrypt the data owner's information in step 315. In one embodiment, to perform this step, the master portal combines the key information from the user's USB device and the master locksmith and then prompts the user for their password. The user's password is then encrypted and compared to the stored encrypted password. If the two encrypted passwords match, the master portal then opens a valid user session. Once the user session is opened, all of the metadata stored on the master portal is available in decrypted form and a function launches in the background to update the metadata links. In one embodiment, the master portal controller uses a pre-fetch search algorithm to find and store the meta-data links which runs in the background.

In the embodiment described above, the user data owner is provided with a USB device. However other physical "User Verification Devices" may be used. The user verification device could be an RSA like key, or one that includes a physical trait verifier such as a fingerprint or iris scan. By adding the physical trait, the security is increased to a three-factor security verification. In other embodiments, the decryption could be performed differently, but always using information from the master locksmith 110 and either the data owner/requestor or corresponding gateway. As described above, in one embodiment, the master portal uses the decryption information from the master locksmith and the data owner. The master portal may use the decryption information from the master locksmith in a first stage decryption and then use the information from the data owner as a second stage decryption. The master portal may also reverse the order in which the information is used. Finally, the master portal may combine the information from the two sources and then decrypt the appropriate information. In another embodiment, the master portal may perform a decryption operation using the information from the master locksmith and then pass the partially decrypted information to the data owner/requestor for the data owner/requestor computer to complete the decryption. These are just examples of how the decryption information from the two sources may be used. Many other combinations of entities performing decryption and the order of the decryption may be used as well.

Authentication systems are often categorized by the number of factors that they incorporate. The three factors often considered as the cornerstone of authentication are:

Something you know (for example, a password)
Something you have (for example, an ID badge or a cryptographic key)
Something you are (for example, a thumb print or other biometric data)

Different embodiments of the invention utilize different combinations of these factors.

An analogy for how a data owner provides data access to others in the master portal system is a hotel in which each room has a master key owned by the hotel and a separate key that is provided to the guest. In this analogy, the data owner is the hotel and the "guests" are the entities to which the data owner desires to provide access to particular information. The "rooms" are similar to the different data repositories. The data owner may provide access to specific information by providing the entity with a "key" to a particular "room".

A second analogy for how a data owner provides data access to others in the master portal system is a locked file cabinet and locked file drawers. In this analogy, the data owner has access to all the drawers in the file cabinet and may grant access to other entities to view only certain drawers.

Registration with Master Locksmith

Figure 4A:
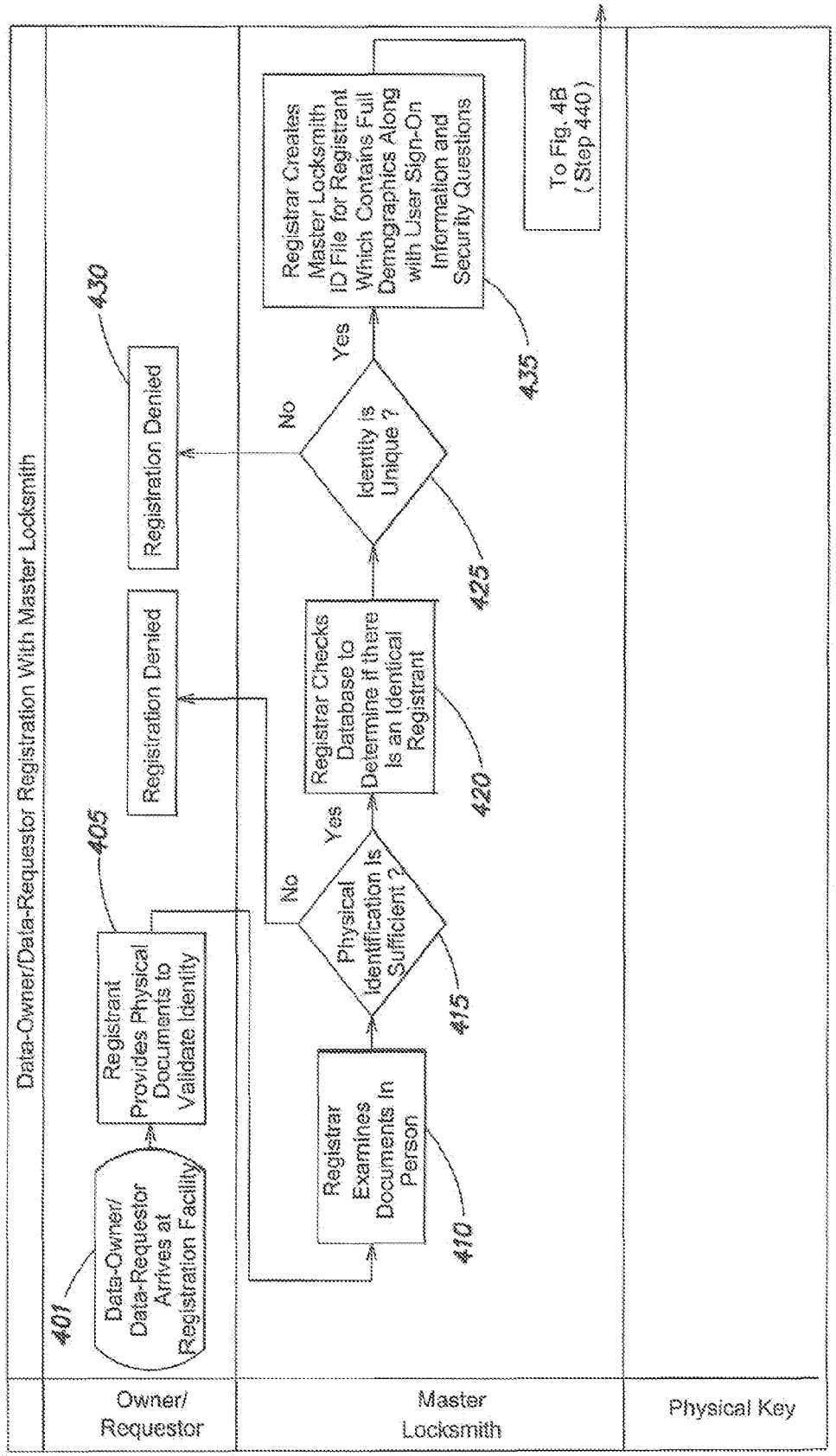
FIGS. 4A and 4B are a flowchart representation of an embodiment of a method for registering with the master locksmith.
Figure 4B:
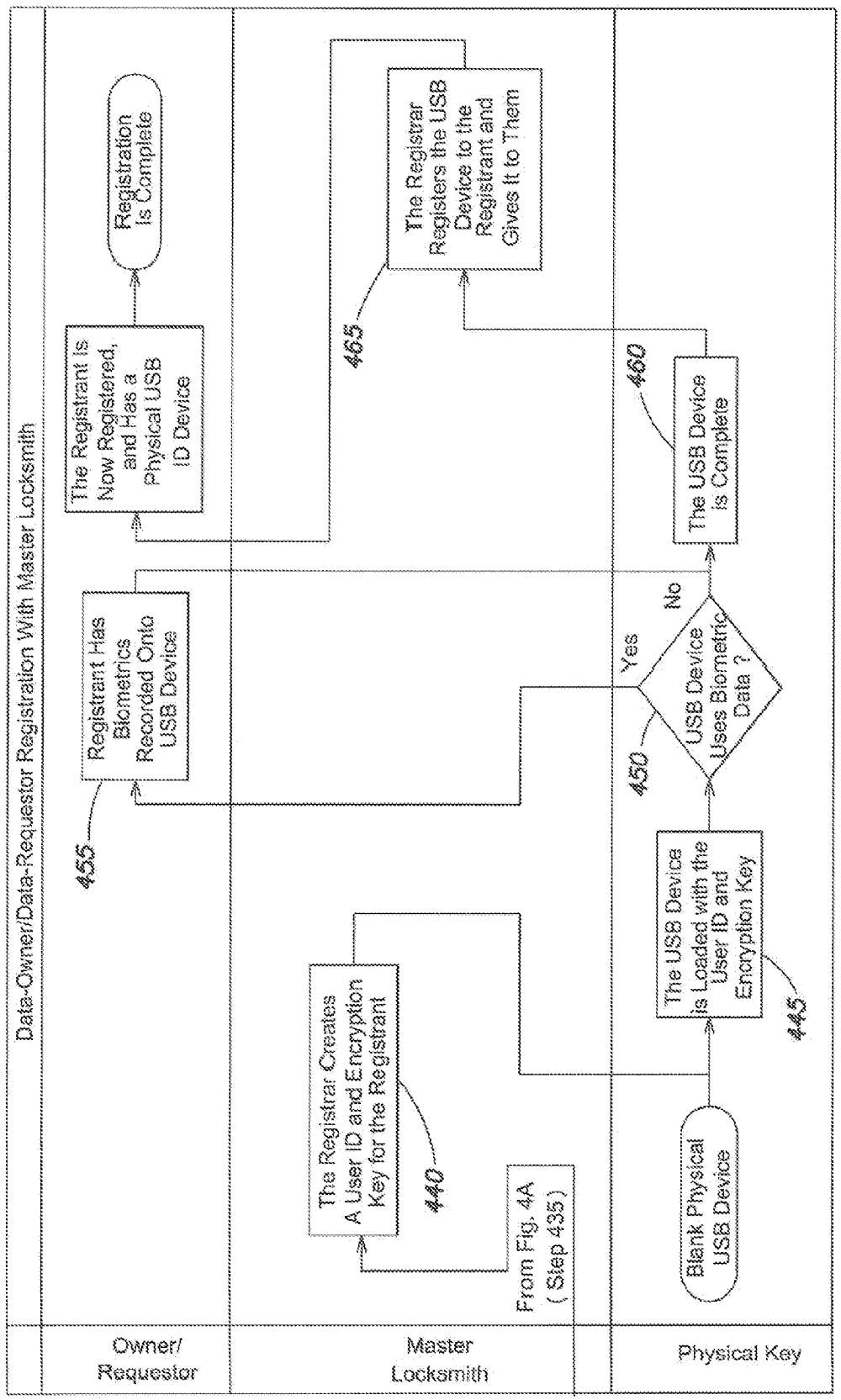
Figure 5A:
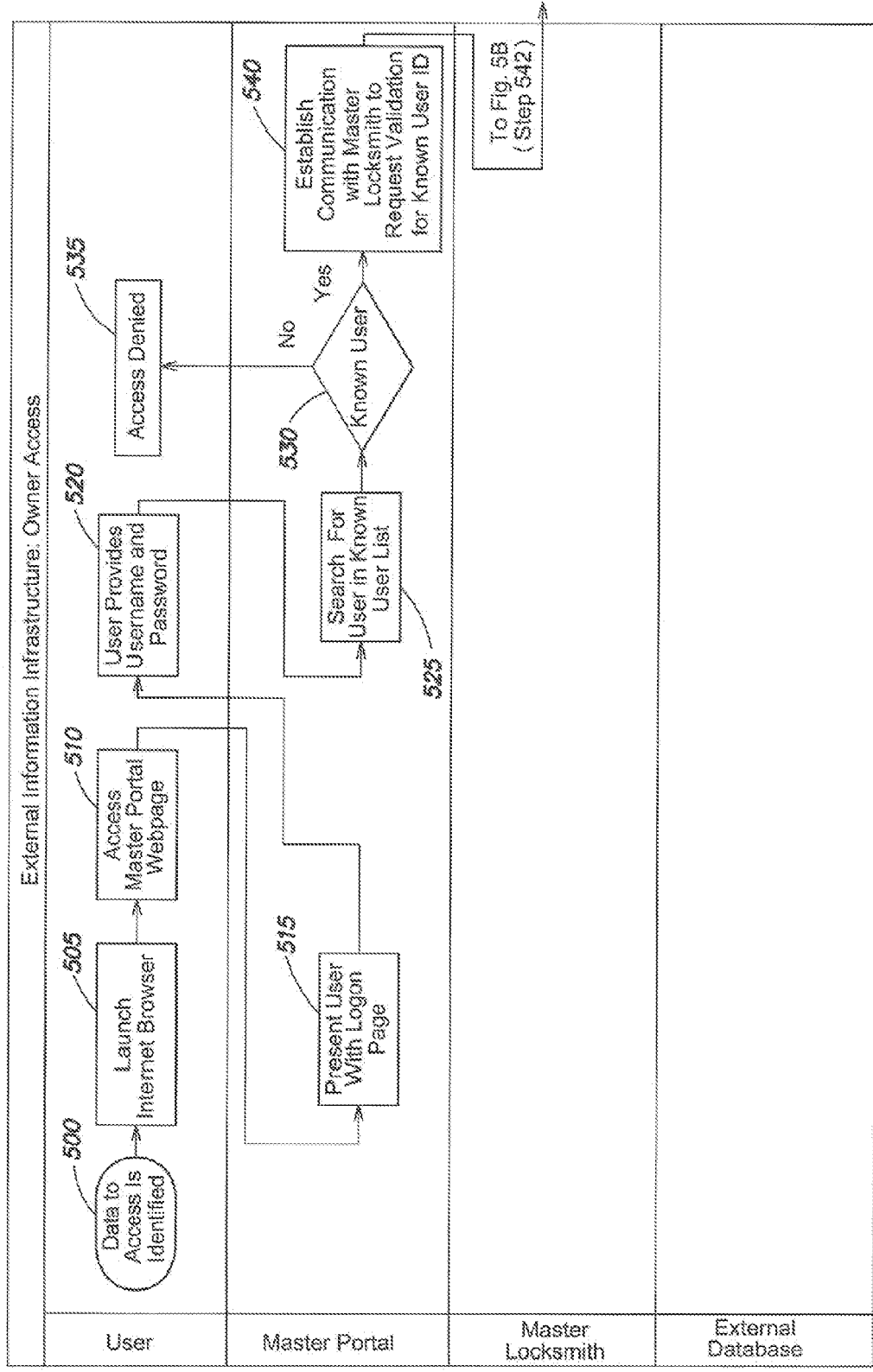
FIGS. 5A-5D are a flowchart representation of an embodiment of a process for authenticating a user data owner.
Figure 5B:
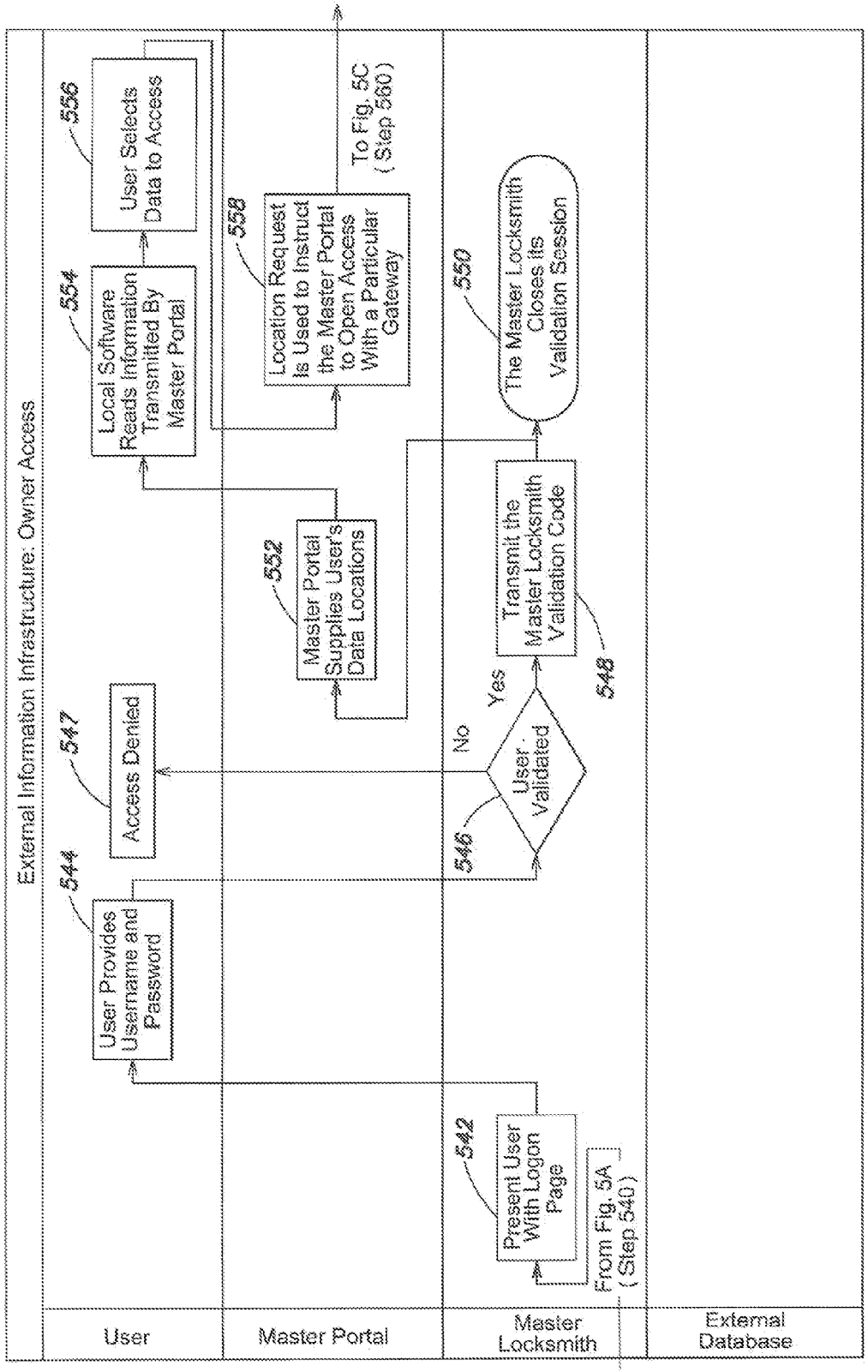
Figure 5C:
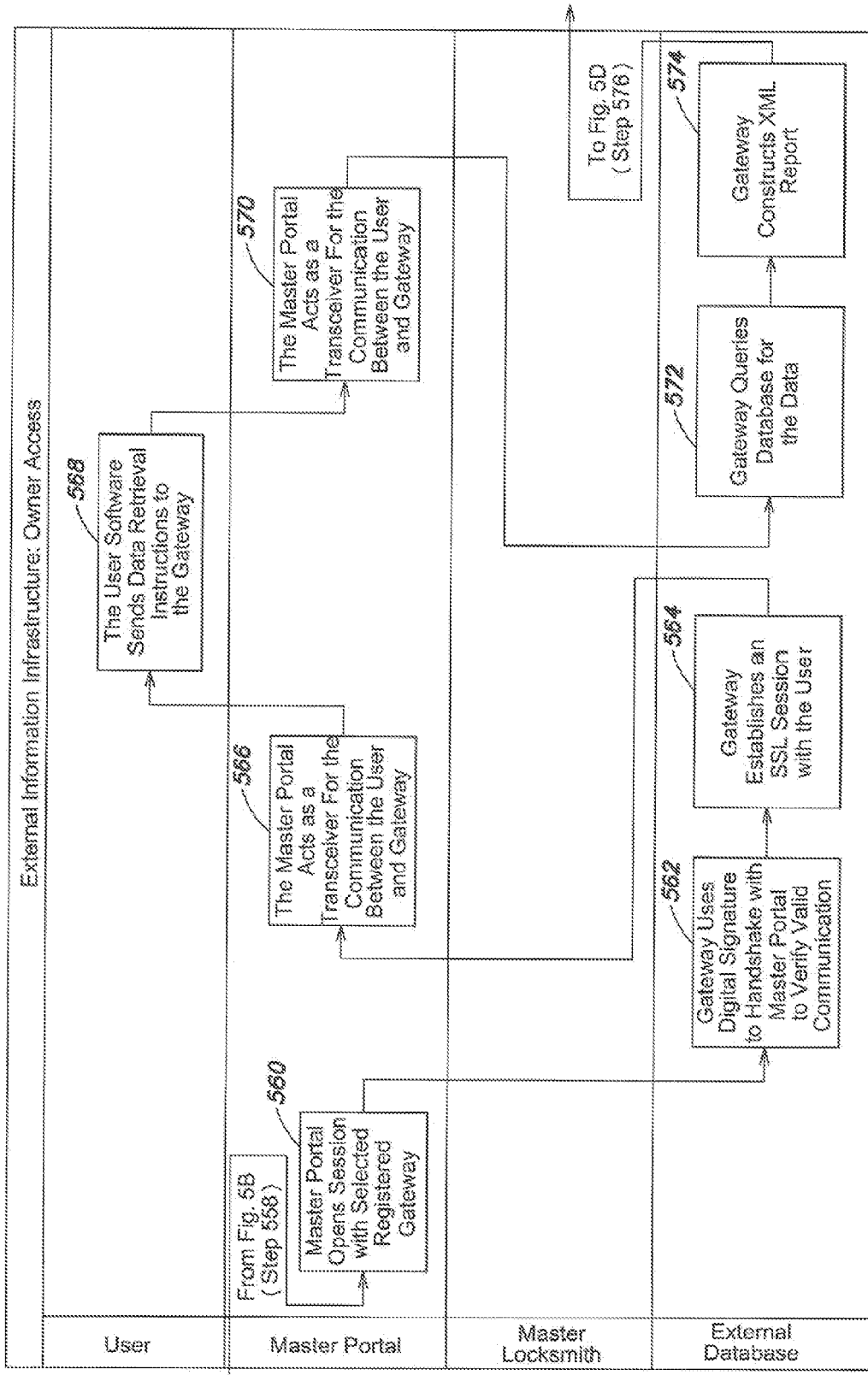
Figure 5D:
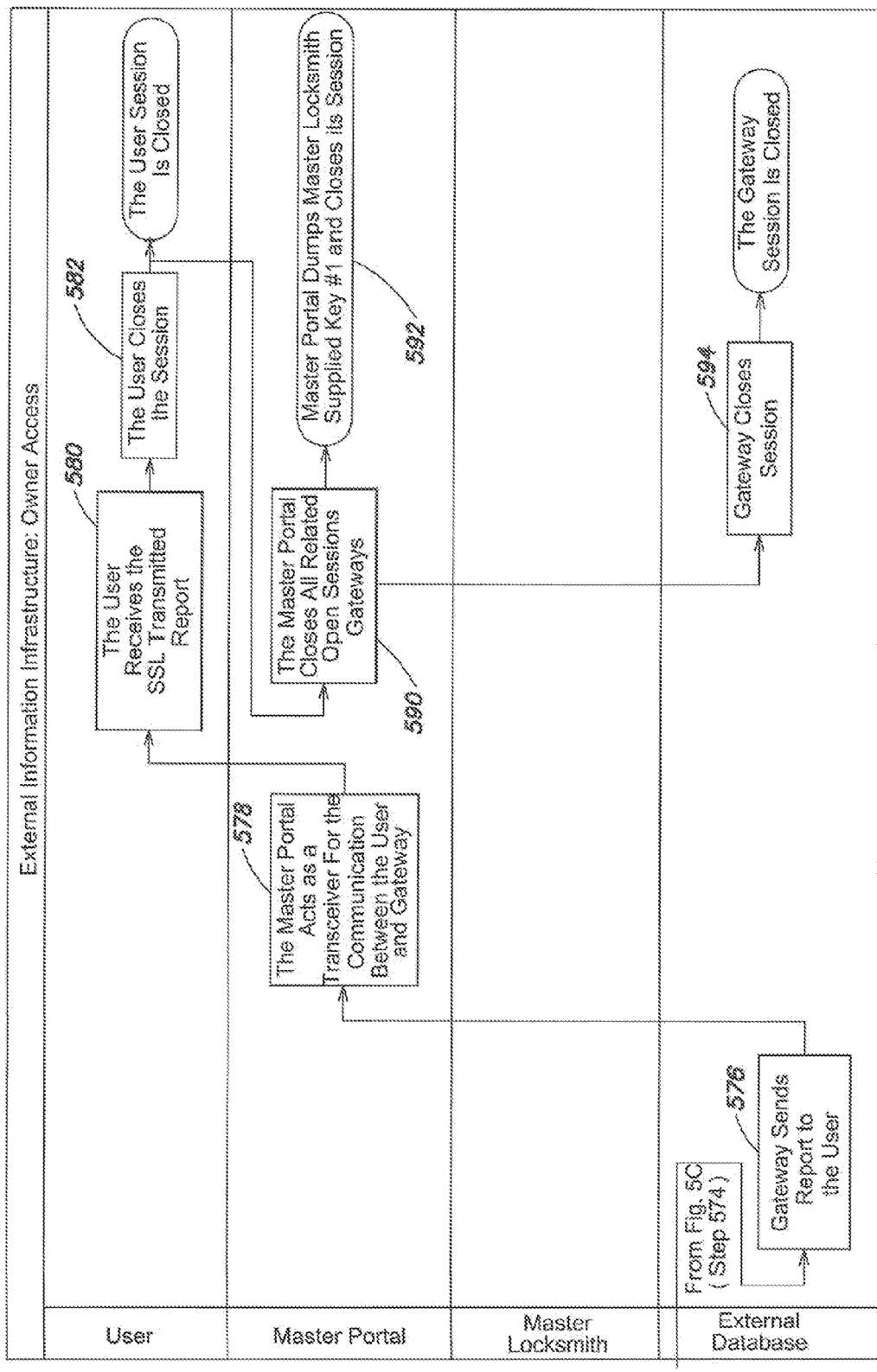

Referring to FIGS. 4A and 4B, an embodiment of a method for registering with the master locksmith 110 is shown. In step 401, to register, the user data owner 145 arrives at a registration facility. The registration facility may be any facility appropriate for registering the data owner. In the health care scenario described above, the registration facility may be a doctor's office or an insurance provider's office. In the business operation scenario described above, the individual entities may have specific personnel, such as human resources personnel or IT personnel, dedicated to performing the function of the registration facility.

Next, in step 405, the registrant provides documents sufficient to authenticate the registrant's identity. The number and type of documents sufficient to authenticate a registrant may depend upon the type of information being protected. Examples of documentation include driver's licenses and passports. Other types of documentation traditionally used for identification may be acceptable as well. In step 410, the registrar examines the documents provided by the person requesting registration and determines if the documentation is sufficient in step 415. If the documentation is not sufficient, the register denies the request for registration.

If the registrar determines that the documentation is sufficient to authenticate the individual, the registrar checks the master locksmith database to determine if the database already contains an identical registrant in step 420. If the registrar determines that the database already contains an identical registrant in step 425, the registrar denies the registration request in step 430. In one embodiment, the registrar may perform additional steps to determine if the registrants are identical, or if the registrants only share some common information, such as name. When the registrar determines that there is no identical entry in the database, in step 435 the registrar creates a master locksmith identification (ID) file for the registrant. In one embodiment, the ID file contains the questions to query the registrant should the registrant forget their full sign-on information.

In step 440, the registrar creates a user identifier and an encryption key for the registrant. The user identifier and encryption key are then stored on a USB device or other device capable of storing electronic information in step 445. In steps 450 and 455, the registrar may optionally store the registrant's biometric information on the USB device if the device is capable of utilizing biometric information. After the device is loaded with the user identifier, encryption key and biometrics (optional), the USB device set up is complete in step 460. The registrar then registers the USB device with the master locksmith and gives the USB device to the registrant in step 465. Registration is now complete.

Process for Authenticating the Data Owner

Referring now to FIGS. 5A-5D, an embodiment of a process for authenticating a data owner 145 is shown. In step 500, the data owner 145 identifies the data to be accessed. For example, in the health care scenario described above, the data owner 145 may desire to access the records stored at their primary care physician's office. Next, in step 505, the data owner launches an internet browser on the data owner computer 135. Once the browser launches, the data owner 145 accesses the web page of the master portal 105 in step 510. The master portal 105 presents the data owner 145 with a logon page in step 515 and in step 520, the data owner 145 responds by providing the assigned user identifier and password. Next, in step 525, the master portal 105 searches for the provided username in its database of registered users. If the username provided by the data owner 145 does not match one of the known users in step 530, then then master portal denies access in step 535. If the username provided by the data owner 145 matches one of the known users in step 530, then the master portal 105 proceeds to step 540 and establishes communication with the master locksmith 110 in order to request validation of the known user identifier.

The master locksmith then presents the data owner 145 with a user login page in step 542. In response, in step 544, the data owner 145 provides the data owner's user identifier and password. If the master locksmith cannot validate the data owner 145 in step 546, the master locksmith denies access to the data owner in step 547. If the master locksmith 110 validates the user in step 546, then the master locksmith 110 transmits the master locksmith validation code to the master portal 105 in step 548 and closes its validation session in step 550. Next, in step 552, the master portal 105 supplies the data owner 145 with the locations storing data for that data owner 145. Local software operating on the data owner computer 135 reads the information transmitted by the master portal in step 554 and in step 556 the data owner 145 selects which data to access.

The location request made by the data owner 145 in step 556 is used by the master portal 105 in step 558 to open access with a particular gateway 140. Once the master portal 105 has established a session with a selected registered gateway 140 in step 560, the gateway 140 uses digital signature technology to perform a handshake with the master portal 105 and verify valid communication in step 562. Once verified, the gateway 140 proceeds to step 564 and establishes a secure communication session, such as an SSL session, with the data owner computer 135. The master portal 105 acts as a transceiver for the communication between the data owner computer 135 and the gateway 140 (step 566). In step 568, the software executing on the data owner computer 135 sends data retrieval instructions to the gateway 140 via the master portal 140. Next, the gateway 140 queries the database 120 for the data requested by the data owner 145. In one embodiment, the gateway 140 constructs an XML report (step 576). In other embodiments, the gateway controller system generates an information based report in a format designed for hypertext reports or information display, such as XML reports, rather than data transfer between peers. The gateway 140 then sends the requested data to the data owner 145 via the master portal 105. The data owner computer 135 receives the transmitted data via the secure communications channel in step 582 and then the data owner 145 closes the session.

In response to the data owner 145 closing the secure communications session, the master portal 105 closes all related open sessions and gateways in step 590. The master portal 105 also deletes the master locksmith supplied key and closes its session in step 592. Finally, the gateway 140 closes its session in step 594.

Process for Authenticating the Data Owner with Hardware Validation

Figure 6A:
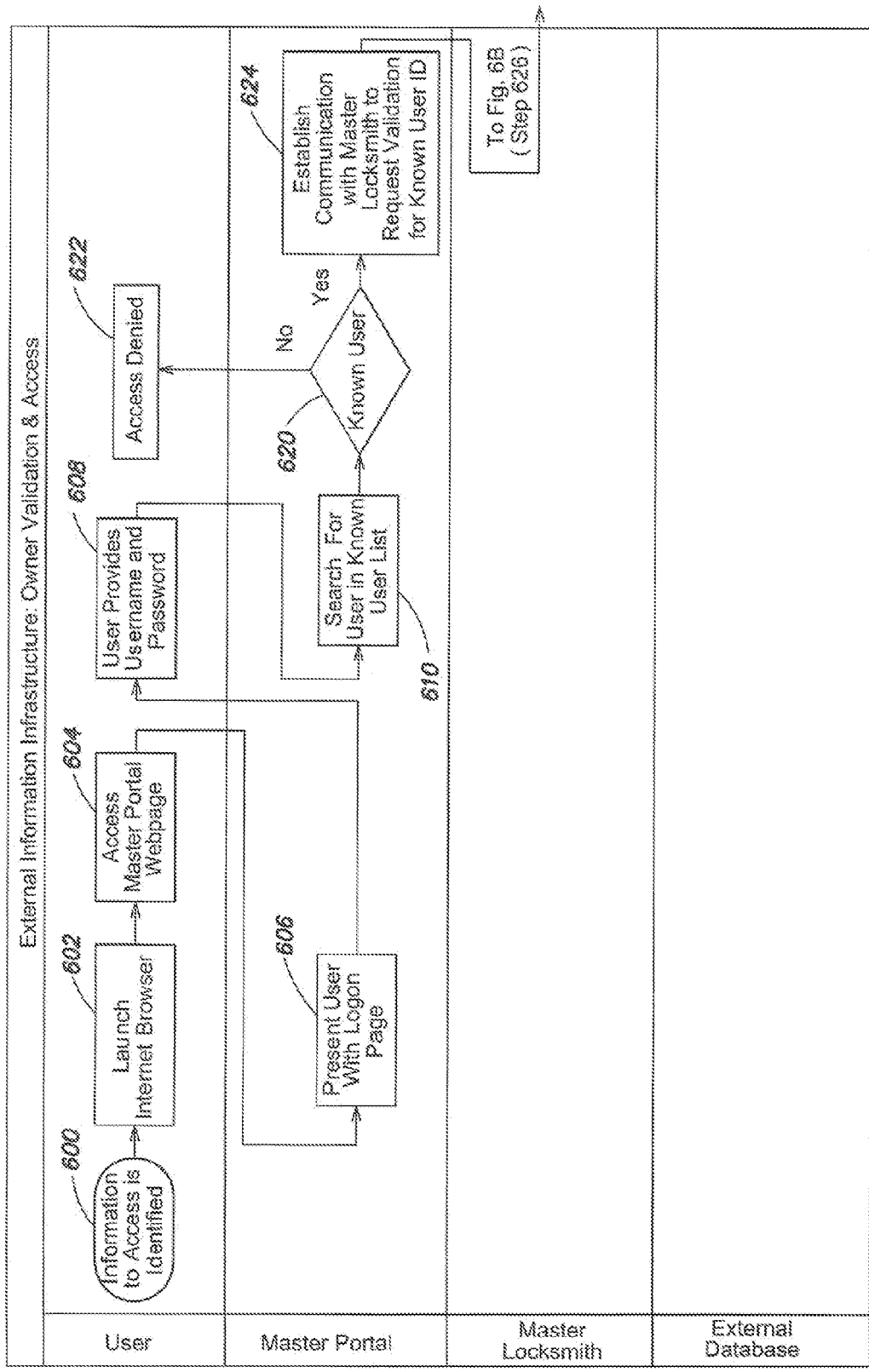
FIGS. 6A-6F are a flowchart representation of an embodiment of a process for authenticating a data owner with hardware validation.
Figure 6B:
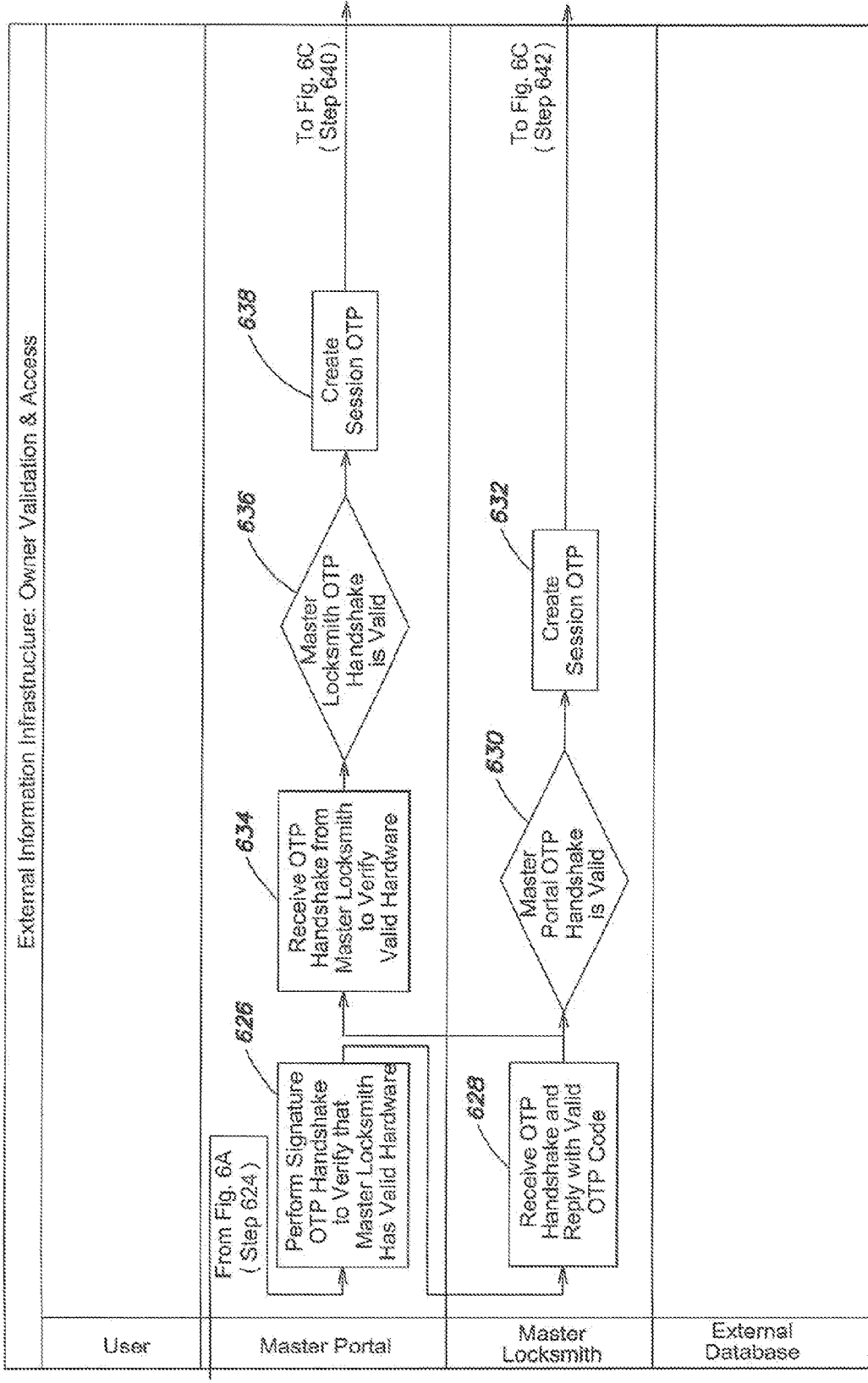
Figure 6C:
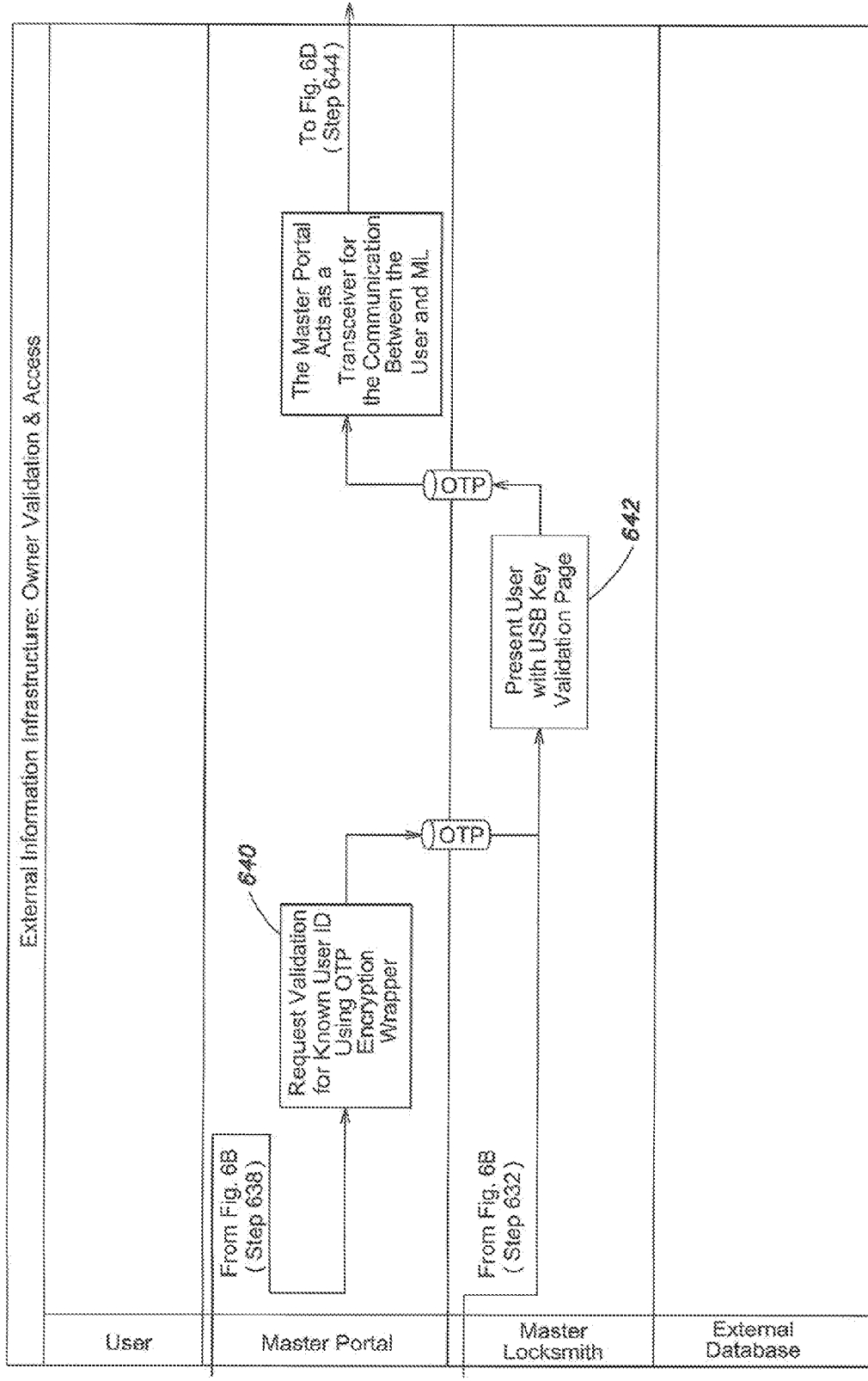
Figure 6D:
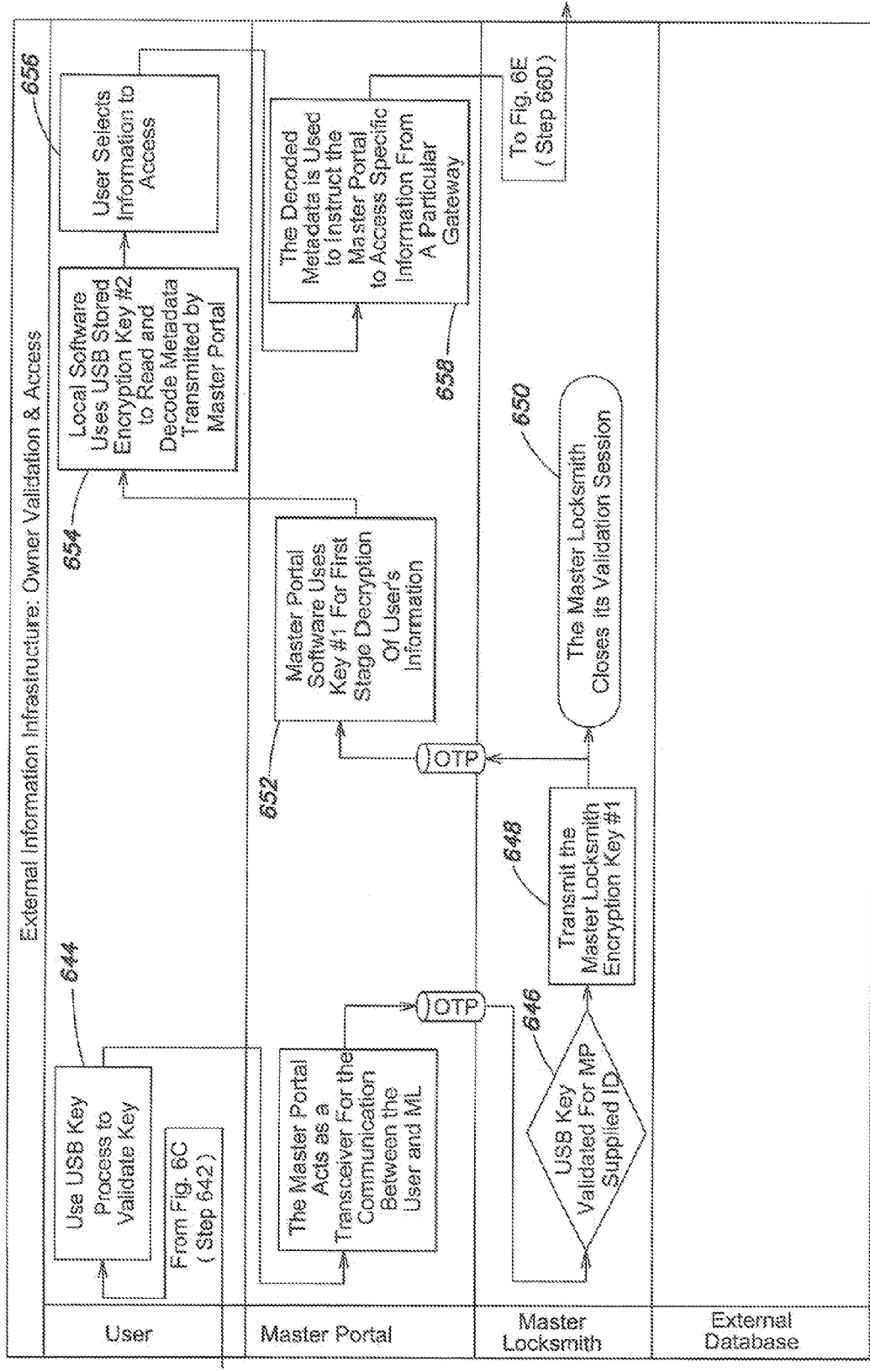
Figure 6E:
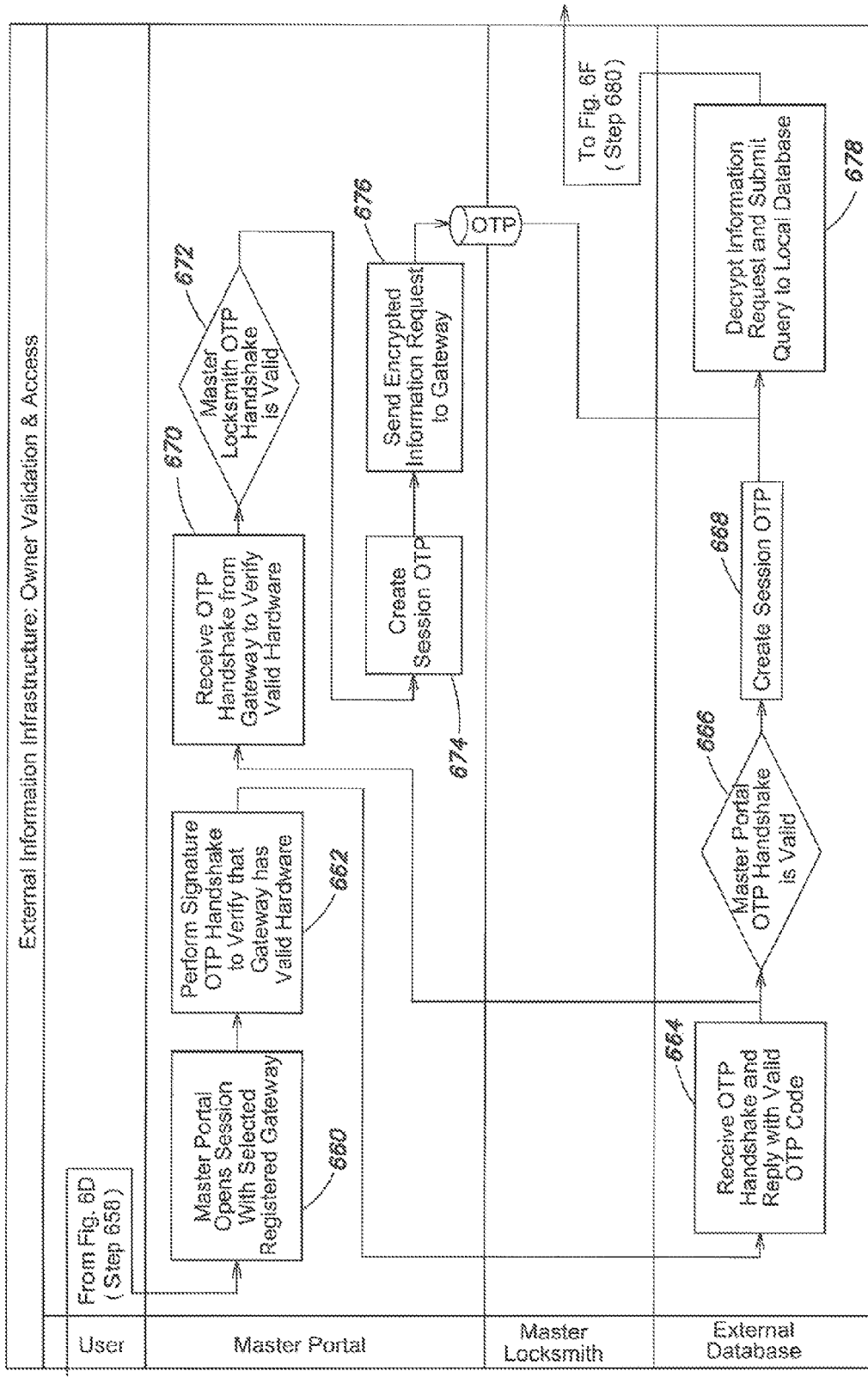
Figure 6F:
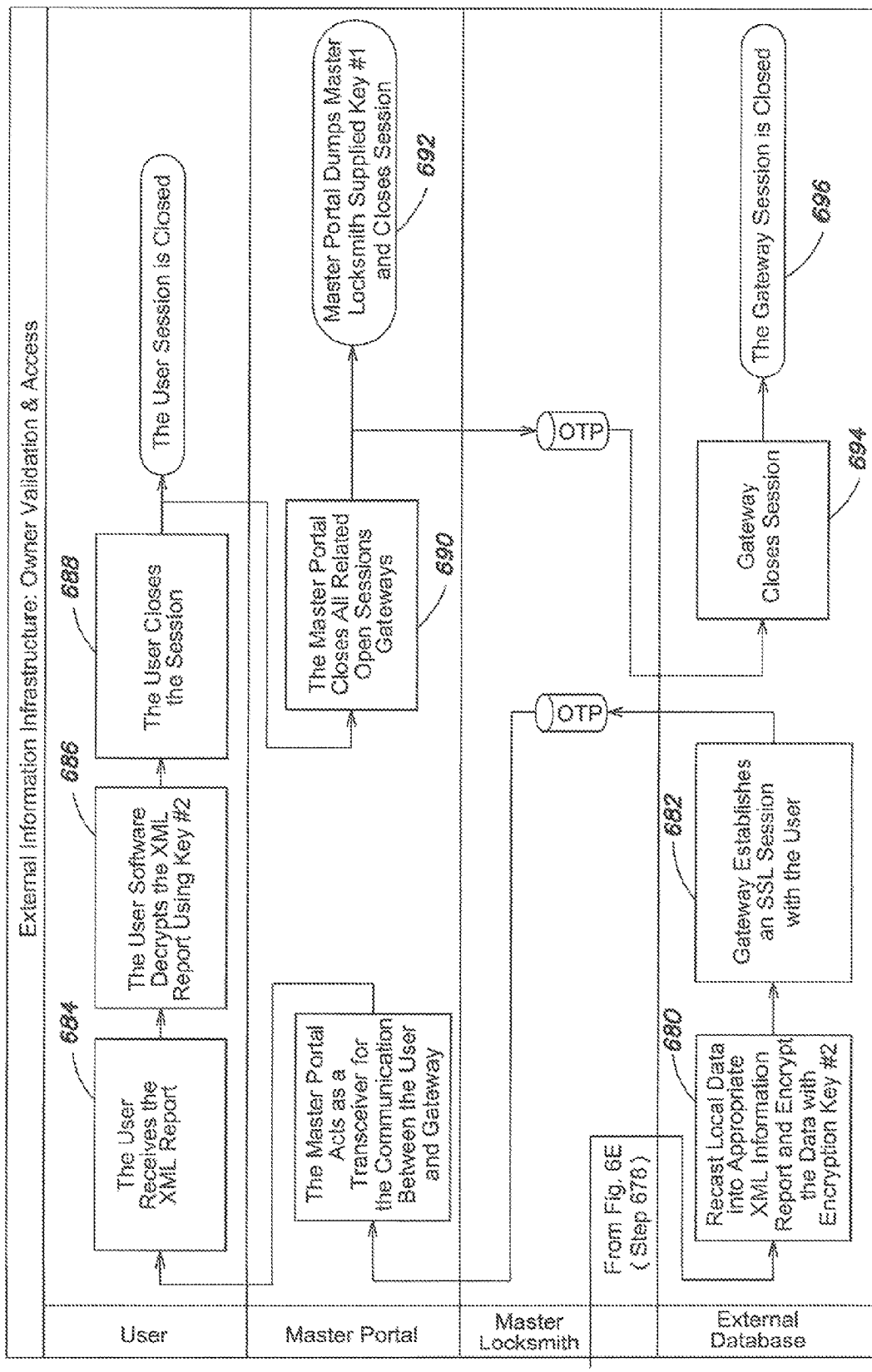

Referring now to FIGS. 6A-6F, an embodiment of a process for authenticating a data owner with hardware validation is shown. The initial steps in the process shown in FIG. 6A are similar to the steps performed in FIG. 5A. After the master portal 105 establishes communication with the master locksmith in step 624, the methods of FIGS. 5A-5D and 6A-6F diverge. Referring to FIG. 6B, the master portal 105 initiates a one-time-pad (OTP) handshake to verify that the master locksmith 110 has valid hardware in step 626. The master locksmith 110 receives the OTP handshake request in step 628 and replies with a valid OTP code. If the master portal OTP handshake is valid in step 630, the master locksmith 110 creates a session OTP in step 632.

At the same time, the master portal 105 receives the OTP handshake from the master locksmith 110 in step 634 and if the master portal 105 determines that the master locksmith OTP handshake is valid in step 636, the master portal 105 also creates a session OTP in step 638. Next, the master portal 105 requests validation for a known user identifier using an OTP encryption wrapper in step 640. The OTP symbol in the figures is used to denote that a secure hardware One-Time-Pad encryption is being used for internet transmissions.

The master locksmith 110 presents the data owner 145 with a USB key validation page in step 642 via the master portal 105, which acts as a transceiver for the communication between the data owner computer 135 and the master locksmith 110.

In step 644, the data owner 145 connects the USB device to the data owner computer 135, which in turn transmits the USB key to the master locksmith 110 via the master portal 105. If the master locksmith validates the USB key for the master portal-supplied identifier in step 646, the master locksmith 110 transmits a first encryption key to the master portal 105 in step 648 and closes its validation session in step 650. In one embodiment, the master portal 105 uses the first encryption key from the master locksmith 110 for a first stage decryption of the data owner's information in step 652 and transmits the first stage-decrypted information to the data owner's computer 135. In step 654, the data owner's computer 135 uses a second encryption key previously stored on the data owner's USB device to decrypt the metadata transmitted by the master portal 105. Next, in step 656, the data owner 135 selects which information to access. The master portal 105 uses the decoded metadata from the data owner computer 135 to access the requested information from a particular gateway 140 in step 658.

To access the data, the master portal 105 opens a session with the selected registered gateway 140 in step 660 and initiates OTP handshake to verify that the gateway has valid hardware in step 662. The database 120 receives the OTP handshake request and replies with a valid OTP code. If the database 120 determines that the master portal 105 handshake is valid in step 666, the database creates a session OTP. Similarly the master portal 105 receives the OTP handshake from the gateway to verify the validity of the hardware in step 670. If the gateway OTP handshake is valid in step 672, then the master portal 105 creates a session OTP in step 674 and sends an encrypted information request to the gateway 140 in step 676. In step 678, the gateway 140 decrypts the information request from the master portal 105 and submits the query to the local database 120.

Next, the database 120 recasts the requested information into an appropriate format and encrypts the data with the second encryption key in step 680 and the gateway 140 establishes an secure communications session with the user computer 135 in step 682 via the master portal 105. The user computer 135 receives the report in step 684 and decrypts the report using the second encryption key. Once the user 135 has the decrypted data, the user closes the session in step 688. Similarly, the master portal 105 closes all related open sessions and deletes the first encryption key in steps 690 and 692 and the gateway 140 closes its session in step 694.

Process for Authenticating a Data Requestor Other than the Data Owner

Referring now to FIGS. 7A-7H, an embodiment of a process for authenticating a data requestor other than the data owner 145 is shown.

In one embodiment of the invention, the master portal 105 temporarily has access to the master locksmith key while the session is active. In this embodiment, if a data thief could gain control of the master portal, they could possibly get one of the two encryption keys required to decode a particular individual's metadata stored on the master portal. For the highest level of security, it is possible to have the master locksmith do all of the encoding/decoding at its location, and then use a security protocol, such as SSL, to send the partially-decoded metadata to the requesting gateway for additional decryption. The result of this process is that the master locksmith's encryption key is never shared with anyone else, including the data owner, master portal and gateway.

Figure 7A:
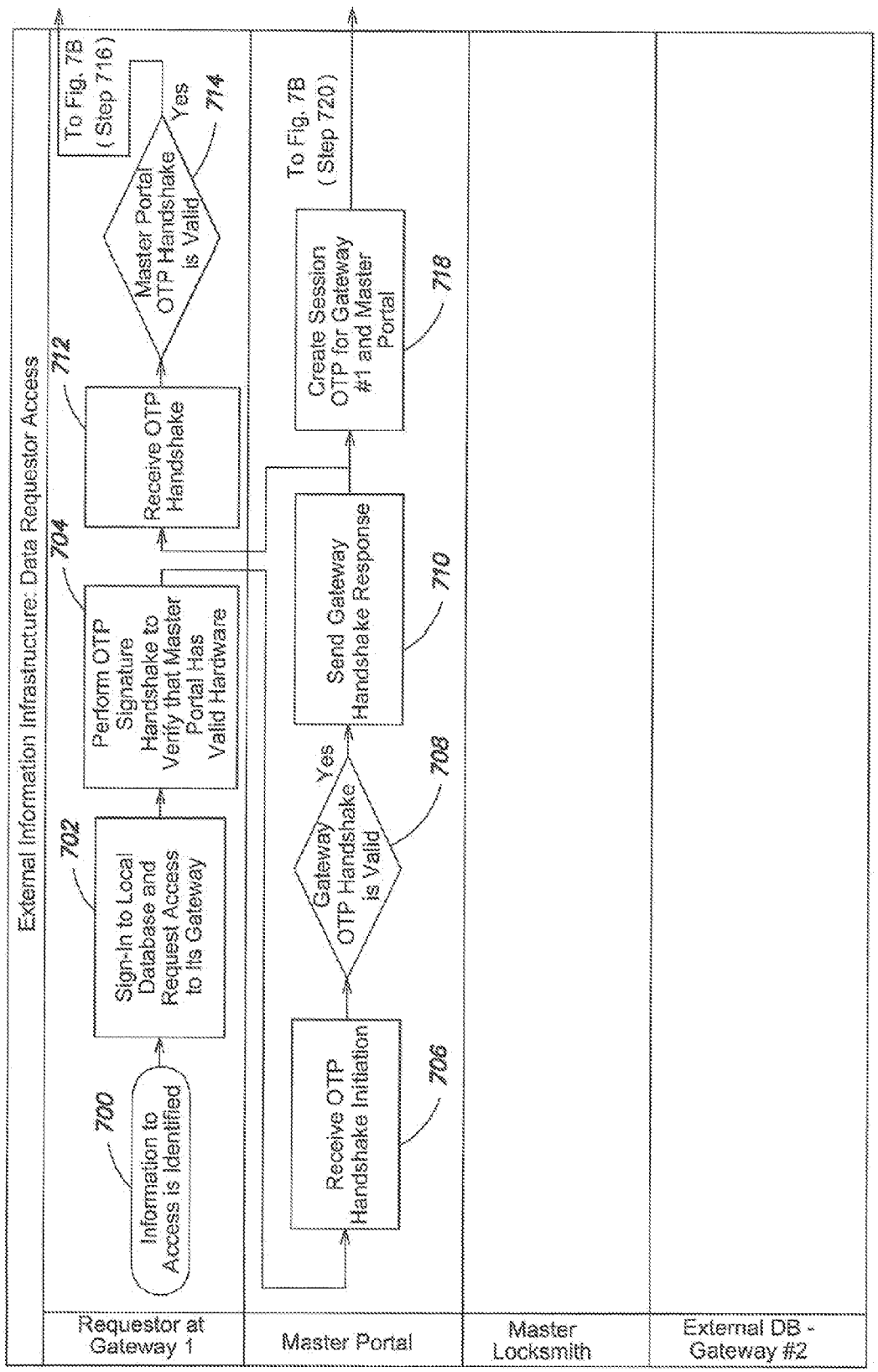
Figure 7B:
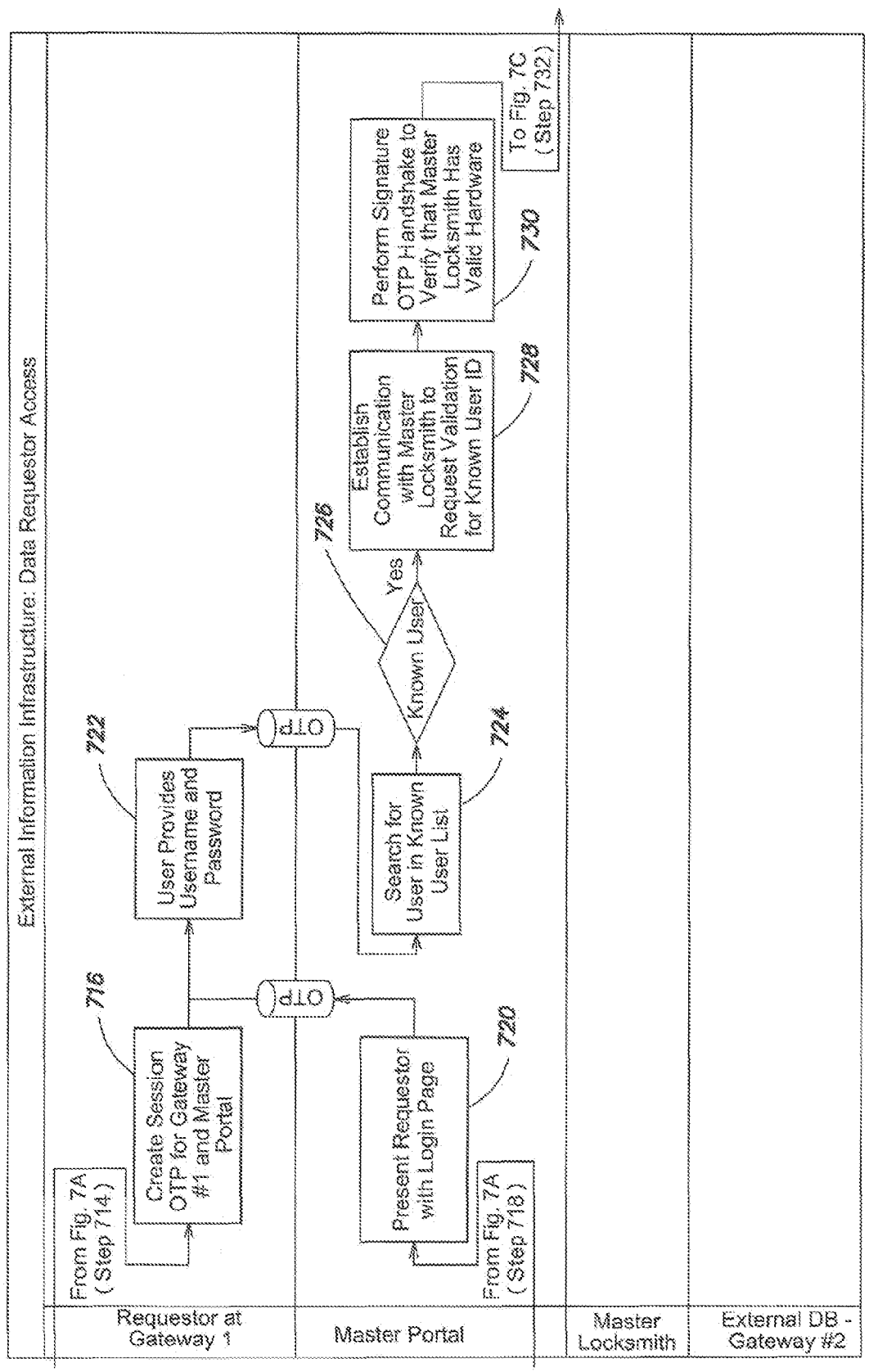
Figure 7C:
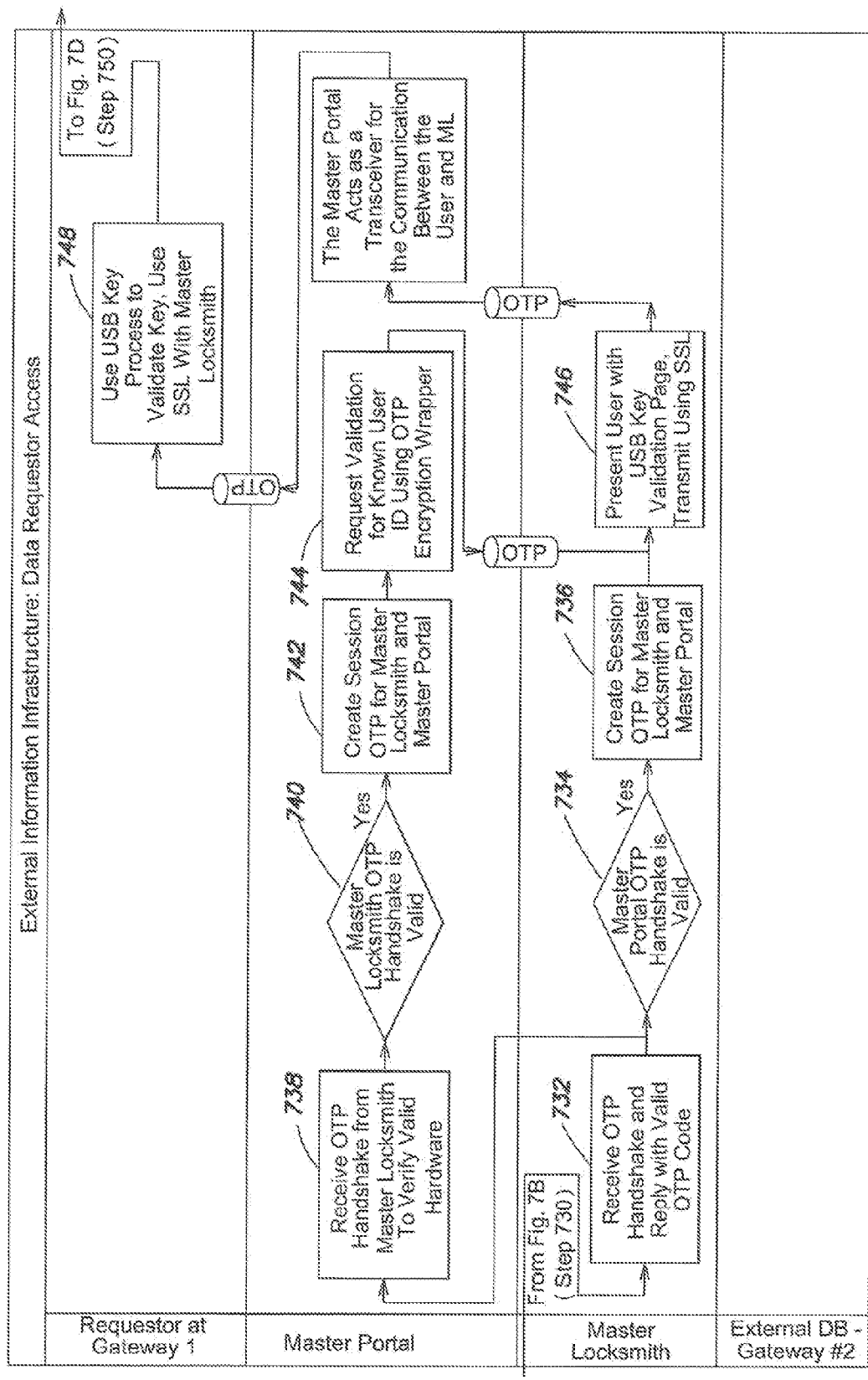
Figure 7D:
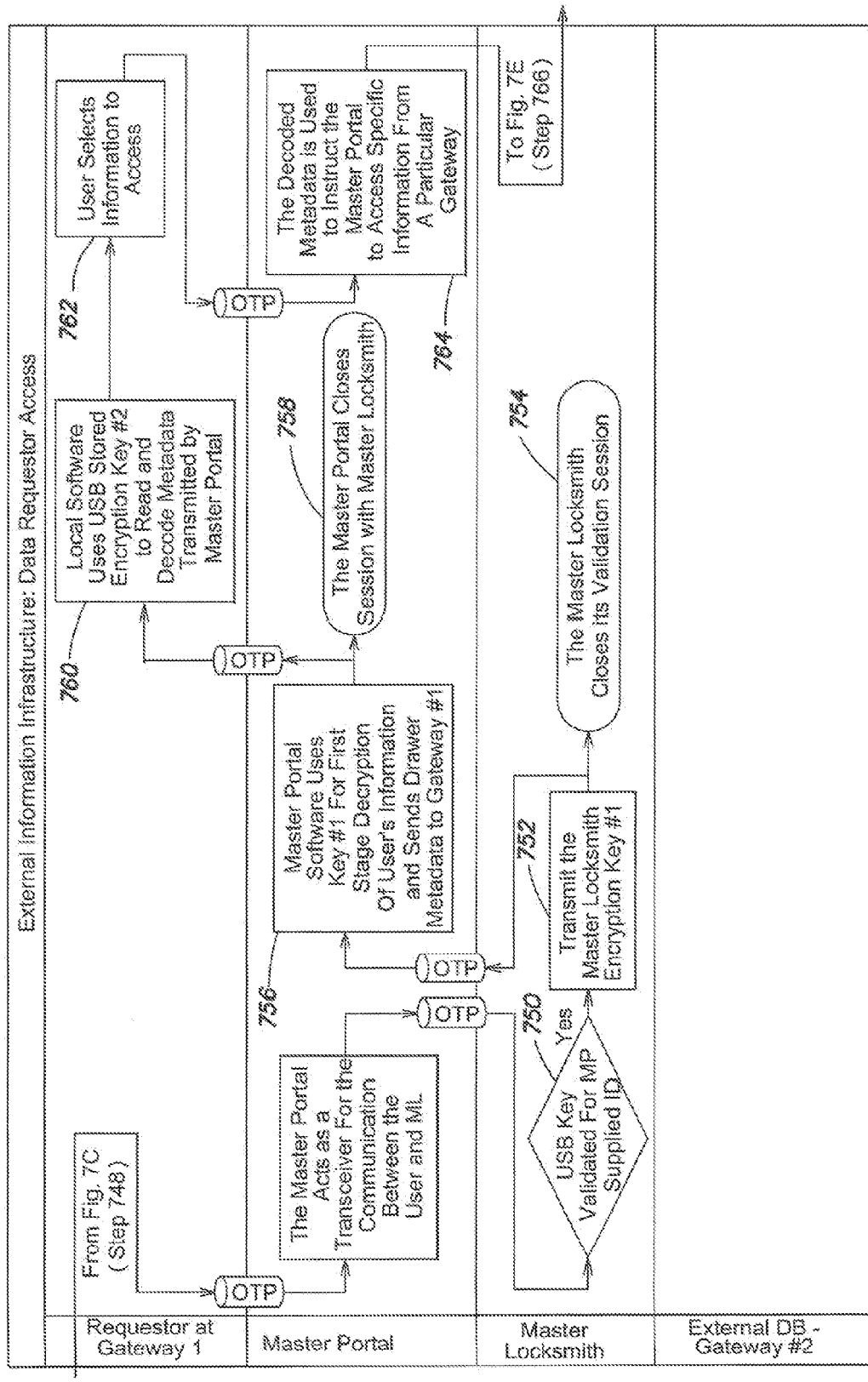
Figure 7E:
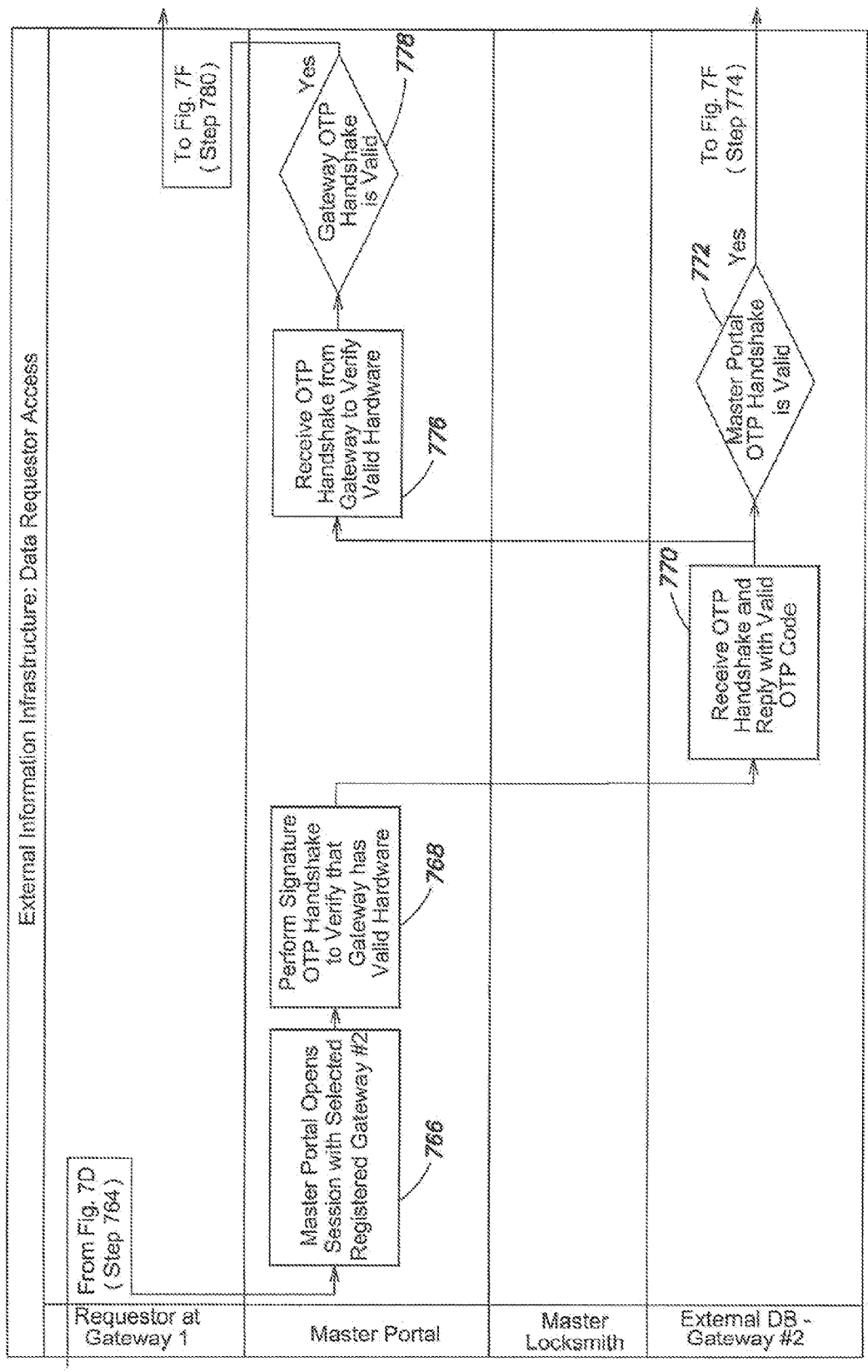
Figure 7F:
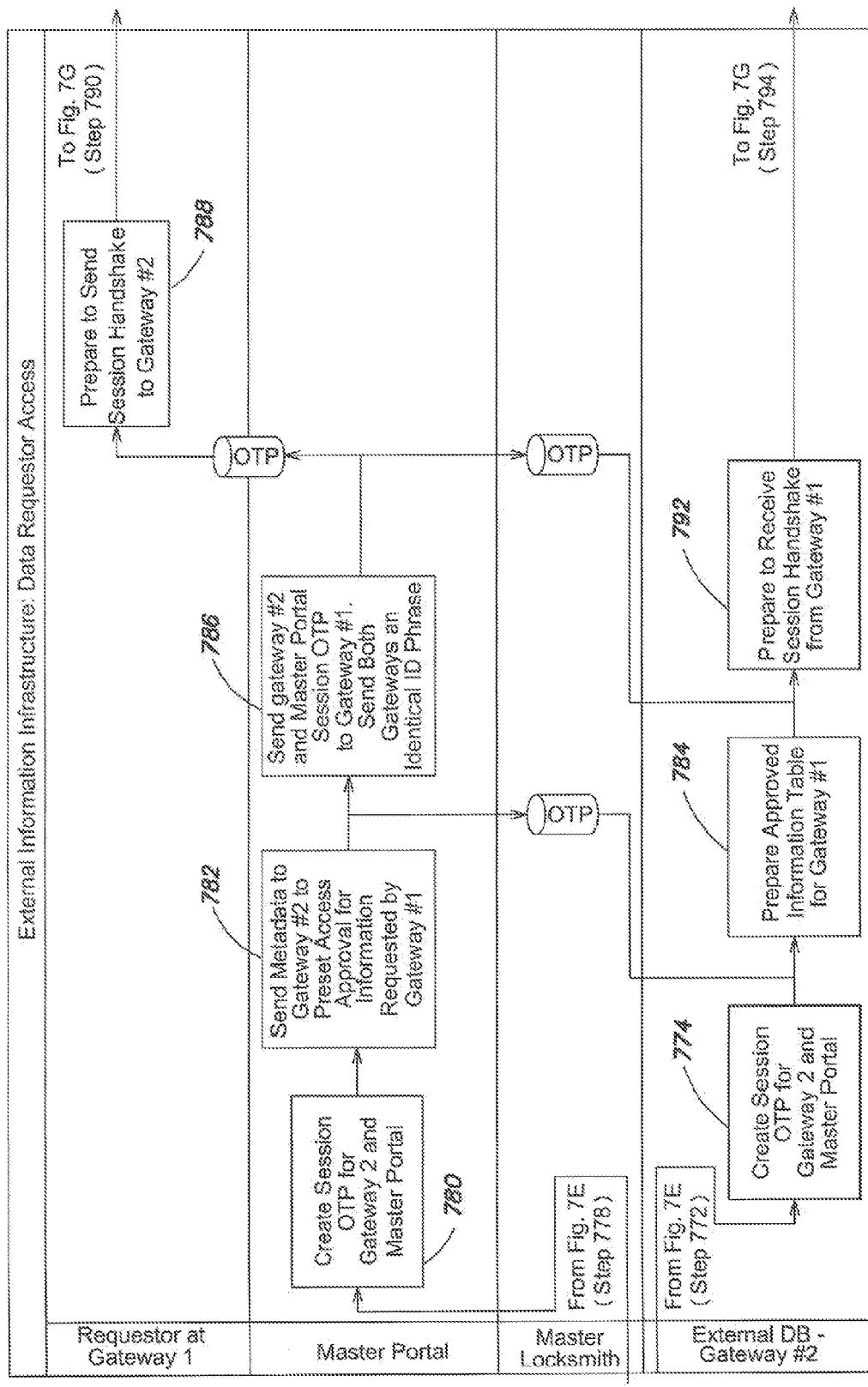
Figure 7C:
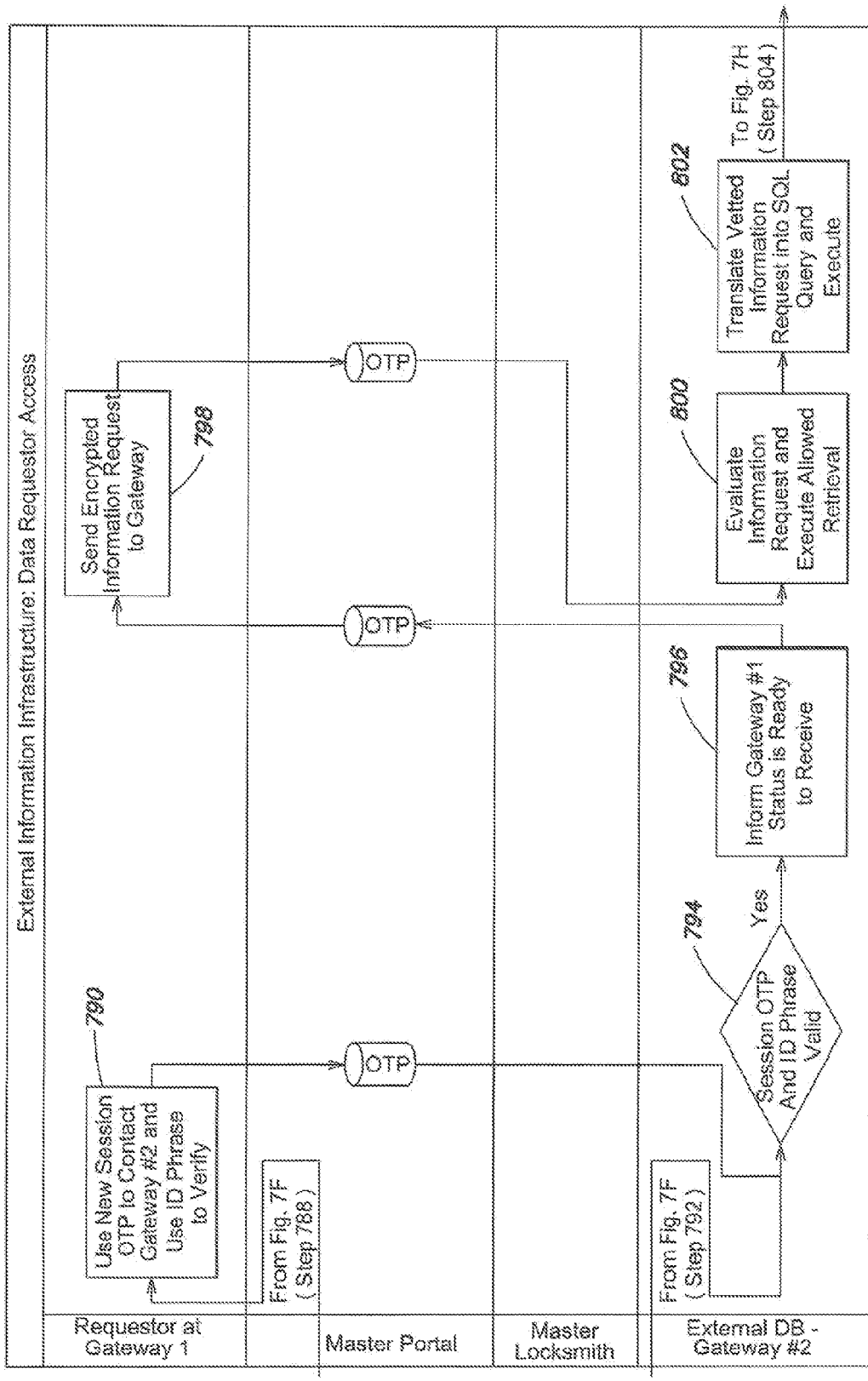
Figure 7H:
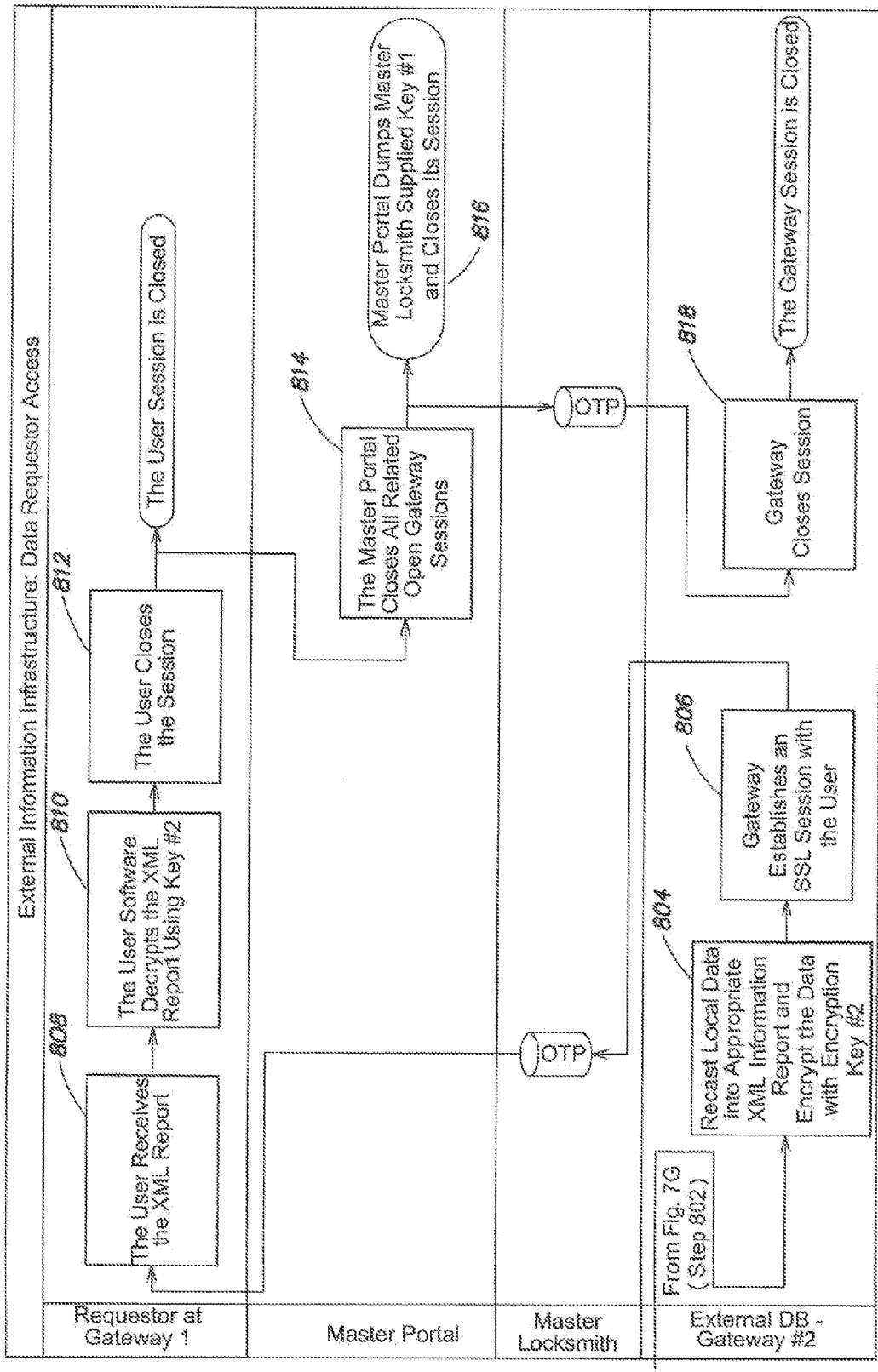

Referring now to FIG. 7A, in step 700, the information requestor located at one of the gateways 140 identifies the information the requestor desires to access. Next in step 702, the requestor authenticates to the local database 120 and requests access to the gateway 140 associated with the local database 120. In certain embodiments, each of the local databases 120 has its own authentication procedure. The data user computer 125 being used by the requestor performs an OTP signature handshake with the master portal 105 to verify that the master portal 105 has valid hardware in step 704. The master portal 105 receives the OTP handshake initiated by the requestor and determines if the gateway's OTP handshake is valid in steps 706 and 708, respectively. If the master portal 105 determines that the gateway OTP handshake is valid, the master portal 105 proceeds to step 710 and sends a response to the gateway. The gateway receives the OTP handshake from the master portal in step 712 and determines if the OTP handshake is valid in step 714. If the OTP handshake is valid, the gateway 140 creates a session OTP for the gateway and the master portal 105 in step 716. Meanwhile, the master portal 105 creates a session OTP for the gateway and the master portal in step 718 and presents the requestor with a login page in step 720.

The requestor provides the requestor's identifier and password to the master portal 105 in step 722. The master portal 105 searches for the identifier in the known user list in step 724. If the requester identifier matches a known user in step 726, the master portal proceeds to step 728 and establishes communication with the master locksmith 110 to request validation of the requestor's known user identifier. The master portal 105 initiates an OTP handshake with the master locksmith 110 to verify that the master locksmith 110 has valid hardware in step 730. In step 732, the master locksmith 110 receives the OTP handshake request and replies with a valid OTP code. The master locksmith 110 verifies the master portal 105 in step 734, and if verified, the master locksmith 110 creates a session OTP for the master locksmith 110 and the master portal 105 in step 736. Meanwhile, the master portal 105 receives the OTP handshake from the master locksmith in step 738 and determines if the master locksmith is valid in step 740. If the master locksmith is determined to be valid, the master portal 105 creates a session OTP for the master locksmith 110 and the master portal 105. Next the master portal 105 sends the master locksmith 110 a request to validate the known user ID, encrypted with the OTP in step 744. The master locksmith 110 presents the requestor with a USB key validation page via the master portal 105 in step 746. The requestor connects the requestor's USB device to the data user computer 125 in step 748 and transmits the key stored on the USB device to the master locksmith 110 via the master portal in step 748.

The master locksmith 110 uses the USB key to validate the user identifier previously supplied by the master portal 105 in step 750. If the requestor is authenticated, the master locksmith 110 transmits a first encryption key to the master portal in step 752 and closes its validation session in step 754.

The master portal 105 uses the first encryption key to partially decrypt the information requested by the requestor and sends the metadata to the gateway 140 through which the requestor is accessing the network in step 756. The master portal 105 then closes its session with the master locksmith 110 in step 758.

In step 760, the data user computer 125 uses the second encryption key stored on the USB device to decrypt the metadata sent by the master portal. The requestor next selects the information to access in step 762. The decrypted metadata is used by the master portal 105 to access specific information from a specific gateway 140 in step 764. To access the information, the master portal first opens a session with the applicable registered gateway in step 766 and initiates an OTP handshake to verify that the gateway as valid hardware in step 768. The gateway to the selected database receives the OTP handshake and replies with a valid OTP code in step 770. If the gateway determines that the master portal handshake is valid in step 772, the gateway creates a session OTP for the gateway and the master portal in step 774. At the same time, the master portal receives the OTP handshake from the second gateway in step 776 and determines if the OTP handshake is valid in step 778. If valid, the master portal creates a session OTP for the second gateway and the master portal in step 780. The master portal 105 then sends the metadata to the second gateway to gain access approval for the information requested by the requestor gateway in step 782. Next, in step 784, the database prepares the approved information for transmission to the requestor gateway.

In step 786, the master portal 105 sends gateway2 and master portal session OTP to the requestor gateway and sends and identical identifier to both gateways. Gateway1 prepares to send a session handshake to gateway2 in step 788 and uses the new session OTP to contact the gateway2 using the identifier for verification in step 790. Meanwhile, in step 792, the gateway2 prepares to receive the session handshake from the first gateway. Upon receipt, the data gateway determines if the session OTP and identifier are valid in step 794. If valid, the data gateway informs the requester gateway that it is ready to receive in step 796. In step 798, the requestor gateway sends an encrypted information request to the data gateway.

The data gateway evaluates the information request in step 800 and executes retrieval of the data the requestor is allowed to view. In step 802, the data gateway translates the vetted information request into a proper query for the database and queries the database. The database recasts the data into an appropriate format in step 804 and the data gateway encrypts the data with the second encryption key. The data gateway then establishes a secure communications session with the requestor in step 806.

In step 808, the data user computer 130 receives the data and decrypts the data using the second encryption key. The requestor then closes the session in step 812. Similarly, the master portal closes all related open gateway sessions in step 814, deletes the first encryption key provided by the master locksmith and closes its session in step 816. The gateway also closes its session in step 818.

Registration of Externally Located New Router and Gateway

Figure 8A:
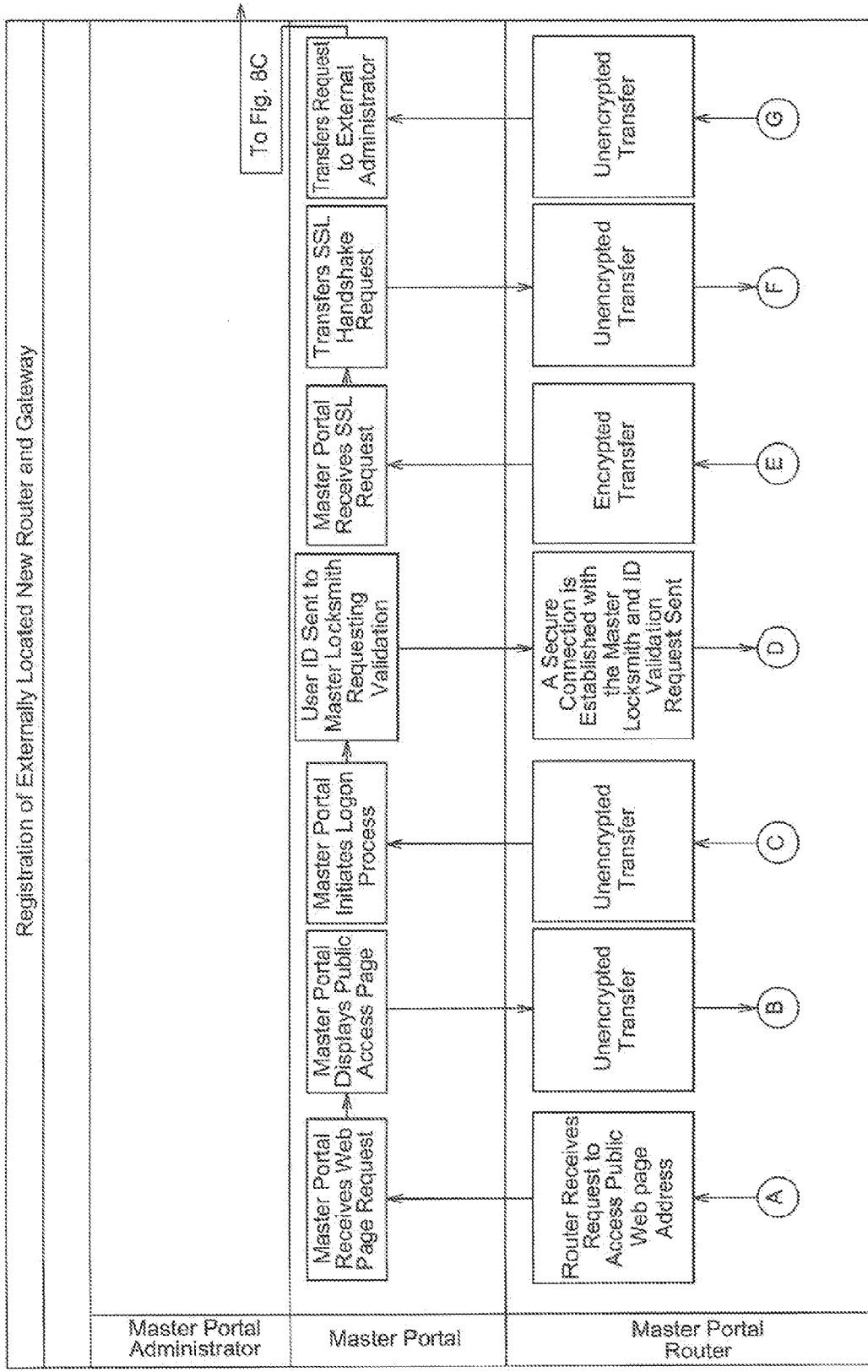
FIGS. 8A-8P are a flowchart representation of an embodiment of a process for registering an externally located new router and gateway.
Figure 8B:
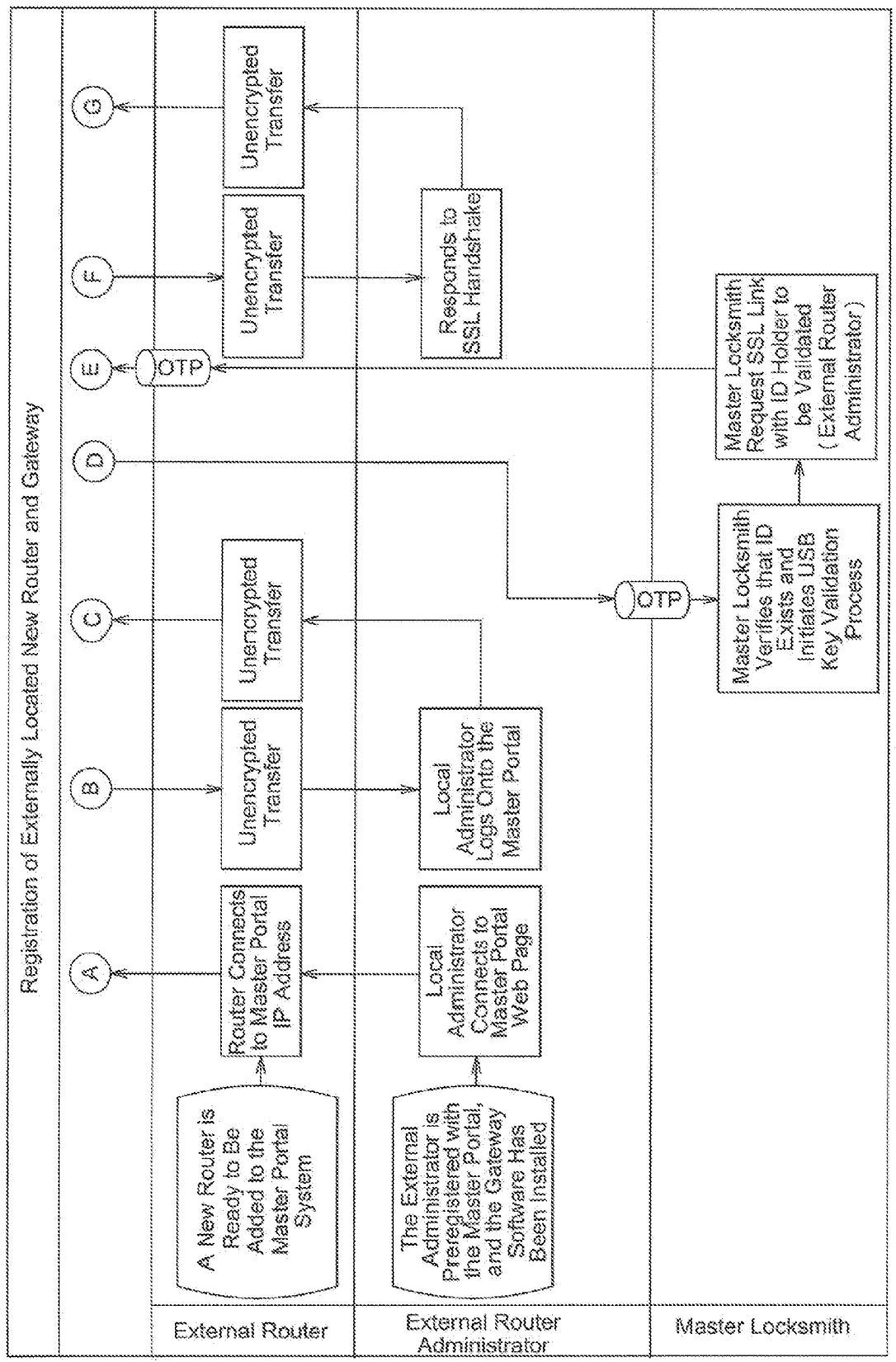
Figure 8C:
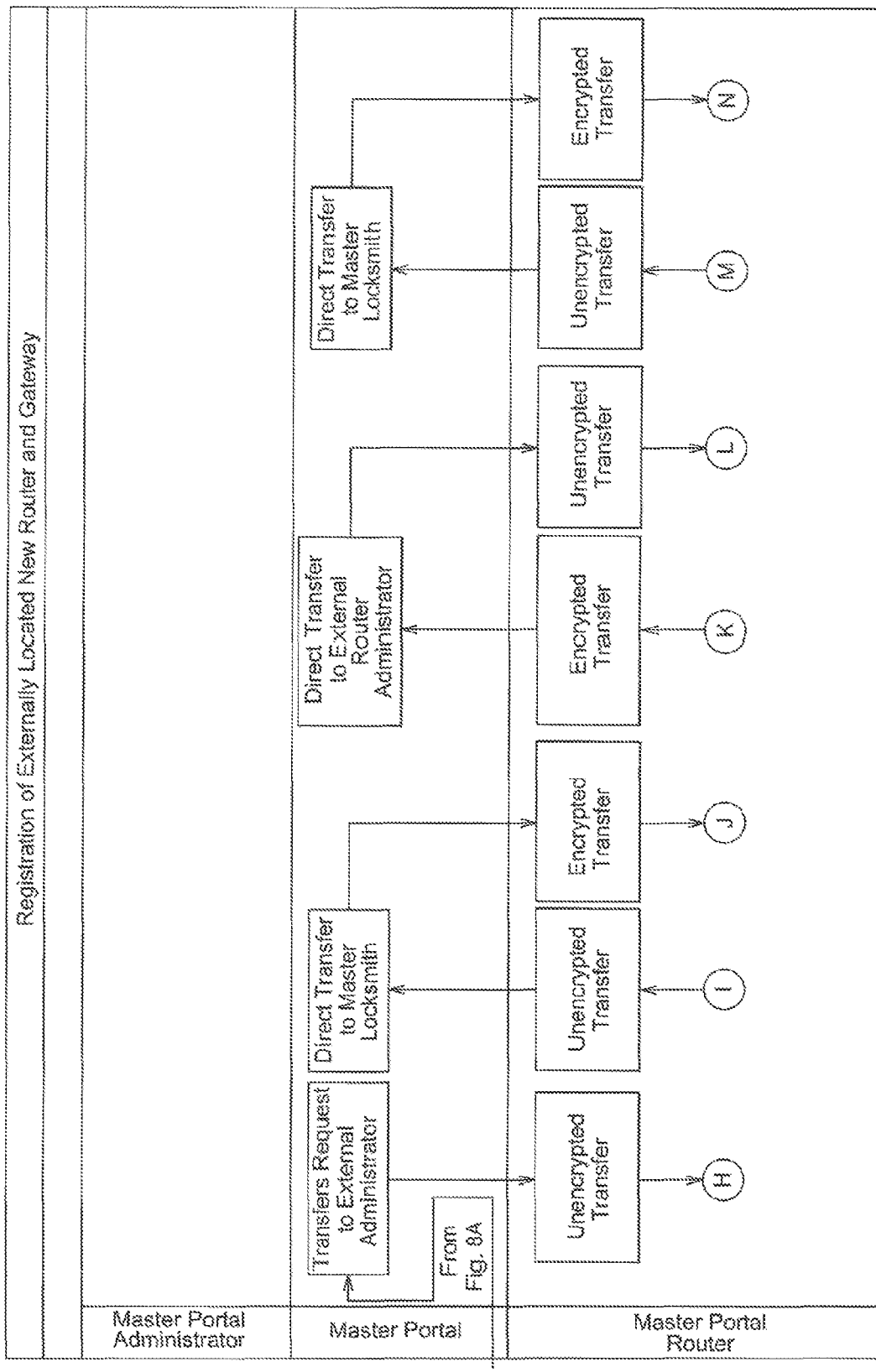
Figure 8D:
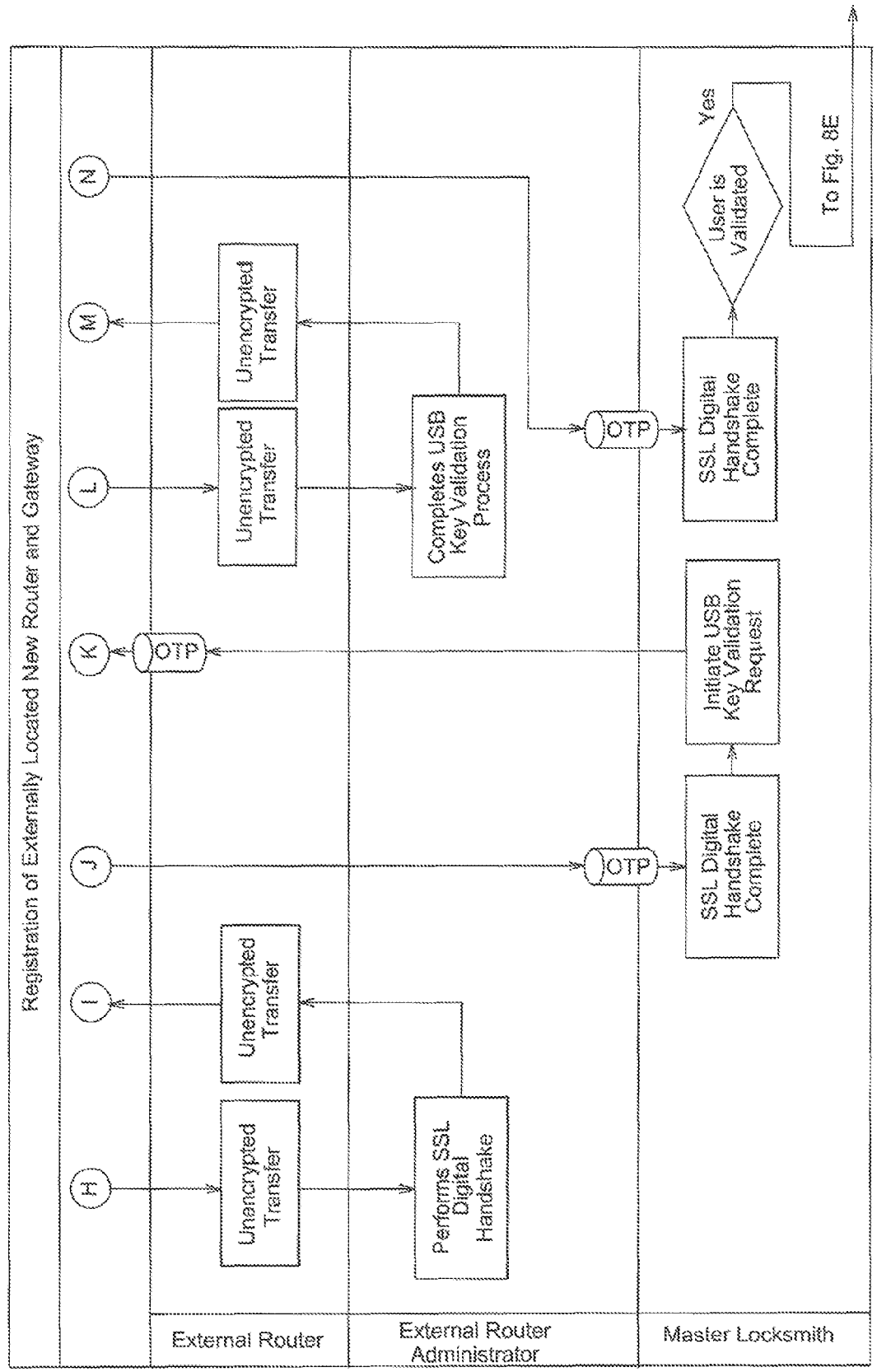
Figure 8E:
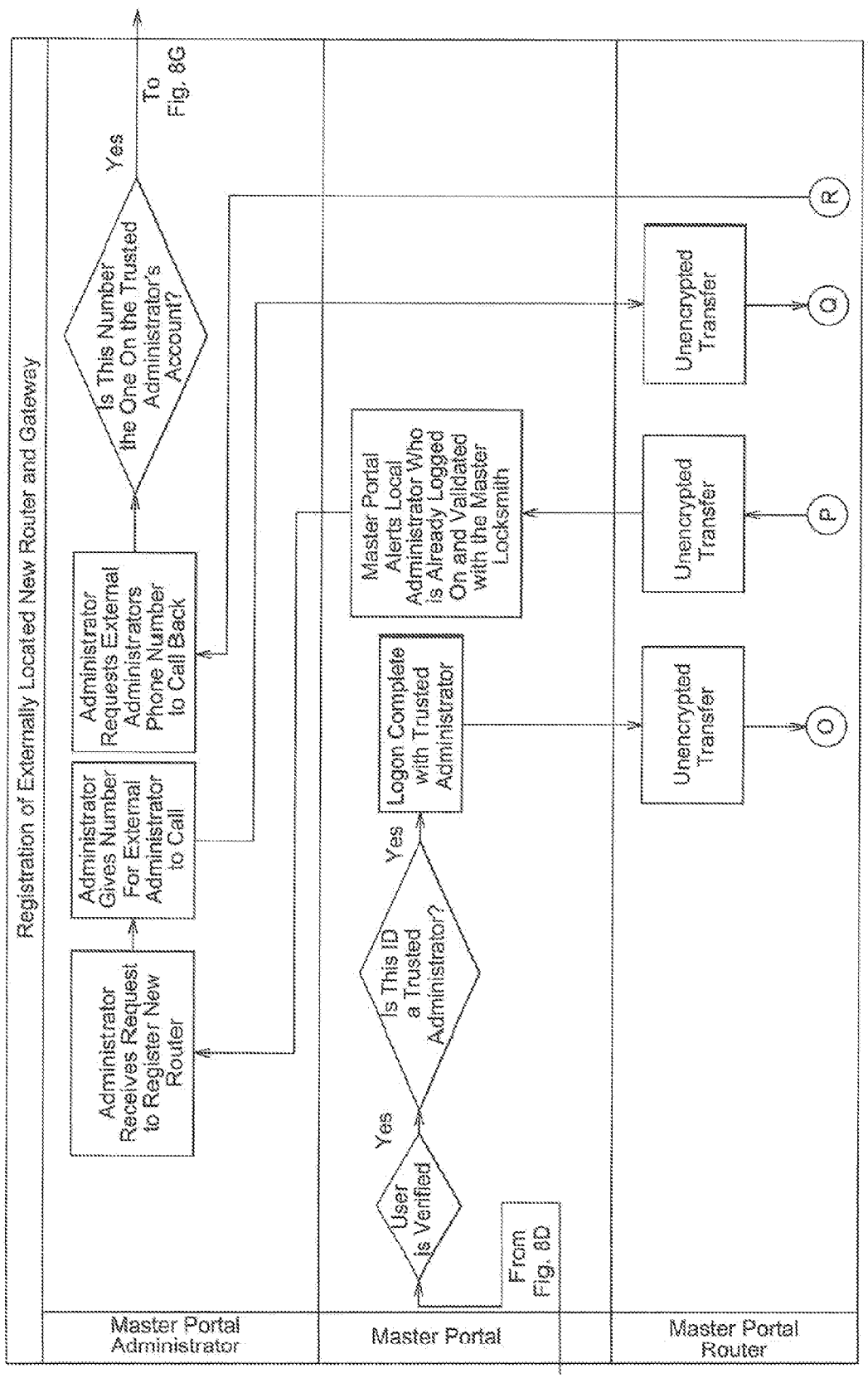
Figure 8F:
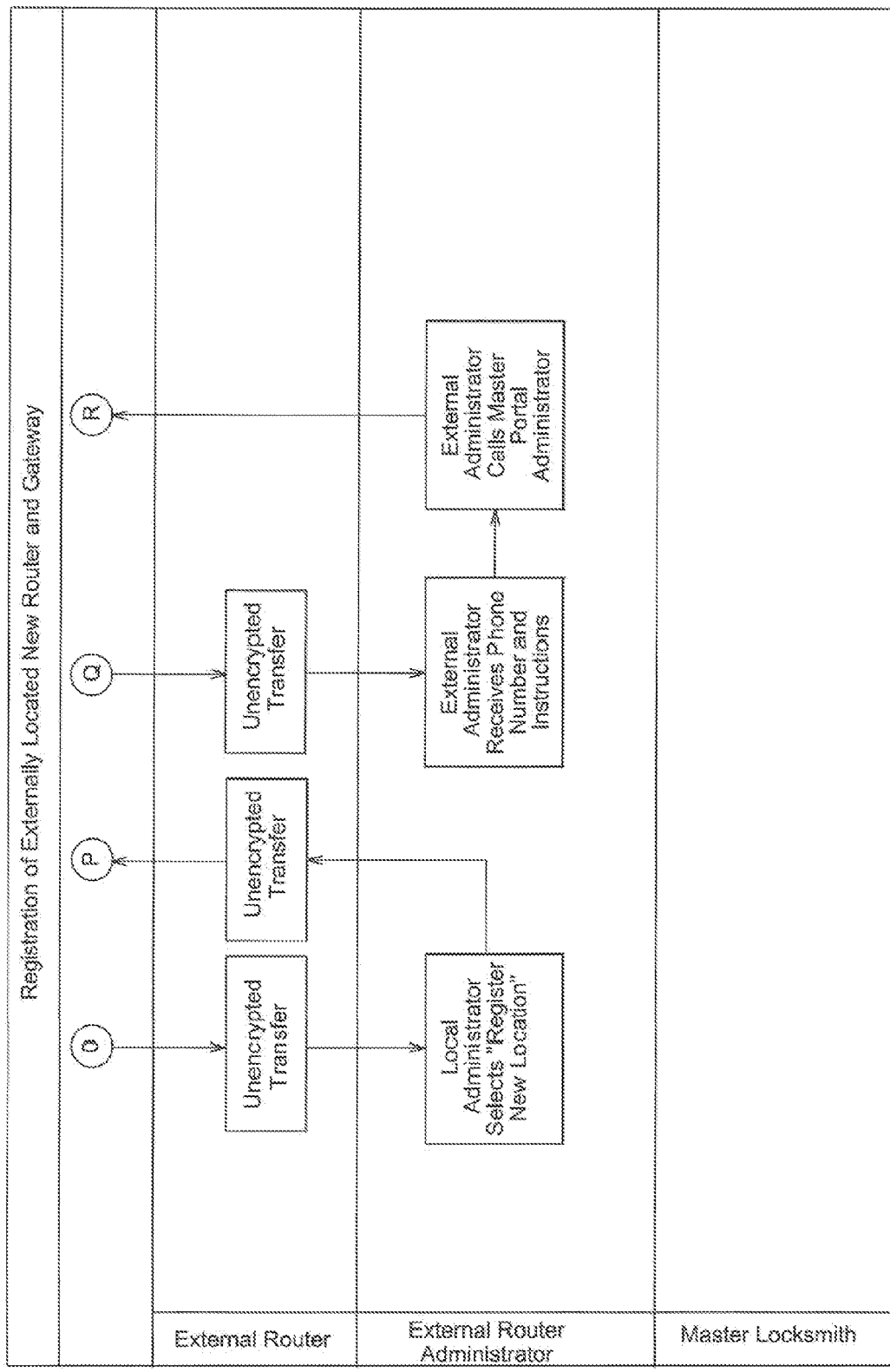
Figure 8G:
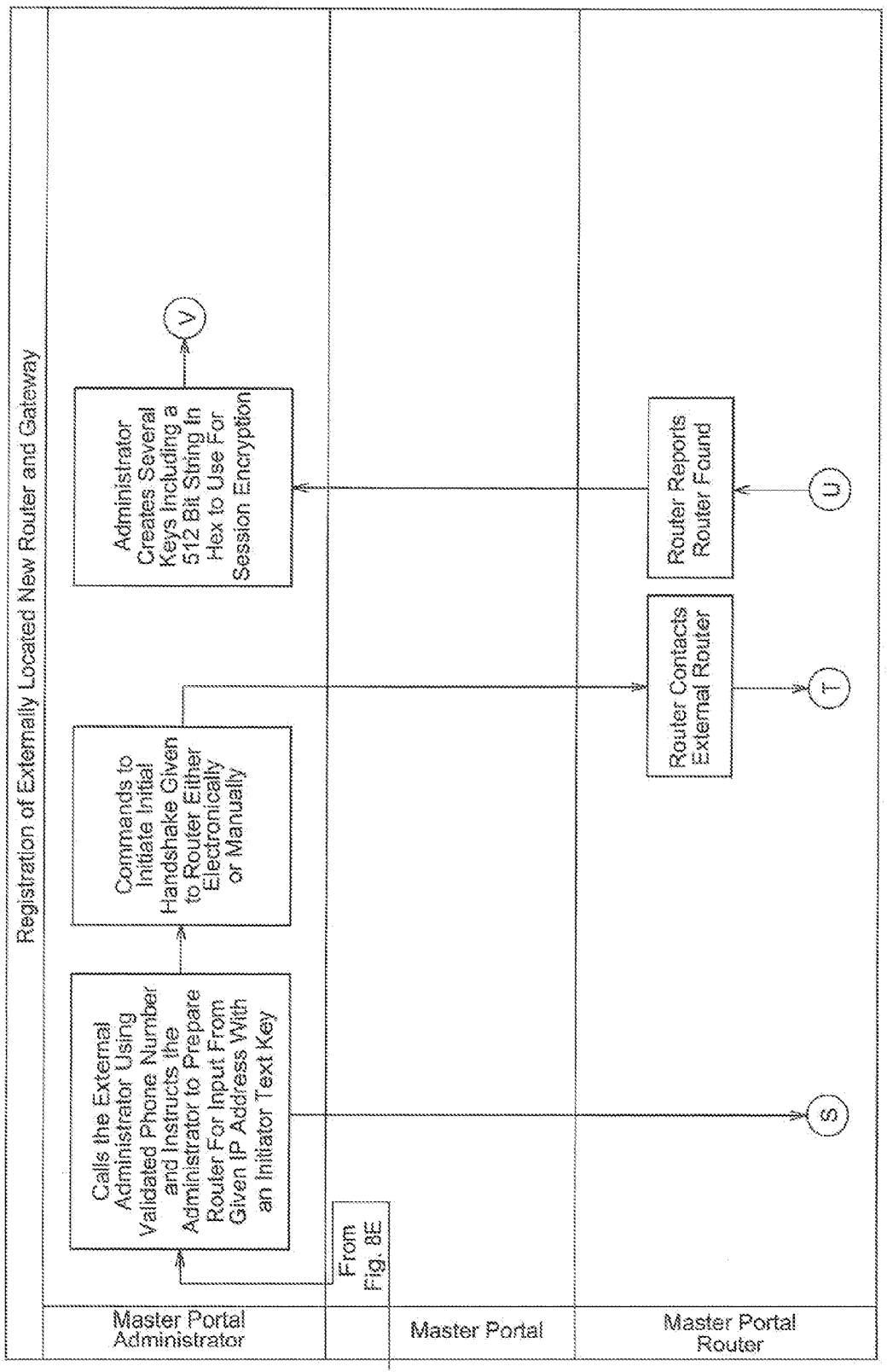
Figure 8H:
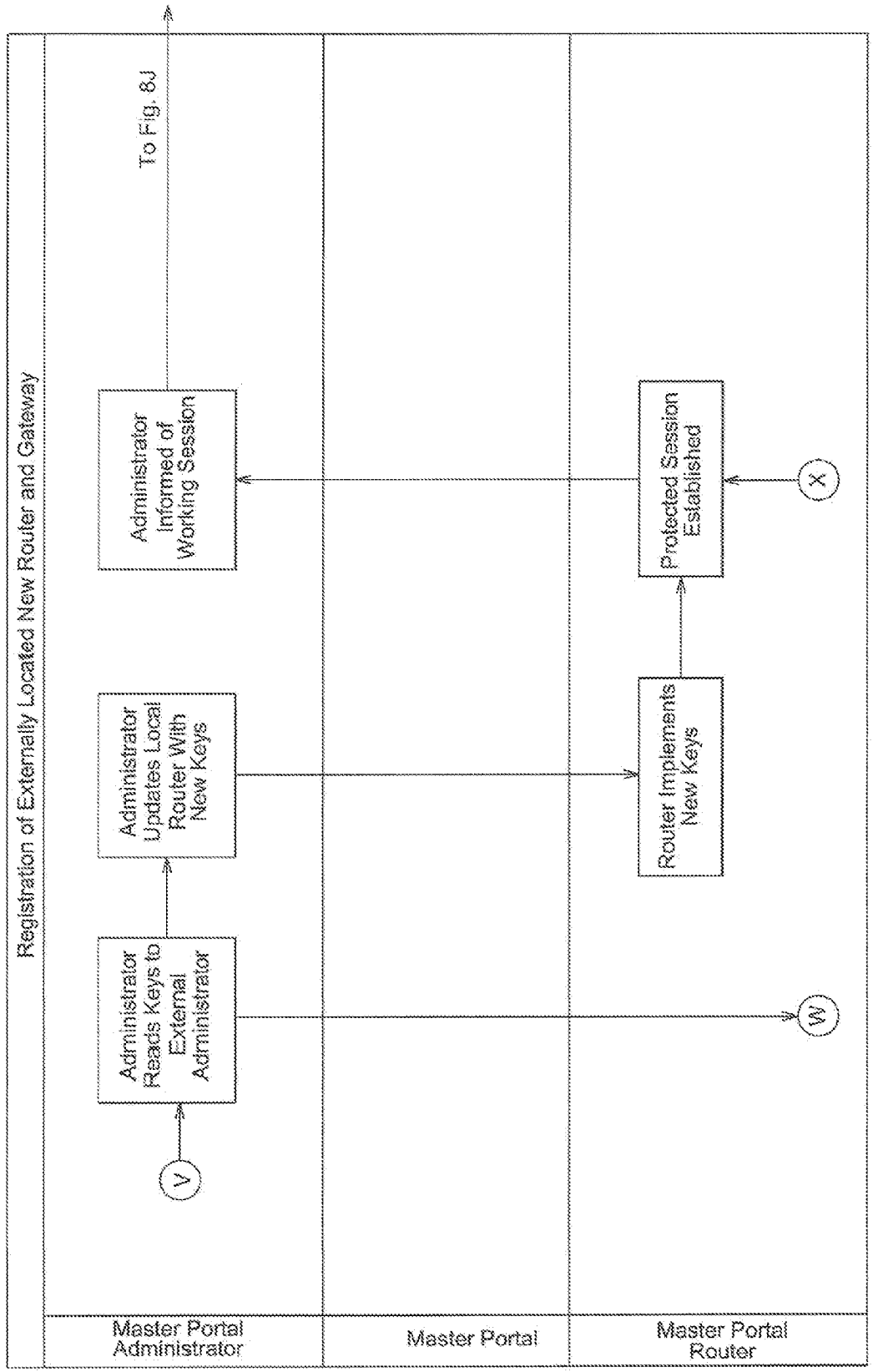
Figure 8I:
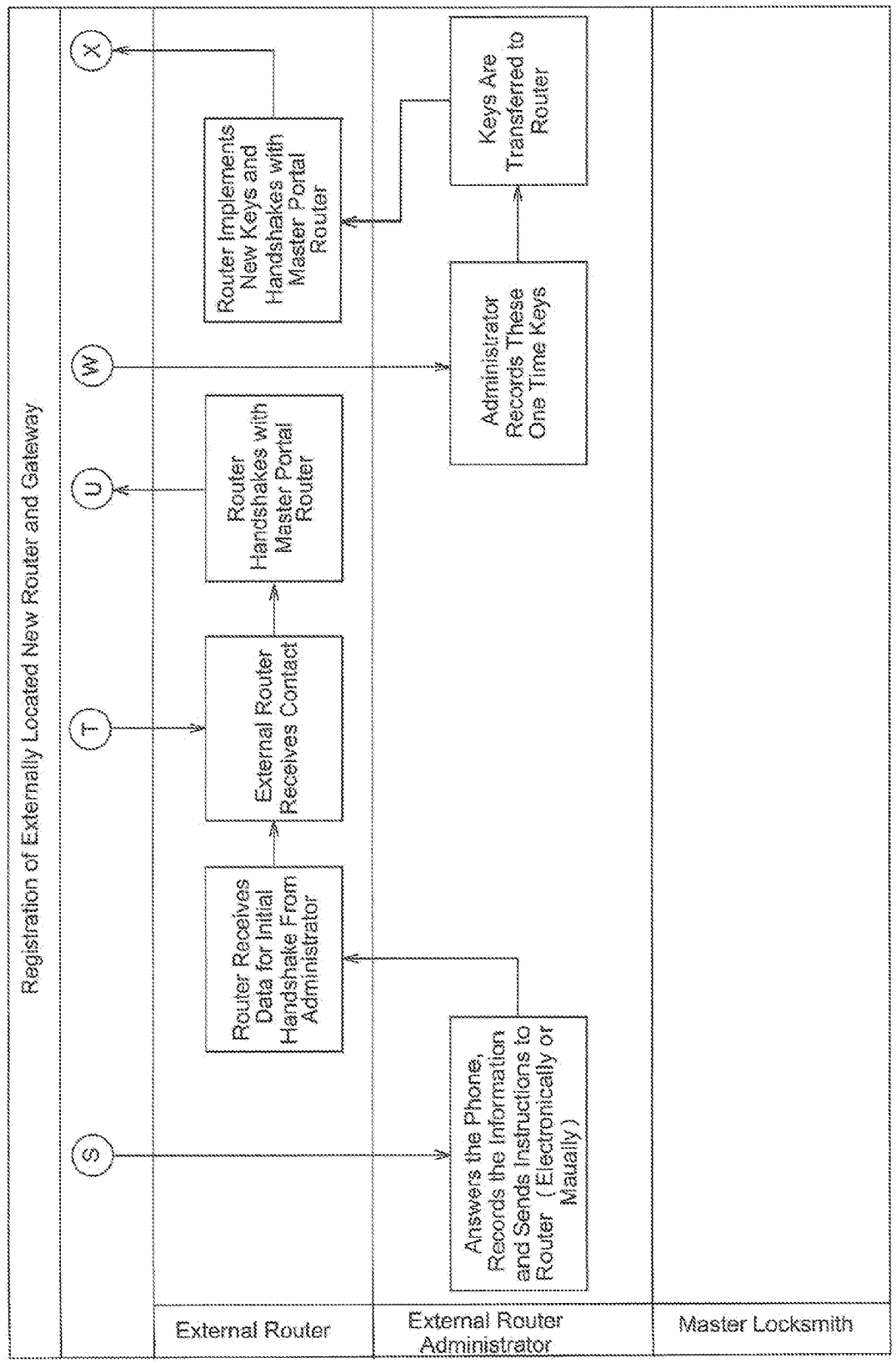
Figure 8J:
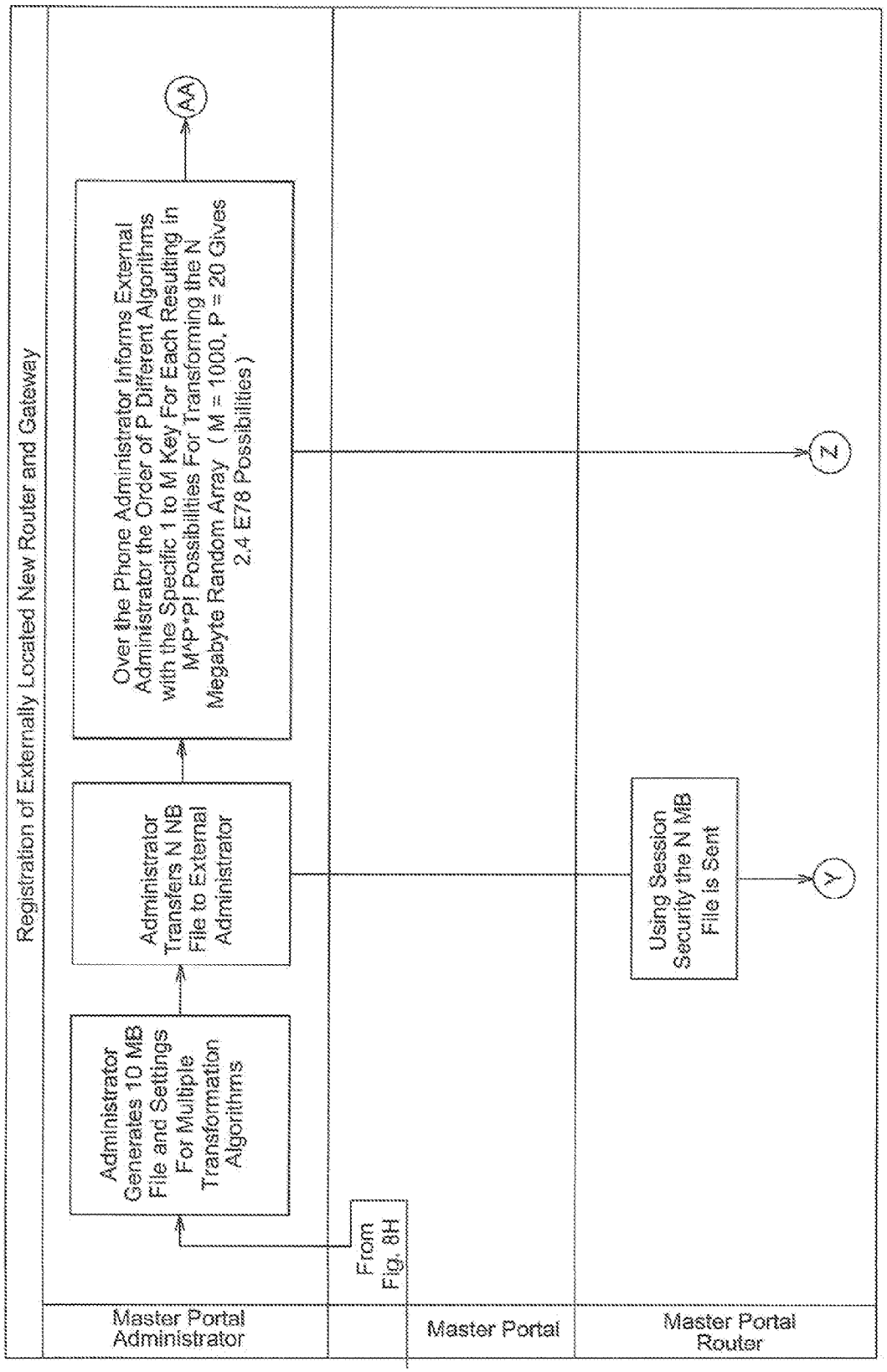
Figure 8K:
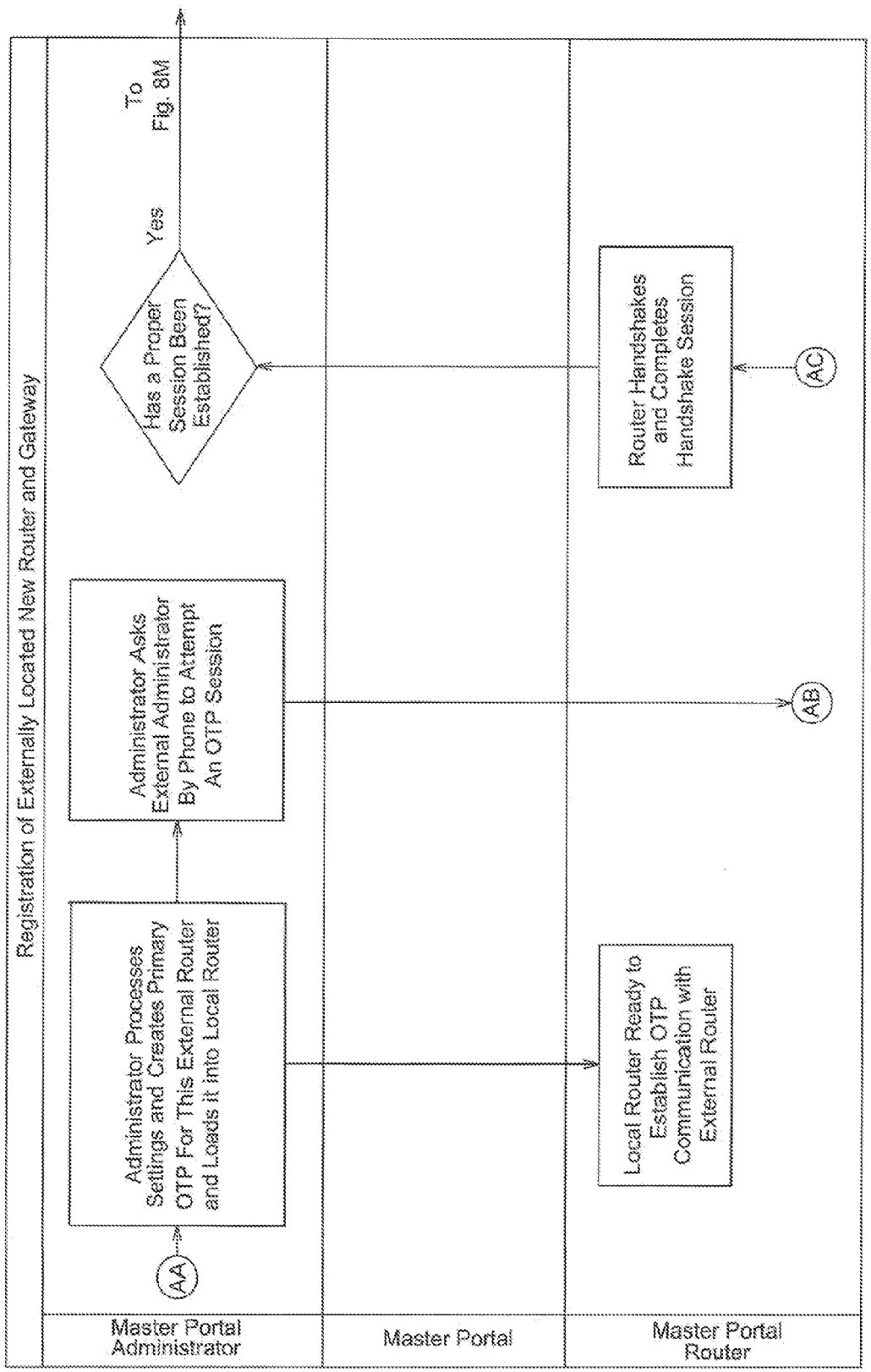
Figure 8L:
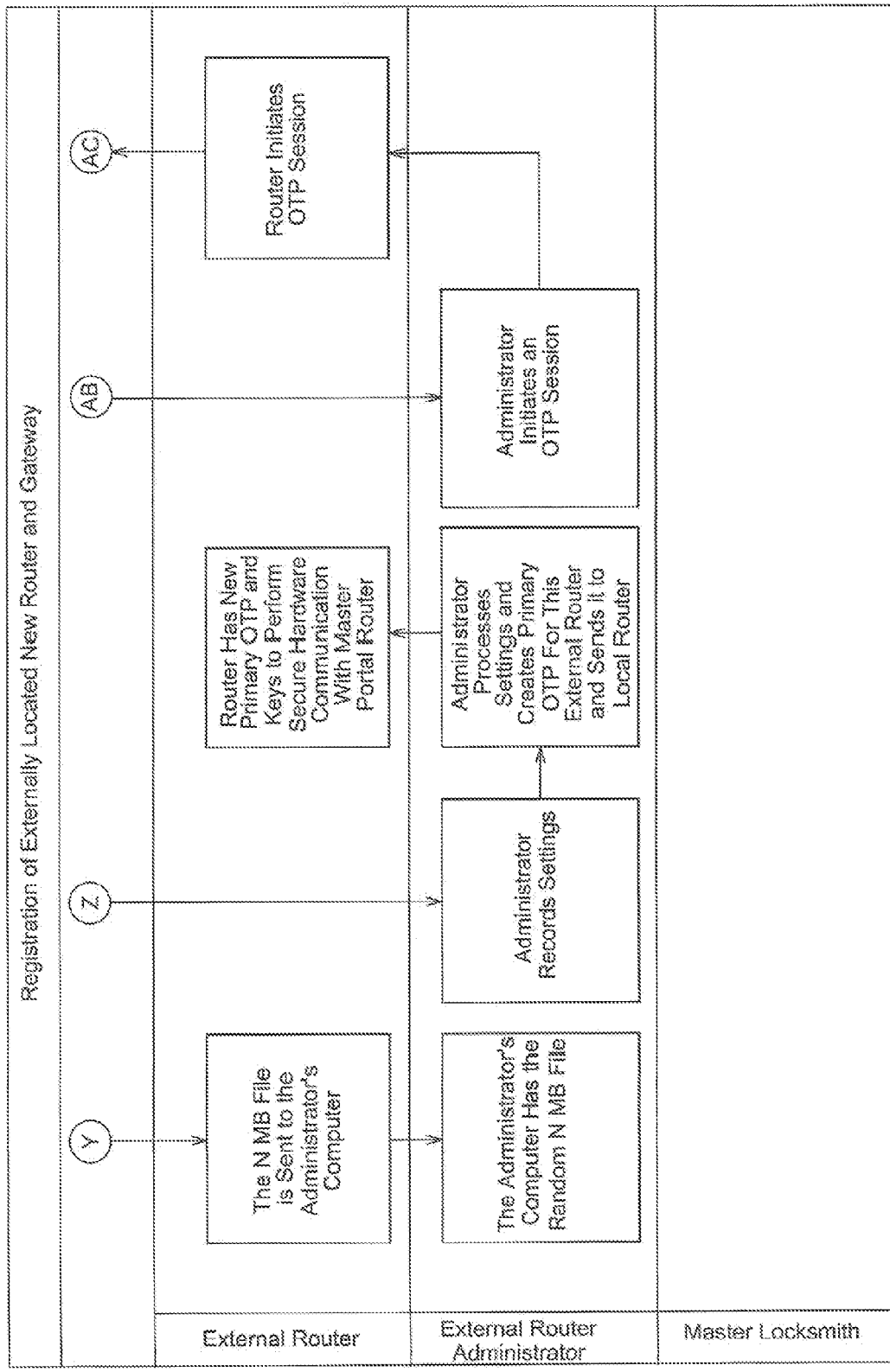
Figure 8M:
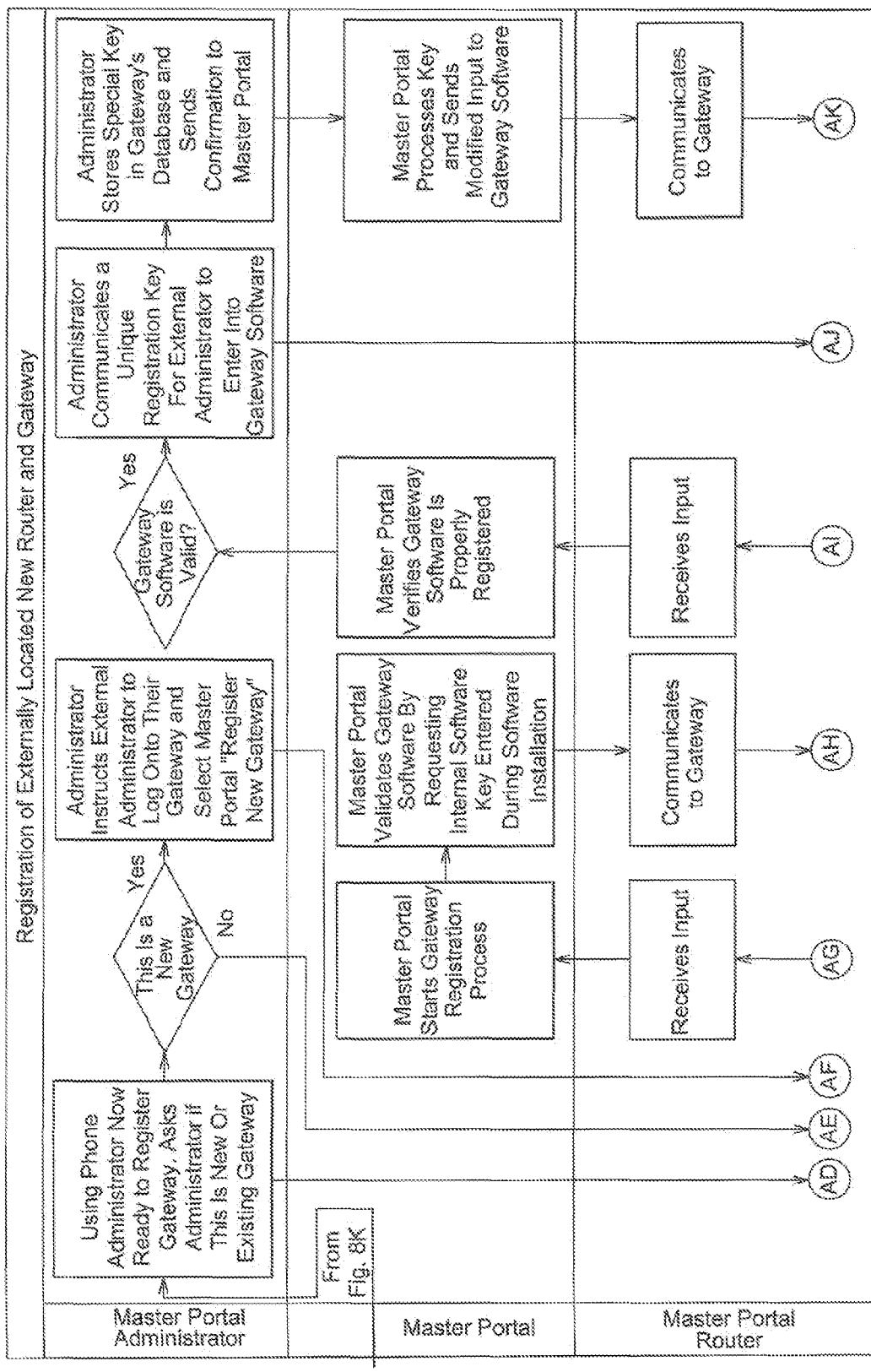
Figure 8N:
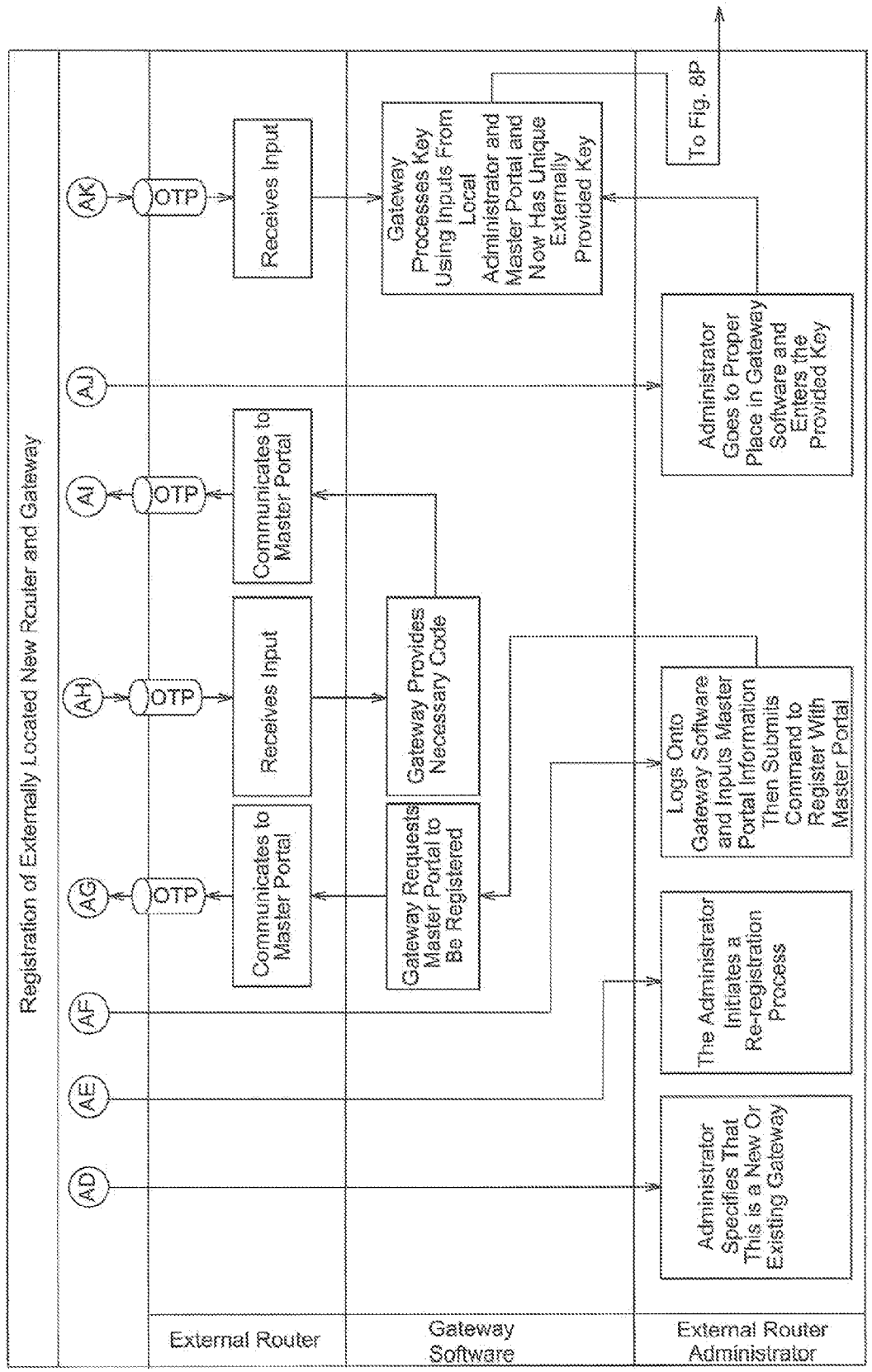
Figure 80:
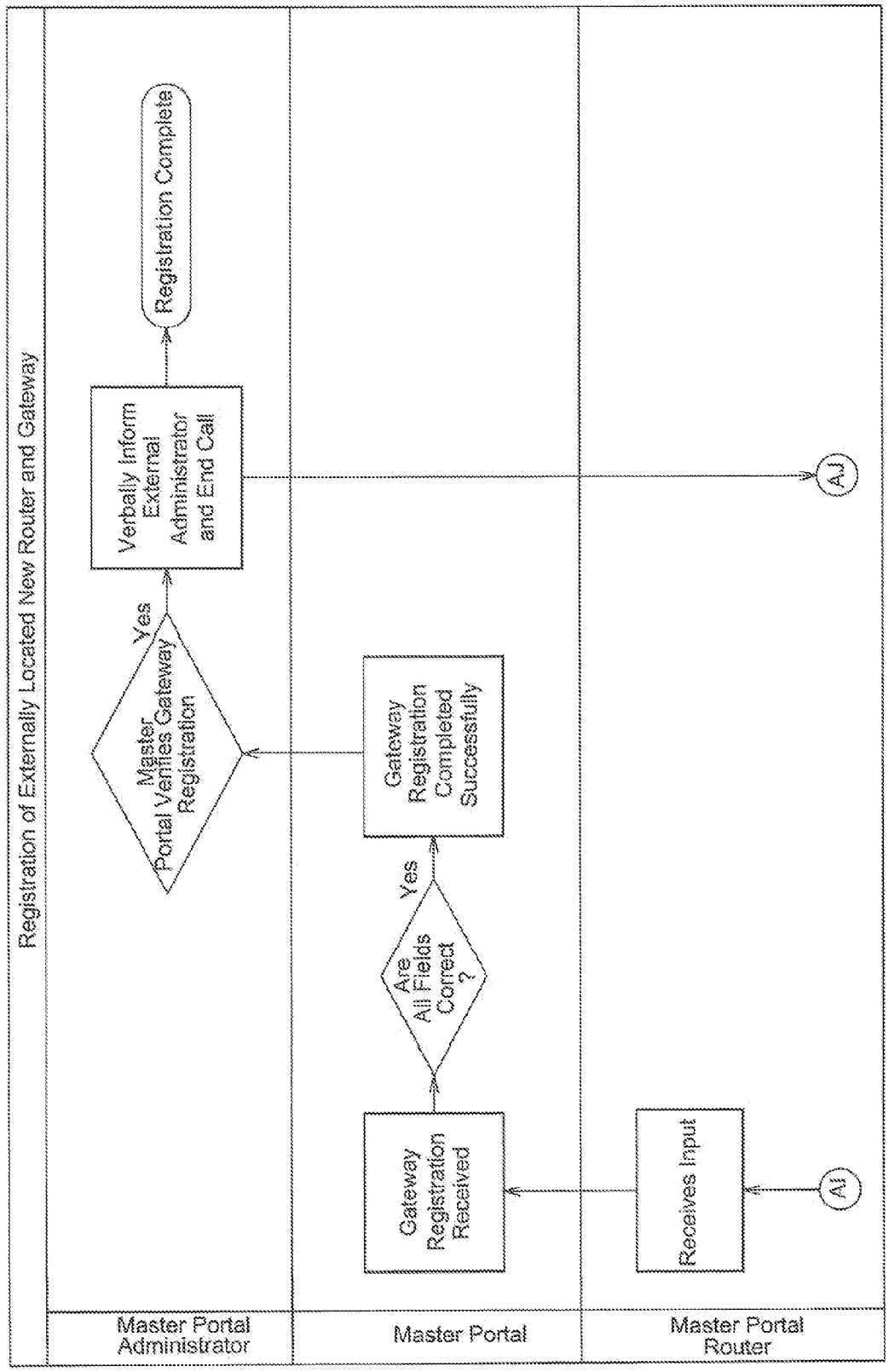
Figure 8P:
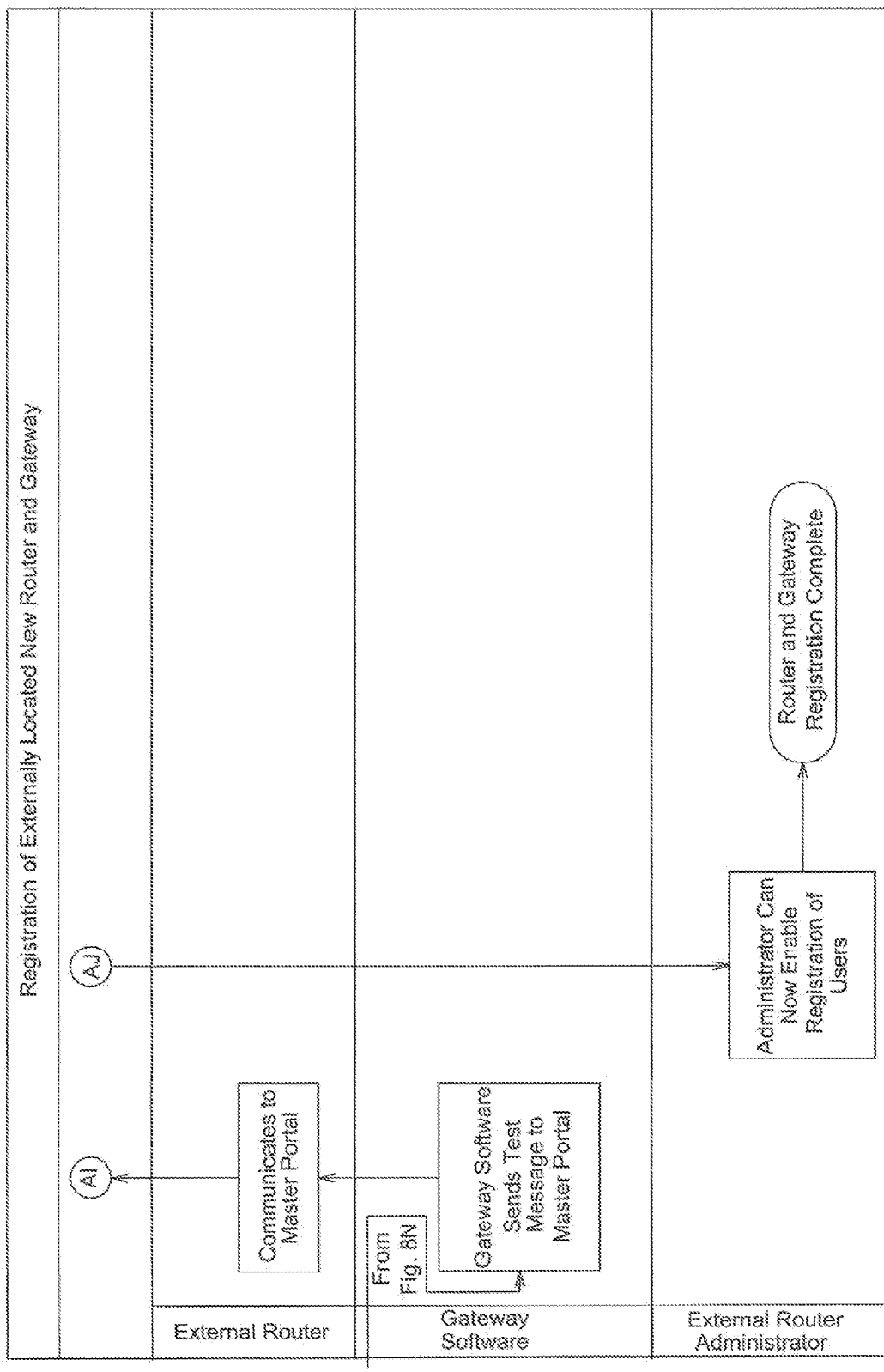

Referring now to FIGS. 8A-8P, an embodiment of a process for registering an externally located new router and gateway is shown.

Level 4 security is intended to provide the highest practical remote network authentication assurance. Level 4 authentication is based on proof of possession of a key through a cryptographic protocol. At this level, it is required that identity proofing be done in person. Level 4 is similar to Level 3 except that only "hard" cryptographic tokens are allowed, FIPS 140-2 cryptographic module validation requirements are strengthened, and subsequent critical data transfers must be authenticated via a key bound to the authentication process. The token shall be a hardware cryptographic module validated at FIPS 140-2 Level 2 or higher overall with at least FIPS 140-2 Level 3 physical security. By requiring a physical token, which cannot readily be copied, and since FIPS 140-2 requires operator authentication at Level 2 and higher, this level ensures good, two factor remote authentication. The PIV Card authentication key meets Level 4 token requirements.

Level 4 requires strong cryptographic authentication of all parties and all sensitive data transfers between the parties. Either public key or symmetric key technology may be used. Authentication requires that the claimant prove through a secure authentication protocol that he or she controls the token. All protocol threats at Level 3 shall be prevented at Level 4. Protocols shall also be strongly resistant to man-in-the-middle attacks. Long-term shared authentication secrets, if used, are never revealed to any party except the claimant and verifiers operated directly by the credentials service provider (CSP); however, session (temporary) shared secrets may be provided to independent verifiers by the CSP. Strong approved cryptographic techniques are used for all operations. All sensitive data transfers are cryptographically authenticated using keys bound to the authentication process. At Level 4, bearer assertions shall not be used to establish the identity of the claimant to the relying party. Holder-of-key assertions may be used, provided that the assertion contains a reference to a key that is possessed by the subscriber and is cryptographically secure.

DRAFT viii Draft Special Publication 800-63-1 Electronic Authentication Guideline linked the Level 4 token used to authenticate to the verifier. The relying party shall maintain records of the assertions it receives, to support non-repudiation.

The process shown in FIGS. 8A-8P covers the case where the new router is external to the master portal system and only has internet and phone communication for the registration process communication.

In one embodiment, there is still an IP registration process that is required when a preregistered router is connected for the first time so that the IP address is registered with the master portal system. Once a router is registered, the gateway registration process can begin. If the gateway has already been registered, and the new router is an additional unit or a replacement, a re-registration may be required to ensure security is maintained.

Metadata

As described above, in one embodiment, the system for controlling access to information stored at a plurality of data sites will use metadata to control and manage information contained in the various databases. This metadata describes what is viewable, to whom, for what period of time and other controlling or limiting factors. Metadata is loosely defined as data about data. Metadata is a concept that applies mainly to electronically archived or presented data and is used to describe the a) definition, b) structure and c) administration of data files with all contents in context to facilitate the use of the captured and archived data for further use. For example, a web page may include metadata specifying what language it is written in, what tools were used to create it, where to go for more on the subject and so on.

Metadata Usage Descriptions

As described above, the master portal does not contain business or medical data or any other data owner information, but rather only contains links that tie together the individual data owner (IDO) with their information in databases described by the links in the master portal. The links may be stored at either the master portal or the respective gateway controller or both. Metadata is created and managed for each link contained in the master portal database. These master portal links can be identified with a random identification number that is unique to each IDO. In one embodiment, the system adds tags to any data which is transferred between peers so that a data origination source can always be determined. In one such embodiment, the system includes a database which stores an audit trail of all usage of the metadata links either the master portal or the respective gateway controller or both.

Figures 9, 10:
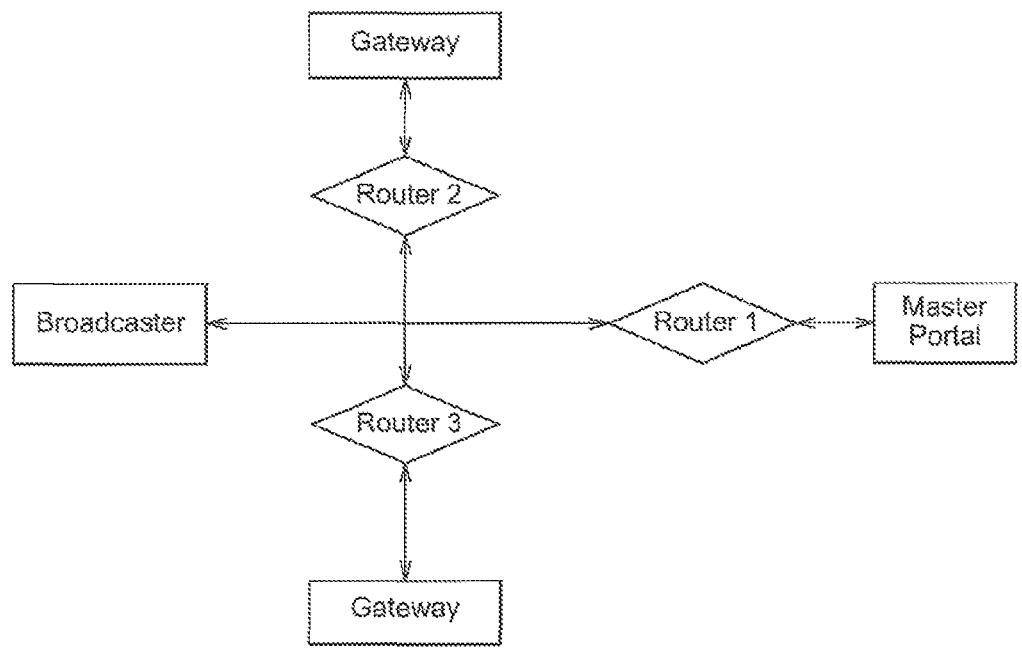
FIG. 9 shows a sample metadata structure.
FIG. 10 is a block diagram of one embodiment of an OTP system according to the invention.

External Registered Data Requestors (RDR) may have their own set of metadata records which define what data they may access for a given IDO. Metadata can be expressed in grammatical terms; that is with a descriptive structure. Noun objects could be gateway addresses that are available and accessible, data elements that are sharable, or data for which access is forbidden. Verb actions could describe how these noun objects are processed; that is how they are operated upon. Finally adjective and adverb objects could be used to refine what is to be shared and how it is shared including security control. In different embodiments, the metadata sentence structure might contain gateway names, IP addresses, ownership rights, granted permission types, data specifications (type, content, source, etc.), expiration dates or other descriptive information that describes the data to which the metadata is applied. The master portal stores a validated IDO's identification number and a permitted gateway identifier. This data is necessary to establish the connection between the IDO and the gateway but is not sufficient to describe the permitted actions. In order to establish sufficiency, the metadata attached to this linking pair must be employed by reading and executing the "sentences" of metadata attached to the linked pair. It is only through employing the descriptive metadata that the desired actions and behaviors can be achieved. FIG. 9 shows a sample metadata structure.

Healthcare Scenario

Referring again to the health care scenario in FIG. 2A, a network of data repositories 220 exists for each IDO (patient) 270. These repositories are accessed via links contained in the master portal 205 to individual gateway servers 265 that interface between the master portal 205 and the individual local application systems 220 that contain information relating to the IDO. The IDO's master portal records use the metadata to describe the interactions with these gateway data repositories. For example the metadata will specify the allowable gateway nodes—Primary Care Physician, Hospital A, Hospital B, Specialist A, Lab A and so forth. This describes the "who" the links are permitted to access. When these links, allowed by the "who is permitted," are made the metadata is used to define what information contained in these systems is permitted to be accessed. For example, at the primary care physician (PCP) all records are accessible, at Hospital A only records from the last admission are accessible, and for specialist A all records are accessible. Finally, the metadata defines the duration for the permitted access. This could be no limit in the case of the PCP, 90 days in the case of Hospital A and six months for the specialist.

For each pair of links the metadata describes the behavior of the link—who (the link itself), what is accessible/viewable and when is it viewable. Using the links and metadata contained in the master portal for the IDO, the authorized data users (ADU) can establish a virtual network amongst themselves to administer to the needs of the IDO. For example the PCP could establish a virtual network connection between him/herself and one or more specialists, a clinical lab and a hospital to serve the needs of the IDO. In practice the PCP would then have access to the most complete, accurate and timely information regarding the IDO from which to make a diagnosis and treatment plan. It is the combination of the master portal and the IDO's metadata that permits this secure, authorized virtual network to be established.

Metadata Creation

Metadata is created by the IDO or his/her proxy (in most cases the PCP). This is accomplished through the use of forms or templates presented to the party creating the metadata. These templates collect information regarding with whom links are permitted to be established, what information is to be made accessible via the link and what time constraints are to be placed upon the information. The metadata resulting from this creation process is associated with and stored as part of the IDO's linking information in the master portal. In one embodiment, default templates that specify usual and customary access items and permissions will be used to ease the metadata creation process. Facilities will be provided to maintain and delete the metadata information so that the intentions of the IDO can be respected. The linkage information contained in the master portal for the IDO creates their virtual network of information and the metadata controls how those links behave.

While we have discussed the creation and use of metadata in a healthcare environment, it should be understood that these concepts, methods and processes can be used in many analogous situations. For example, in a network of businesses that interact with each other to accomplish their respective business missions as shown in FIG. 2B, metadata can be used as described above to manage and control the links created and executed by the master portal. Government agencies can use these methods and processes for sharing information amongst themselves in a highly secure and controlled way. Financial institutions (banks, insurance companies, investment firms) can interact amongst themselves and the IDOs to serve the needs of the IDO. In principal, wherever there is a need to establish a secure virtual network between an IDO and parties servicing their needs, these metadata methods and process help ensure that the IDO's intentions are fulfilled.

Enigma-like Single Pad Encryption for Hardware Communication Security

Communication over the internet can be "overheard" using any of a number of schemes. Typically secure communication uses an encryption algorithm to achieve a secure communication session. The most common tool is referred to as SSL (although in many cases it is actually TSL). It is possible to add another layer of security by using hardware encryption and recognition software. An example is the security protocols available as part of the IPv6 standard. Using the features of the standard, one can ensure that the hardware at the designated IP address is known and trusted for secure communication. Using what is referred to as tunneling mode, the hardware component of the communication uses security that both performs a handshake verification process and an additional hardware layer of encryption of the communicated information.

One possible encryption method is the One-Time-Pad (OTP). In one such embodiment, the infranet of the master portal system includes physical communication devices which are routers that have the capability to optionally use hardware level security handshakes, data encryption using features in the IPv6 standard and OTP security to ensure the highest level of security for the packets transferred over the internet. In this scheme, two copies of a random set of characters or numbers are created. The encryption does a modulo addition of each character in a message with a character in the OTP. This scheme requires that the OTP is as long as or longer than the data to be encrypted. The decryption does a modulo subtraction of the one-time pad character with the received data. This scheme is extremely fast when using an electronic OTP with binary data. In this case the encryption is simple a logical XOR, and the decryption is also a simple XOR with the receiver's copy of the OTP. This means that the data can be encrypted and decrypted at speeds in excess of any data transmission speed.

The challenge is to create an OTP system which has an endless supply of one time pads. One solution is a virtual OTP system where the pads are created on the fly in an extremely secure manner.

Referring now to FIG. 10, one embodiment of the OTP system is shown. This embodiment comprises two routers with an identical primary reference one-time-pad (OTP) and seed settings for the algorithm to retrieve, transform and use the virtual one-time-pad. The two routers also have a predetermined look up algorithm to record a random OTP binary array and random keys from a large public random continuous streaming binary bit source which changes over time. The two routers also utilize a predetermined algorithm to modify the local OTP and create two new independent OTPs (a signature and a session OTP) using stored seed settings and the outside random bit arrays. Bit Array1 is used to transform the OTP and Bit Array 2 is used as seeds for the algorithm to combine the two OTPs. An external broadcaster of a random bit stream with integral timestamps is also utilized. The broadcaster is an optional internet function which broadcasts a steady stream of pseudo random digital data along with a digital timing signal so that the binary stream can be used as a random seed for a virtual OTP encryption.

In summary, each router has an identical set of data used as follows:

Reference OTP binary array source data.

Customized algorithm keys used to obtain binary key from the Broadcaster for pad transformation, lookup sequence and to define the transformation algorithm.

A transformation algorithm that uses the obtained keys and the internal keys to transform the reference OTP into a signature and session OTP, and then set up the look-up sequence for each.

Router Registration

The reference OTP and reference key settings may be (1) supplied externally with a pair of memory chips (e.g. ssd memory cards) or (2) generated randomly using a complex algorithm running on the primary router. In the second option, the seed can be a text string typed in by the administrator of the primary router, or by a hardware function in the router. Once two routers are registered, they independently update the random OTP transformation pad and algorithm settings by recording output from broadcaster in a particular way at predetermined time periods.

Router Authentication

Communication uses an initiator router and a responder router pair which have been registered with each other. The initiator router transforms the reference OTP and creates a handshake OTP using the input from the broadcaster and the settings for the algorithm. It then sends a handshake request to the responder router at its prerecorded IP address set during the routers' earlier mutual registration. The handshake consists of an OTP encrypted random character string in the hardware IPv6 header. The responder router uses its information to form its handshake OTP which should be identical to the initiator router's because they have identical information to do so from their mutual registration with each other. The responder router's handshake is formed by decrypting the received random character string, and then re-encrypts it using the next set of OTP contents. The initiator router verifies that the response is received from the proper IP address, and then decrypts the handshake and compares it to the original character string. If the IP address and character string match, the handshake is complete.

Router Data Transfer

First a successful handshake must occur (the proper shared OTP for the given IP address is validated). Next a session key is created which is a different OTP from the one used to do the authentication handshake. Using the encryption of the hardware handshake, a second set of algorithm keys are sent so that a special session OTP is created for encoding the session data stream. The transmission of the data uses the second session OTP to encrypt the data. This OTP is unique for every session.

Router Session Handoff

A primary and a second router handshake and then establish a primary session key. The primary router establishes a valid handshake connection to third router as requested by the second router. The master router then using the handshake encoding, transmits the primary session key to the third router. Note that the handshake initiation OTP for the second router is not given to the third router. The second and third routers communicate the required data using the primary session key.

One of the strengths of the system is that to compromise the system, one would have to either take physical control of the primary router or create an exact clone. Both of these potential threats can be defended against. Note also that physical control of the router system does not give access to the two-source software security validation process. A strength of the system is that if a secondary router is physically compromised by an unauthorized user, they cannot make changes to an individual's metadata stored on the primary system unless they also have a valid username, password and USB key. The unauthorized user also cannot initiate a handoff to another router unless they also have a valid username, password and USB key to read and decode the proper metadata stored on the primary system. If the primary router is physically compromised (in control by a subversive agent), then handoffs to other routers can be subsequently compromised. However this can only happen if the unauthorized user has a valid master portal username, password, and USB key.

Infranet Discussion

Figure 11:
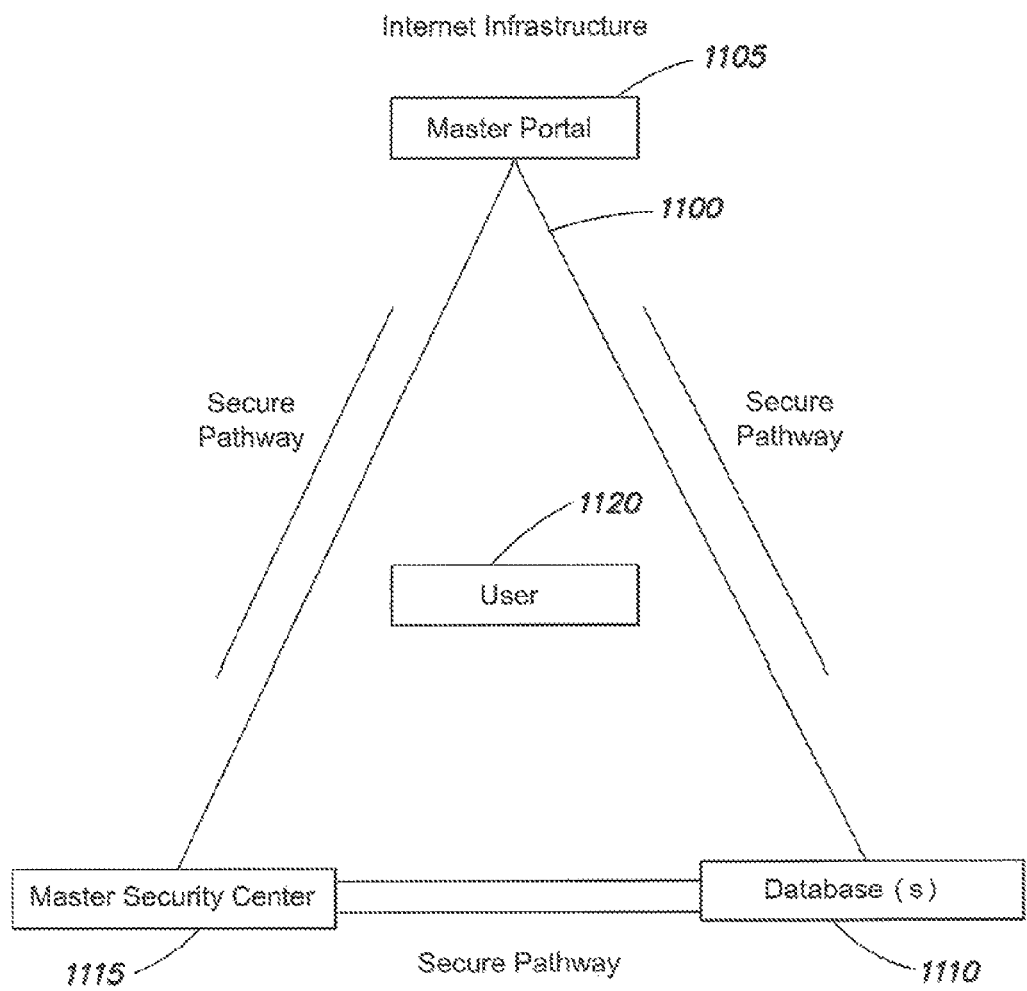
FIG. 11 is a pictorial view of an embodiment of an infranet created using an embodiment of the invention.

As mentioned above, the system provides a well-defined secure access infrastructure so that outside entities can independently access data without affecting the integrity of the data or its privacy. The infrastructure is designed to operate in any private or public network including the general internet. With this system an individual entity can assert external sharing control of their data residing within a database operated by a third party without conflict of the internal use of the data by that third party. In one embodiment, the invention provides a robust generic "infranet" capability, e.g. a secure data access and sharing infrastructure to the internet. FIG. 11 is a pictorial view of the infranet created in one embodiment of the invention. The triangle 1100 represents the secure infrastructure termed the "infranet". The infranet consists of independent secure relationships. The master portal 1105 does not know anything about the relationship between the database providers 1110 and the master security center (a/k/a master locksmith) 1115. The three sides of the triangle comprise the three independent relationships which are used in order for a user 1120 to access a database 1110 using the master portal 1105. Each side is independent of the other sides. Thus, it would take a complete security breach at all three entities 1105. 1110 and 1115 for someone to commit identity fraud. Even if a perpetrator stole the user's personal ID card or identifier, they would not have the proper login information to use it.

The techniques described above can be implemented in digital electronic circuitry, or in computer hardware, firmware, software executing on a computer, or in combinations of them. The techniques can be implemented as a computer program product, i.e., a computer program tangibly embodied in tangible, machine-readable storage medium, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions described herein by operating on input data and generating output. Method steps can also be performed by, and apparatus of the invention can be implemented as, special purpose logic circuitry, e.g., an FPGA (field programmable gate array) or an ASIC (application-specific integrated circuit). Applications can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Storage media suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A computing system implementing the invention can include clients and servers. A client and server are generally remote from each other and typically interact over a communication network. The relationship of client and server arises by virtue of computer programs running on the respective computers and having a client-server relationship to each other.

Having described various embodiments of the invention, it will now become apparent to one of skill in the art that other embodiments incorporating the concepts may be used. It is felt, therefore, that these embodiments should not be limited to the disclosed embodiments, but rather should be limited only by the spirit and scope of the following claims.

What is claimed is:

1. An externally authorized peer-to-peer network data transfer system, comprising:
    a peer-to-peer network system for sharing data between independent entities;
    a plurality of electronic data repositories storing data applicable to a first entity;
    a plurality of data access peers providing access to the data stored in the plurality of electronic data repositories;
    a gateway controller system having the ability to limit access to data using a plurality of combinations of settings as control parameters related to data;
    a master portal controller configured to authorize data transfers by communicating desired parameters to the gateway controller system;
    a master key system based on validation of an identify of the first entity,
    wherein the data transfer system employs;
        a common identifier of the first entity for the master portal controller and gateway controller system;
        a first logon set of data to access the master portal controller, created by the first entity and known to the master portal controller, but not the master key system; and
        a second logon set of data to access the master key system, created by the first entity and known to the master key system, but not the master portal controller, and
    wherein the peer to peer network system is capable of connecting the plurality of electronic data repositories, the gateway controller system, the plurality of data access peers, the master portal controller and the master key system.

2. The system of claim 1, further comprising:
    a physical electronic key provided by the master key system for validation of the identity of the first entity.

3. The system of claim 1 wherein the master portal controller stores tables of pointers that identify sharable data, the tables storing:
    meta-data containing links and information about the data to be shared in a configuration that provides access to specific data by communicating to a relevant gateway controller tied to a specific data storage peer information specifying what data to make accessible; and
    an identification for each of the links that specifies which of the peers are authorized to use those links.

4. The system of claim 1 wherein the gateway controller system generates an information based report in a format designed for information display.

5. The system of claim 3 further comprising a database storing an audit trail of usage of the metadata links.

6. The system of claim 1 wherein the master portal controller adds tags to any data which is transferred between peers so that a data origination source can always be determined.

7. The system of 4 wherein the master portal controller uses a pre-fetch search algorithm to find and store the meta-data links which runs in the background.

8. The system of claim 2 wherein the master portal controller uses the physical key to identify the first entity to the gateway controller system rather than using an identifier of the first entity.

9. The system of claim 1 wherein the data comprises healthcare records.

10. The system of claim 1 wherein the data comprises business-related information.

11. The system of claim 1 wherein the data comprises financial data.

* * * * *